(12) United States Patent
McVey

(10) Patent No.: US 10,482,317 B2
(45) Date of Patent: Nov. 19, 2019

(54) IMAGE ANALYSIS FOR DETERMINING CHARACTERISTICS OF HUMANS

(76) Inventor: Catherine Grace McVey, Graham, NC (US)

(*) Notice: Subject to any disclaimer, the term of this patent is extended or adjusted under 35 U.S.C. 154(b) by 394 days.

(21) Appl. No.: 13/467,889

(22) Filed: May 9, 2012

(65) Prior Publication Data
US 2012/0288170 A1     Nov. 15, 2012

Related U.S. Application Data

(60) Provisional application No. 61/484,126, filed on May 9, 2011, provisional application No. 61/616,234, filed on Mar. 27, 2012.

(51) Int. Cl.
*G06K 9/00*     (2006.01)
*G06T 7/00*     (2017.01)
(Continued)

(52) U.S. Cl.
CPC .......... *G06K 9/00281* (2013.01); *A01K 29/00* (2013.01); *G06K 9/52* (2013.01); *G06T 7/0014* (2013.01)

(58) Field of Classification Search
None
See application file for complete search history.

(56) References Cited

U.S. PATENT DOCUMENTS 2,594,696 A    4/1952   Strudwick
3,714,399 A    1/1973   Cataland
(Continued)

FOREIGN PATENT DOCUMENTS

NZ          570714        1/2010
WO    WO-02/092101 A1   11/2002
(Continued)

OTHER PUBLICATIONS

Head circumference—autism, Lainhart et al., AJOMG, Part A, 104A:2257-2274, 2006, pp. 2257-2274.*
(Continued)

*Primary Examiner* — Jayesh A Patel
(74) *Attorney, Agent, or Firm* — Blank Rome LLP

(57) ABSTRACT

Systems and methods are disclosed for predicting one or more characteristics of a animal by applying computational methods to image(s) of the animal to generate one or more metrics indicative of the characteristics. Embodiments determine predictors of characteristics by creating a sample library of animals of a particular type, determining facial descriptor measurements for each animal, determining relationships between facial descriptor measurements and additional library data, and selecting predictors from these relationships. Other embodiments predict characteristics of animals not in the library and, optionally, categorize animals for particular discipline, training, management, care, etc. based on the characteristics. Other embodiments predict characteristics and determine strategies for group(s) of animals using predicted characteristics of individual animals. Embodiments are broadly applicable to domesticated animals including dogs, cats, cattle, oxen, llamas, sheep, goats, camels, geese, horses, chickens, turkeys, and pigs. Other embodiments predict certain characteristics of humans, including certain cognitive or developmental disorders.

21 Claims, 32 Drawing Sheets

(51) Int. Cl.
  *G06K 9/52* (2006.01)
  *A01K 29/00* (2006.01)

(56) References Cited

U.S. PATENT DOCUMENTS

| | | | |
|---|---|---|---|
| 3,999,041 | A | 12/1976 | Scofield |
| 4,260,646 | A | 4/1981 | Farrell et al. |
| 4,745,472 | A | 5/1988 | Hayes |
| 5,412,420 | A | 5/1995 | Ellis |
| 5,576,949 | A | 11/1996 | Scofield et al. |
| 5,944,598 | A * | 8/1999 | Tong ............... A22B 5/007 382/100 |
| 6,081,607 | A | 6/2000 | Mori et al. |
| 6,549,289 | B1 | 4/2003 | Ellis |
| 6,722,980 | B2 | 4/2004 | Stronach |
| 6,820,003 | B2 | 11/2004 | Hapgood et al. |
| 7,027,054 | B1 | 4/2006 | Cheiky et al. |
| 7,110,572 | B1 | 9/2006 | Benn |
| 7,257,258 | B2 | 8/2007 | Ruff, Jr. |
| 7,374,536 | B1 | 5/2008 | Taylor |
| 7,374,596 | B2 | 5/2008 | Taylor |
| 7,399,220 | B2 | 7/2008 | Kriesel et al. |
| 7,792,379 | B2 | 9/2010 | Andres del Valle |
| 7,953,690 | B2 | 5/2011 | Luo et al. |
| 8,036,429 | B2 | 10/2011 | Doyle, II |
| 8,061,302 | B2 | 11/2011 | Seder |
| 8,064,694 | B2 | 11/2011 | Yen et al. |
| 8,483,446 | B2 | 7/2013 | Demarais et al. |
| 8,538,126 | B2 | 9/2013 | Peacock et al. |
| 8,588,482 | B1 | 11/2013 | Baluja et al. |
| 8,738,117 | B2 | 5/2014 | Jimenez-Acquarone |
| 8,755,570 | B2 | 6/2014 | Gomas et al. |
| 2002/0142816 | A1* | 10/2002 | Stronach ............... G06Q 50/34 463/6 |
| 2003/0171878 | A1 | 9/2003 | Frudakis |
| 2004/0208343 | A1 | 10/2004 | Golden et al. |
| 2005/0011466 | A1 | 1/2005 | Doyle |
| 2005/0030184 | A1 | 2/2005 | Victor |
| 2005/0053277 | A1 | 3/2005 | Liu et al. |
| 2007/0110281 | A1 | 5/2007 | Jurk |
| 2007/0127781 | A1 | 6/2007 | Stewart |
| 2007/0127786 | A1 | 6/2007 | Hiraizumi et al. |
| 2007/0127787 | A1 | 6/2007 | Castleman et al. |
| 2008/0137919 | A1 | 6/2008 | Kozakaya et al. |
| 2008/0175464 | A1 | 7/2008 | Brett et al. |
| 2008/0212828 | A1 | 9/2008 | Ishida et al. |
| 2008/0249835 | A1 | 10/2008 | Angell et al. |
| 2008/0298643 | A1 | 12/2008 | Lawther et al. |
| 2009/0091798 | A1 | 4/2009 | Lawther et al. |
| 2009/0156414 | A1 | 6/2009 | Harrison |
| 2009/0185723 | A1 | 7/2009 | Kurtz |
| 2009/0252423 | A1 | 10/2009 | Zhu et al. |
| 2010/0074465 | A1 | 3/2010 | Schneemann |
| 2010/0131525 | A1 | 5/2010 | Mahan, Jr. et al. |
| 2010/0142762 | A1 | 6/2010 | Morita |
| 2010/0172579 | A1 | 7/2010 | Reid et al. |
| 2010/0179874 | A1 | 7/2010 | Higgins et al. |
| 2010/0191541 | A1 | 7/2010 | Prokoski |
| 2010/0215271 | A1 | 8/2010 | Dariush et al. |
| 2010/0224140 | A1 | 9/2010 | Bareket et al. |
| 2010/0266159 | A1 | 10/2010 | Ueki et al. |
| 2010/0322507 | A1 | 12/2010 | Gunaratne |
| 2011/0064331 | A1* | 3/2011 | Andres del Valle ............... G06T 3/0093 382/308 |
| 2011/0136086 | A1 | 6/2011 | Saul et al. |
| 2011/0206246 | A1 | 8/2011 | Wolf et al. |
| 2011/0243416 | A1 | 10/2011 | Gregory et al. |
| 2011/0257507 | A1 | 10/2011 | Gregory et al. |
| 2012/0020518 | A1 | 1/2012 | Taguchi |
| 2012/0308121 | A1 | 12/2012 | Datta et al. |
| 2013/0039548 | A1 | 2/2013 | Nielsen et al. |
| 2014/0050384 | A1 | 2/2014 | Schmidt et al. |

FOREIGN PATENT DOCUMENTS

| | | | |
|---|---|---|---|
| WO | 2003048372 A2 | | 6/2003 |
| WO | WO -2010127023 A1 | * | 11/2010 |
| WO | WO-2010127023 A1 | | 11/2010 |
| WO | 2011063819 A1 | | 6/2011 |
| WO | WO -2011143711 A1 | * | 11/2011 |
| WO | WO-2011143711 A1 | | 11/2011 |

OTHER PUBLICATIONS

A new method—filter banks, Bregovic et al, IEEE, May 2000, pp. 639-642.*
Facial phenotypes—correlated with clinical phenotypes, Aldridge et al, Molecular autism, Oct. 14, 2011, pp. 1-9.*
Digital analysis—motion, Kirmizibayrak, TIJOVR, 2011, pp. 9-16.*
Head circumference—autism, Lainhart et al., AJOMG, Part A, 104A:2257-2274, 2006, pp. 225.*
Facial phenotypes—correlated with clinical phenotypes, Aldridge et al, Molecular autism, Oct. 14, 2011, pp. 1-9 (Year: 2011).*
Digital analysis-motion, Kirmizibayrak, Tijovr, 2011, pp. 9-16 (Year: 2011).*
Head circumference—autism, Lainhart et al., Ajomg, Part A, 104A:2257-2274, 2006, pp. 225 (Year: 2006).*
A new method—filter banks, Bregovic et al., IEEE, May 2000, pp. 639-642 (Year: 2000).*
Crystalinks. article. [online]. "Face Analysis Physiognomy," Oct. 18, 2006. [retrieved on Sep. 6, 2013]. Retrieved from the Internet: <URL: http://web.archive.org/web/20061018161604/http://www.crystalinks.com/facial_analysis.html>.
Moon, Sophia. article. [online]. "Do Your Facial. Features Determine Your Personality?" Jun. 26, 2007. [retrieved on Sep. 6, 2013]. Retrieved from the Internet: <URL: http://voices.yahoo.com/do-facial-features-determine-personality-401479.html>.
Fergus Kathleen. article. [online], "Features of Down syndrome: An Overview of the Features and Characteristics of People with Down Syndrome," Feb. 2, 2009. [retrieved on Sep. 6, 2013]. Retrieved from the Internet: <URL:http:web.archive.org/web/20090202055230/http://downsyndrome.about.com/od/featuresofdownsyndrom/a/featurelong_ro.htm>.
Taylor, Kimberly Hayes. article, [online]. "Autistic children have distinct facial features, study suggests." Oct. 21, 2011, [retrieved on Sep. 6, 2013], Retrieved from the Internet: <URL:http://www.nbcnews.com/health/autistic-children-distinct-facial-features-study-suggests-1C6436758?franchiseSlug=healthmain>.
Jaslow, Ryan. article, [online]. "Children with autism have distinct facial feature: Study." Mar. 26, 2012. [retrieved on Sep. 6, 2013]. Retrieved from the Internet: <URL:http://www.cbsnews.com/8301-504763_162-20123858-10391704/children-with-autism-have-distinct-facial-features-study>.
FAS Diagnostic & Prevention Network website. [online], FAS Facial Features: The 3 Diagnostic Facial Features of FAS, Feb. 3, 2005, [retrieved on Sep. 6, 2013]. Retrieved from the Internet; <URL:http://web.archive.org/web/20050203013623/http://depts.washington.edu/fasdpn/htmls/fas-face.htm>.
Trut, Lyudmila N, "Early Canid Domestication: The Farm-Fox Experiment," American Scientist, vol. 87 Mar.-Apr. 1999, pp. 165-169.
Kukekova, A.V. et al., "Fox Farm Experiment: Hunting for Behavioral Genes," Becmhuk BOTuC, vol. 12, No. 1/2, 2008, pp. 50-62.
University of Missouri. article. [online]. "Is it autism? Facial features that show disorder." Oct. 31, 2012.[retrieved on Sep. 6, 2013], Retrieved from the Internet: <URL:http://web.archive.org/web/20121031143726/http://www.cbsnews.com/2300-204-162-10009911.html>.
Firestone, P. and Peters, S., "Minor Physical Anomalies and Behavior in Children: A Review," J Autism Dev Disord., vol. 13, No. 4, 1983, pp. 411-425.
Ploeger, A. et al., "The Association Between Autism and Errors in Early Embryogenesis: What is the Causal Mechanism?" Biol Psychiatry, 2009, pp. 1-6, doi:10-1016/j.biopsych.2009.10.010 (downloaded from: http..www.sobp.org/journal).

(56) References Cited

OTHER PUBLICATIONS

Ozgen, HM et al., "Minor physical anomalies in autism: a meta-analysis," Molecular Psychiatry, 2008, pp. 1-8, doi:10.1038/mp.2008.75 (downloaded from: http://www.nature.com/mp).
Cheung, C. et al., "MRI Study of Minor Physical Anomaly in Childhood Autism Implicates Aberrant Neurodevelopment in Infancy." PLoS ONE, Jun. 2011, vol. 6, Issue 6, pp. 1-7, e20246 (downloaded from: http:www.plosone.org).
Deutsch, C. et al. Abstract. "Embryologically-Derived Measures of Dysmorphology Among AGRE Multiplex Autism Probands," International Meeting for Autism Research, 2011.
Wikipedia. website, [online]. Childhood Autism Rating Scale, Apr. 14, 2008. [retrieved on Sep. 6, 2013]. Retrieved from the Internet: <URL: http://web.archive.org/web/20080414094636/http://en.wikipedia.org/wiki/Childhood_Autism_Rating_Scale>.
International Search Report of Korean Intellectual Property Office as International Searching Authority for PCT/US2012/037103 dated Dec. 28, 2012.
International Search Report of Korean Intellectual Property Office as International Searching Authority for PCT/US2013/064178 dated Mar. 26, 2013.
Angkustsiri, et al., "Minor Physical Anomalies in Children with Autism Spectrum Disorders," Autism 2011, pp. 746-760.
Rodier, et al., "Minor Malformations and Physical Measurements in Autism: Data from Nova Scotia," Teratology 55:319-325 (1997).
Hardan, et al., "An MRI Study of Minor Physical Anomalies in Autism," J Autism Dev Disord (2006) 36:607-611.
Tripi, et al., "Minor physical anomalies in children with autism spectrum disorder," Early Human Development (2008) 84, pp. 217-223.
U.S. Appl. No. 13/467,869, filed May 9, 2012, Pending.
U.S. Appl. No. 13/467,889, filed May 9, 2012, Pending.
U.S. Appl. No. 13/672,612, filed Nov. 8, 2012, Pending.
U.S. Appl. No. 13/672,627, filed Nov. 8, 2012, Pending.
U.S. Appl. No. 13/672,657, filed Nov. 8, 2012, Pending.
Santos, et al. "Using Nonlinear Models to Describe Height Growth Curves in Pantaneiro Horses." Pesq. agropec. bras .. 34.7 (1999): 1133-1138. Print.
Randle, et al. "The Relationship Between Facial Hair Whorls and Temperament in Lundy Ponies." Rep. Lundy Field Soc .. 52. (2002): 67-83. Print.
Cowboy, Maverick. "Hair Whorls and Temperament." The Comboy & Horse Insider. N.p., Jun. 12, 2009. Web. Jul. 26, 2014. <http://cowboytech. b logs pot. co m/2009/06/h air -whorls-and-temperament. htm l>.
Carre, et al. "In your face: facial metrics predict aggressive behavior in laboratory and in varsity and professional hockey players." Proc. R. Soc. B. 275. (2008): 2651-2656. Print.
Tomkins, et al. "Hair Whorls in the Dog (*Canis familiaris*). I. Distribution." Anatomical Record. 293. (2010): 338-350. Print.
Bates, Claire, Wider eyes and broader mouth: Scientists identify subtle distinct facial characteristics of children with autism, Mail online, Oct. 26, 2011, pp. 1-6.
NZ Examination Report, In't Property Office of New Zealand, Jun. 23, 2014, 3 pages.
Kamenskaya, E., et al, Recognition of Psychological Characteristics From Face, Metody Informatyki Stosowanej, nr 1/2008, p. 59-73.
Aldridge et al, Facial Phenotypes in Subgroups of Prepubertal Boys With Autism Spectrum Disorders Are Correlated With Clinical Phenotypes, Molecular autism, Oct. 14, 2011, pp. 1-9.
Kirmizibayrak, Digital Analysis and Visualization of Swimming Motion, The Int'l Journal of Virtual Reality, 2011, pp. 9-16.
Bregovic et al, A New Method for the Design of Two-Channel Perfect-Reconstruction Linear-Phase Fir Filter Banks, IEEE, May 2000, pp. 639-642.
R. Bregovic, et al., "A New Method for the Design of Two-Channel Perfect-Reconstruction Linear-Phase Fir Filter Banks", Proc. IEEE Int. Symp. Circuits Syst., Geneva, Switzerland, May 2000, vol. 1, pp. 639-642.
C. Kirmizibayrak, et al., "Digital Analysis and Visualization of Swimming Motion", The International Journal of Virtual Reality, 2011, 10(3); pp. 9-16.
"Automated Facial Action Coding System for Dynamic Analysis of Facial Expressions in Neuropsychiatric Disorders," Hamm et al. , J Neurosci Methods, Sep. 15, 2011, 200(2): 237-256, http://www.ncb.nlm/nih/gov/pmc/articles/PMC3402717/.
"Take the Pet Personals quiz to find real pets that fit your lifestyle" by Joan, published Mar. 8, 2010 at https://www.petfinder.com/blog/2010/03/find_your_furkeeps_soul_mate_w/.
Aldridge et al., "Facial phenotypes in subgroups of prepubertal boys with autism spectrum disorders are correlated with clinical phenotypes," Molecular Autism 2011, vol. 2(15), pp. 1-12.

* cited by examiner

IMAGE ANALYSIS FOR DETERMINING CHARACTERISTICS OF HUMANS

CROSS-REFERENCE TO RELATED APPLICATIONS

This application claims the priority of U.S. Provisional Application Ser. No. 61/484,126, entitled "Image Analysis for Determining Characteristics of Animals," which was filed May 9, 2011 and is incorporated herein by reference. This application also claims the priority of U.S. Provisional Application Ser. No. 61/616,234, entitled "Image Analysis for Determining Characteristics of Animals," which was filed Mar. 27, 2012 and is incorporated herein by reference.

TECHNICAL FIELD

The disclosure herein relates to the objective determination of a characteristic of an animal or human by applying computational methods to one or more images of the animal or human to generate one or more metrics indicative of the characteristic of interest. It also relates to the pairing of animals and humans that are better suited to work together.

BACKGROUND

Animal domestication can be thought of as developing a mutually useful relationship between animals and humans. Over the past 12,000 years, humans have learned to control their access to food and other necessities of life by changing the behaviors and natures of wild animals. All of today's domesticated animals—including dogs, cats, cattle, oxen, llamas, sheep, goats, camels, geese, horses, chickens, turkeys, and pigs—started out as wild animals but were changed over the centuries and millennia into animals that are tamer, quieter, and generally more cognitively suited to a lifestyle of coexistence with humans. Today people benefit from domesticated animal in many ways including keeping cattle in pens for access to milk and meat and for pulling plows, training dogs to be guardians and companions, teaching horses to adapt to the plow or take a rider, and changing the lean, nasty wild boar into the fat, friendly pig.

When individuals are looking to breed animals, they look for certain traits in purebred stock that are valued for a particular purpose, or may intend to use some type of crossbreeding to produce a new type of stock with different, and, it is presumed, superior abilities in a given area of endeavor. For example, to breed chickens, a typical breeder intends to receive eggs, meat, and new, young birds for further reproduction. Thus, the breeder has to study different breeds and types of chickens and analyze what can be expected from a certain set of characteristics before he or she starts breeding them. On the other hand, purebred breeding aims to establish and maintain stable traits that animals will pass to the next generation. By "breeding the best to the best," employing a certain degree of inbreeding, considerable culling, and selection for "superior" qualities, one could develop a bloodline superior in certain respects to the original base stock.

As first noted by Charles. Darwin, domesticated animals are known to share a common set of physical characteristics, sometimes referred to as the domestication phenotype. C. Darwin, THE VARIATION OF ANIMALS AND PLANTS UNDER DOMESTICATION ($2^{nd}$ ed.) (New York: D. Appleton & Co., 1883). They are often smaller, with floppier ears and curlier tails than their untamed ancestors. Their coats are sometimes spotted while their wild ancestors' coats are solid. One long-term study demonstrating this phenomenon has been ongoing since 1958 at the Institute of Cytology and Genetics in Novosibirsk, Russia. In this study, scientists have successfully demonstrated that, through careful selective breeding for tamability, wild Siberian silver foxes acquire both the behavioral and appearance traits of domesticated dogs. See, e.g., L. Trut, *Early Canid Domestication: The Fox Farm Experiment,* 87 AMERICAN SCIENTIST 160-69 (March-April 1999). This highly conserved combination of psychological and morphological changes during the process of domestication is seen to varying degrees across a remarkably wide range of species, from horses, dogs, pigs, and cows to some non-mammals like chickens and even a few fish. However, in no other species has this relationship between behavior and anatomical features been more widely noted than in the horse.

The partnership between human and horse is among the earliest bonds formed between mankind and the animal world. Archeological findings estimate that horses have been domesticated for approximately 5,500 years, and throughout this extended relationship these two cohabitating species have certainly left a mark on one another. Few major civilizations exist in pre-modern history, that did not make use of the horse's strength and speed for survival and economic prosperity. As a result of this dependence, centuries of selective breeding have seen mankind gradually reshape the horse from the form of its wild forbearers into the athletic and reliable working partner that we know today. The value that early breeders placed on physical attributes such as size, color, and build varied greatly by region largely as a product of differing climates, terrains, and lifestyles. However, all early horsemen placed special emphasis on breeding for horses cognitively capable of thriving in a human environment and working relationship. It was from this early focus on behavioral characteristics in the development, of the domesticated horse that the practice of relating physiological aspects of the equine face to aspects personality was first derived. From the earliest mentions in the ancient Bedouin breeding books of 300 B.C., to the extensive facial analysis techniques of the Gypsy tribes of eighteenth-century Russia, nearly every major equestrian culture in history has recognized a relationship between physiological features of the equine face and innate traits of personality. Even amongst the many technological and scientific advancements of the modern era, today's multi-billion dollar horse industry has still held fast to many of its long-standing traditions and customs, including the use of facial analysis techniques to predict equine personality and trainability.

Relationships also exist in humans between physiological feature sets (i.e., phenotypes) and certain cognitive functions and/or personality traits. During progressive stages of human embryonic growth, development of the brain and face remains intimately connected through both genetic signaling and biomechanical/biochemical mechanisms. The face develops from populations of cells originating from the early neural crest, with cells from the neural tube gradually shifting to form the prominences of the face. Differentiation of these early cells is closely regulated through intricate genetic signaling mechanisms, with the brain essentially serving as the platform on which the face grows. As these two structures continue to grow and develop during the later embryonic stages, their phenotypes remain closely linked as complex genetic hierarchies regulate patterns of cross talk between molecules, cells, and tissues.

SUMMARY

Embodiments comprise a method for measuring an animal to determine one or more characteristics of the animal, comprising receiving one or more digital images representing said animal, storing the images in a computer memory, adding a plurality of reference points to the stored digital images, and computing one or more metrics relating to the characteristic of the animal using the reference points. Other embodiments comprise a method for determining a characteristic of an animal based on a set of metrics related to the animal, comprising selecting one or more metrics from the set of metrics, calculating a combined metric using the selected metrics, and determining the characteristic of the animal based on the value of the combined metric. Other embodiments comprise computer systems that implement one or more of the above methods.

Other embodiments comprise methods and systems that can be used to predict certain characteristics of humans, including certain human cognitive or developmental disorders. The methods include measurements of facial features and the use of such measurements in computations. Other embodiments pair humans and animals based on characteristics and/or various types of suitability, for example suitability to work or perform a certain task together.

Other embodiments include a method for predicting a characteristic of a type of animal comprising, for each of a plurality of individual animals of the type, storing one or more digital images representing the individual animal in a memory operably connected to a digital computer; annotating the one or more digital images with a plurality of reference points; associating at least one other data value about the individual animal with the one or more digital images representing the individual animal; computing, with the digital computer, one or more metrics using the plurality of reference points. The method further comprises selecting a combination of the one or more metrics for predicting the characteristic of the animal. In some embodiments, the selecting step further comprises determining one or more relationships between the one or more metrics and the at least one other data value for the plurality of individual animals and the combination is selected based on the one or more relationships. Other embodiments comprise systems and computer-readable media embodying these methods.

Other embodiments include a method for determining a characteristic of an animal based on one or more metrics related to the animal, comprising storing one or more digital images representing the animal in a memory operably connected to a digital computer; annotating the one or more digital images with a plurality of reference points; computing, with the digital computer, the one or more metrics using the plurality of reference points; and predicting the characteristic of the animal based on the one or more metrics. In some embodiments, the predicting step further comprises computing a combined metric based on a predetermined function of the one or more metrics and predicting the characteristic based on the combined metric. Other embodiments comprise systems and computer-readable media embodying these methods.

Other embodiments include a method for predicting one or more characteristics of a group of animals of the same type comprising, for each of the individual animals within the group, storing one or more digital images representing the individual animal in a memory operably connected to a digital computer; annotating the one or more digital images with a plurality of reference points; computing, with the digital computer, one or more metrics using the plurality of reference points; and predicting one or more characteristics of the individual animal based on the one or more metrics. The method further comprises predicting the one or more characteristics of the group of animals based on the predicted one or more characteristics of the individual animals comprising the group. Some embodiments further comprise determining a strategy for maintaining or managing the group of animals based on the predicted one or more characteristics of the group of animals. Some embodiments further comprise computing one or more combined metrics, each based on a predetermined function of the one or more metrics, and predicting the one or more characteristics of the individual animal based on the one or more combined metrics. Other embodiments comprise systems and computer-readable media embodying these methods.

Other embodiments include a method for determining a characteristic of a human or animal subject, comprising calculating two or more ratios based upon metrics related to a subject's head, wherein distances or angles between reference points on the subject's head are used; predicting, using a computer and computations, a characteristic of the subject wherein the two or more ratios are used and wherein data about a group of subjects are referenced; and providing the predicted characteristic to an output device. Other embodiments comprise systems and computer-readable media embodying these methods.

Other embodiments include a method for determining a characteristic of a person based on one or more metrics related to the person, comprising storing one or more digital images representing the person in a memory operably connected to a digital computer; annotating the one or more digital images with a plurality of reference points; computing, with the digital computer, the one or more metrics using the plurality of reference points; and predicting the characteristic of the person based on the one or more metrics. Other embodiments comprise systems and computer-readable media embodying these methods.

Other embodiments include a method for choosing a combination of a person and an animal for a particular task, comprising computing one or more metrics related to the person; computing one or more metrics related to each of a plurality of animals; computing a combination characteristic related to the combination of the person with each of the plurality of animals, based on at least a portion of the one or more metrics related to the person and at least a portion of the one or more metrics related to each of the plurality of animals; and determining the combination of the person and one of the plurality of animals based on the computed combination characteristics. Other embodiments comprise systems and computer-readable media embodying these methods.

Other embodiments include a method for choosing a combination of a person and an animal for a particular task, comprising computing one or more metrics related to the animal; computing one or more metrics related to each of a plurality of persons; computing a combination characteristic related to the combination of the animal with each of the plurality of persons, based on at least a portion of the one or more metrics related to the animal and at least a portion of the one or more metrics related to each of the plurality of persons; and determining the combination of the animal and one of the plurality of persons based on the computed combination characteristics. Other embodiments comprise systems and computer-readable media embodying these methods.

DESCRIPTION OF THE DRAWINGS

The detailed description will refer to the following drawings, wherein like numerals refer to like elements, and wherein.

DETAILED DESCRIPTION

Figure 1C:
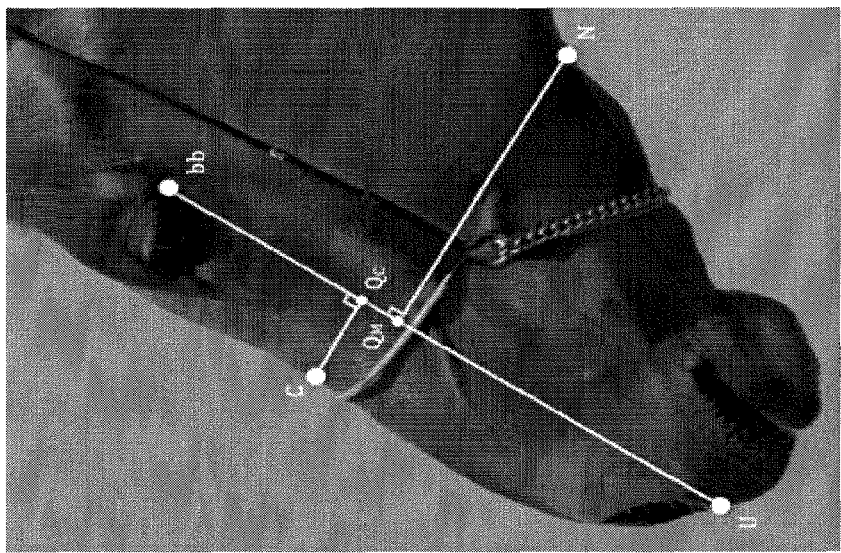
FIG. 1C shows facial description measurement AR01_Face Thickness Proportion.
Figure 1B:
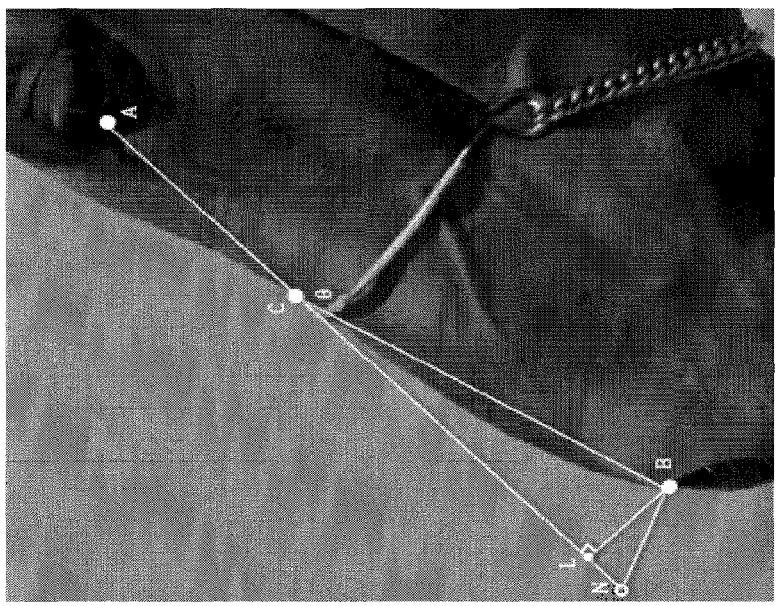
FIG. 1B shows facial description measurement AR01_Degree of Nose Rounding.
Figure 1A:
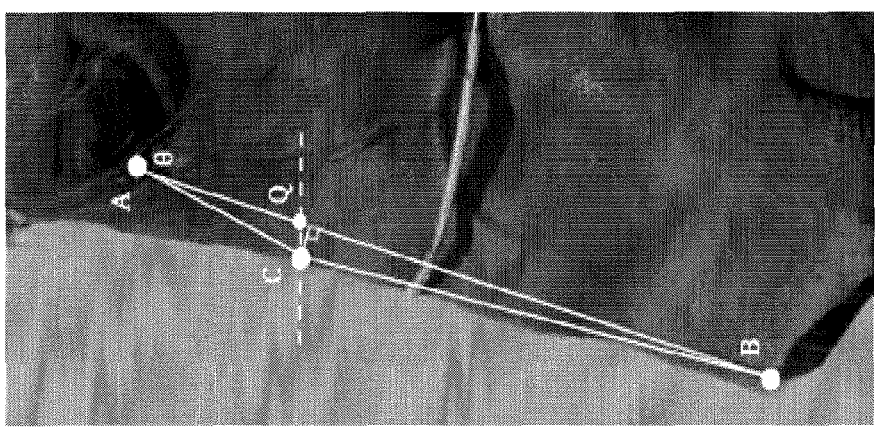
FIG. 1A shows facial description measurement AR01_Degree of Facial Inflexion.
Figure 1F:
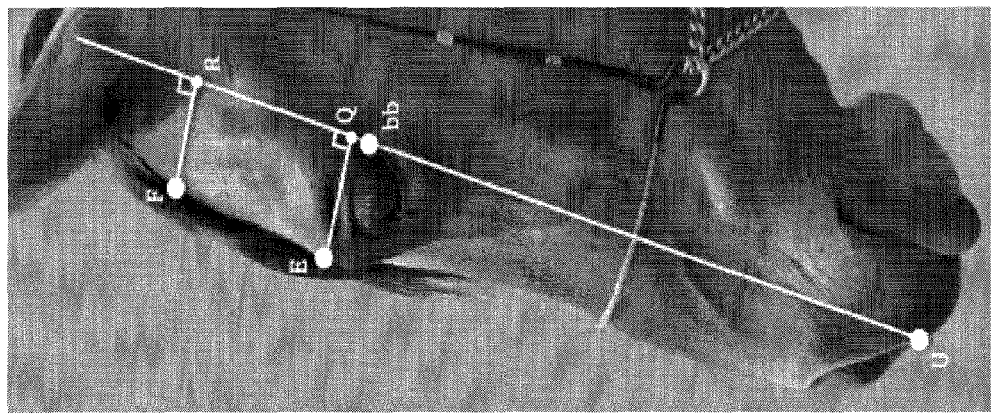
FIG. 1F shows facial description measurement AR01_Forehead Length Proportion.
Figure 1E:
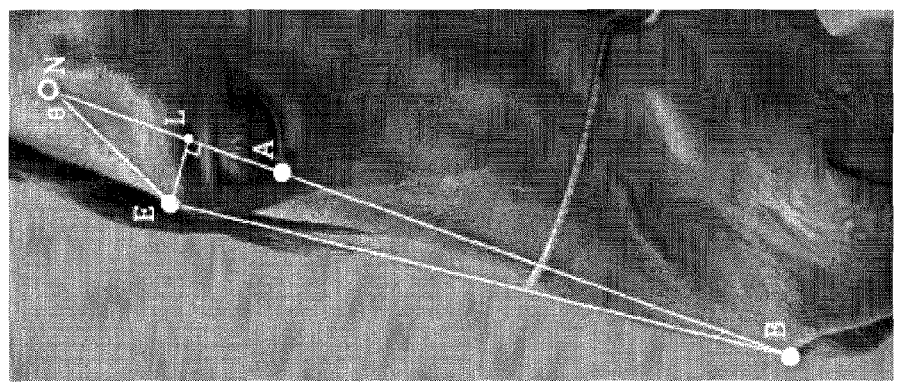
FIG. 1E shows facial description measurement AR01_Forehead Height Proportion.
Figure 1D:
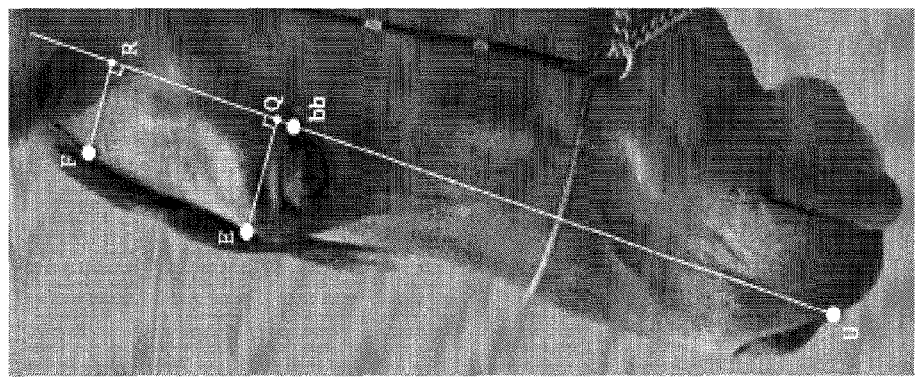
FIG. 1D shows facial description measurement AR01_Forehead Slope Proportion.
Figure 1J:
FIG. 1J shows facial description measurement AR01_Nostril Position Proportion.
Figure 1H:
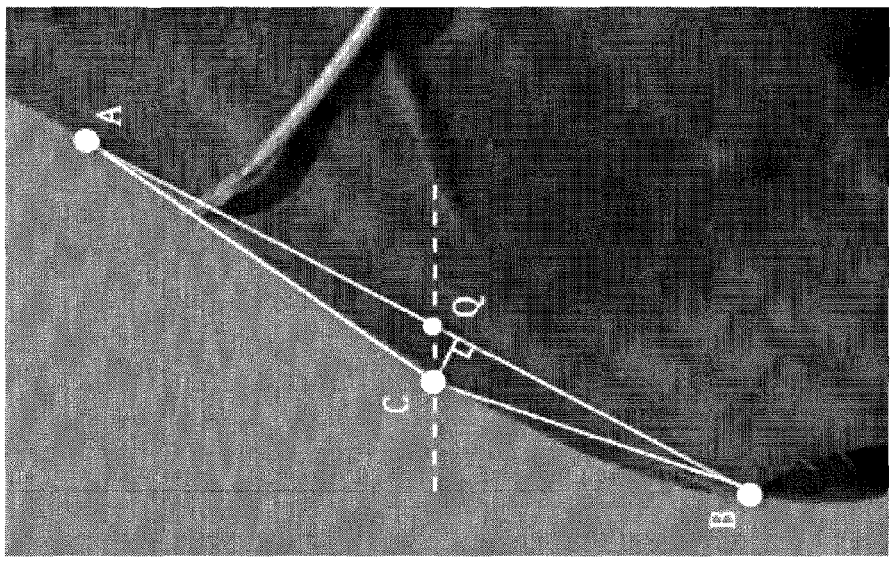
FIG. 1H shows facial description measurement AR01_Nose Roundness Proportion.
Figure 1G:
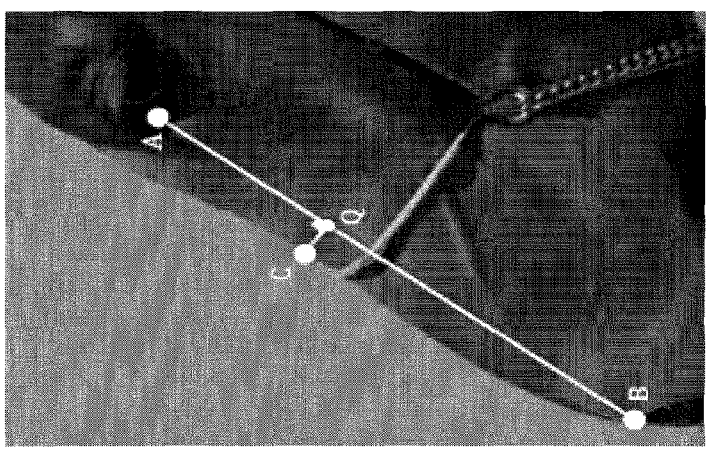
FIG. 1G shows facial description measurement AR01_Nose Length Proportion.
Figure 3A:
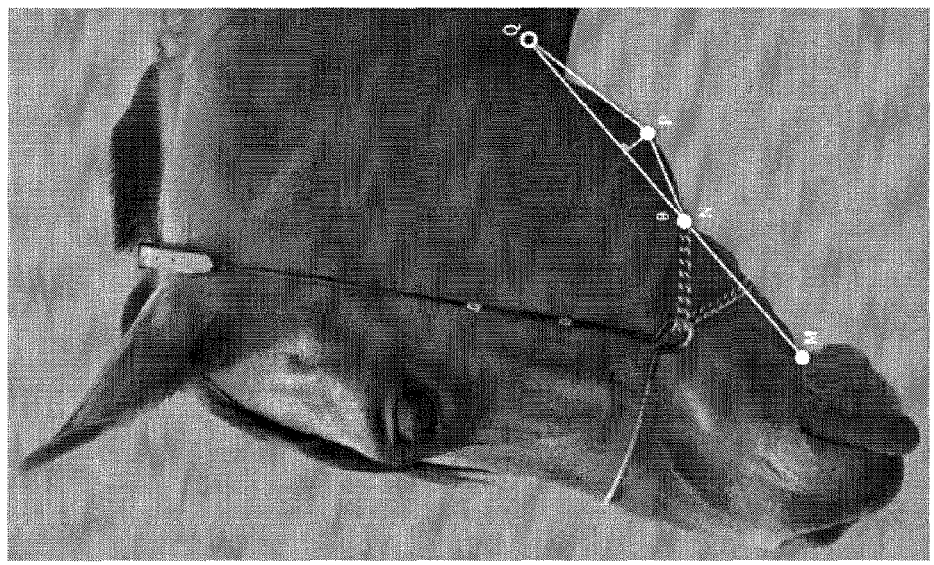
FIG. 3A shows facial description measurement AR03_Jowl Protuberance Proportion.
Figure 2:
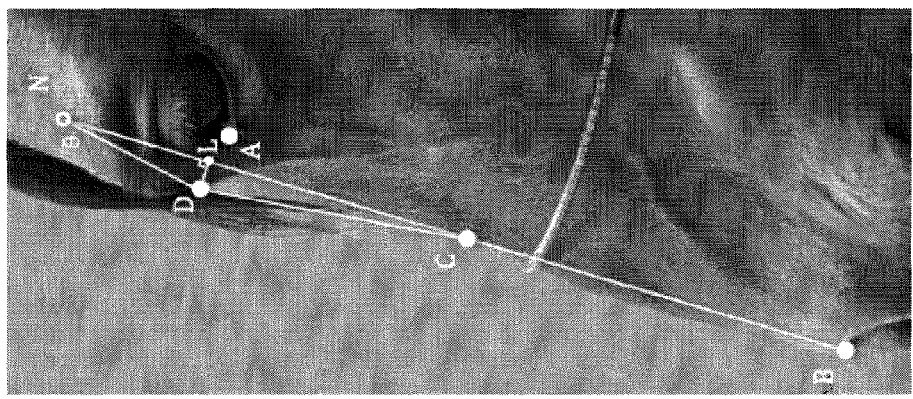
FIG. 2 shows facial description measurement AR02_Degree of Facial Protuberance.
Figure 1K:
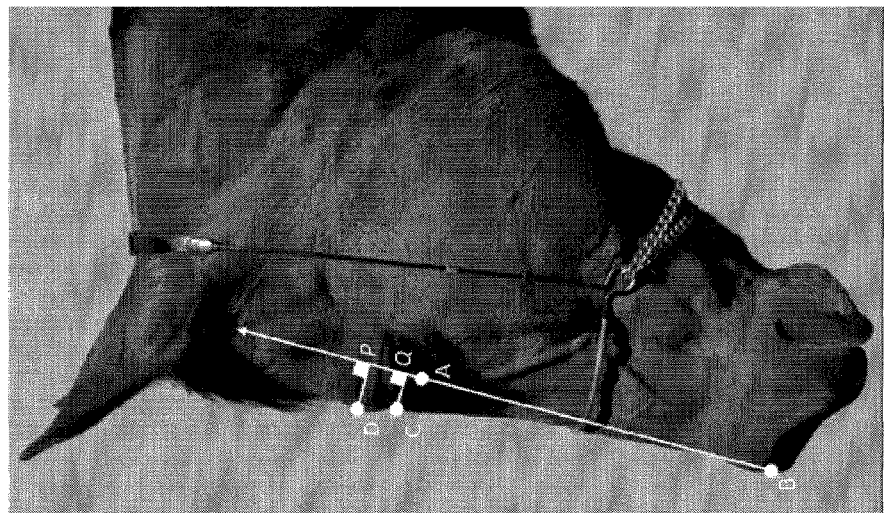
FIG. 1K shows facial description measurement AR01_Degree of Eye Orbital Protrusion.
Figure 4A:
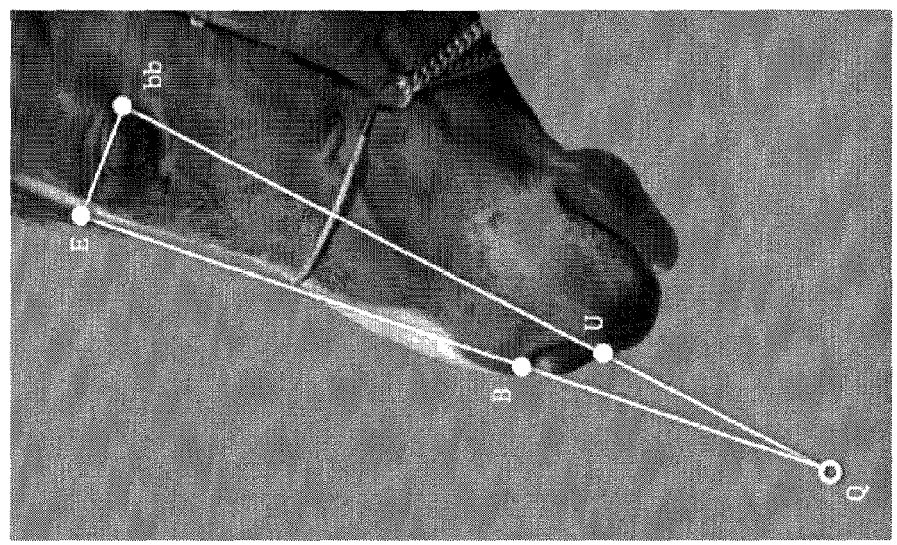
FIG. 4A shows facial description measurement AR04_Forehead Height Angle
Figure 3C:
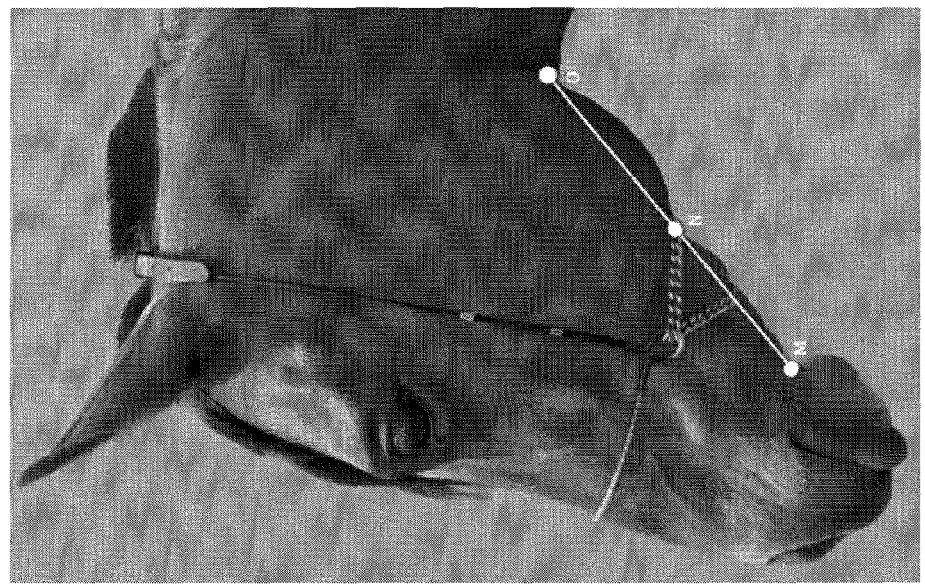
FIG. 3C shows facial description measurement AR03_Jowl-to-Underline Proportion.
Figure 3B:
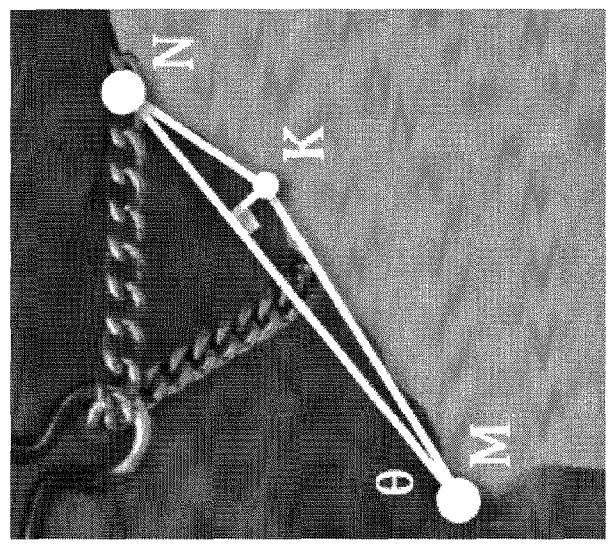
FIG. 3B shows facial description measurement AR03_Jowl Roundness Proportion.
Figure 4B:
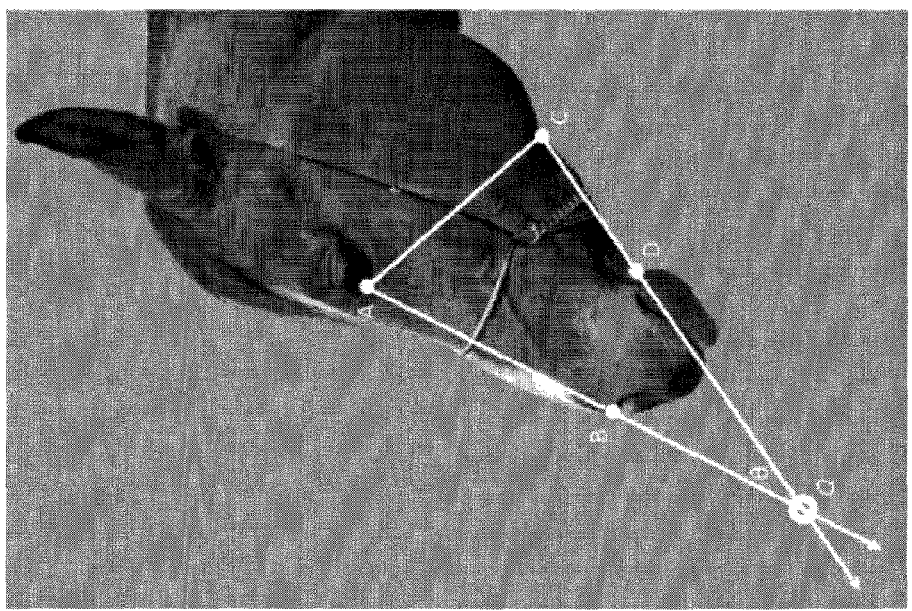
FIG. 4B shows facial description measurement AR04_Full Angle Face.
Figure 4C:
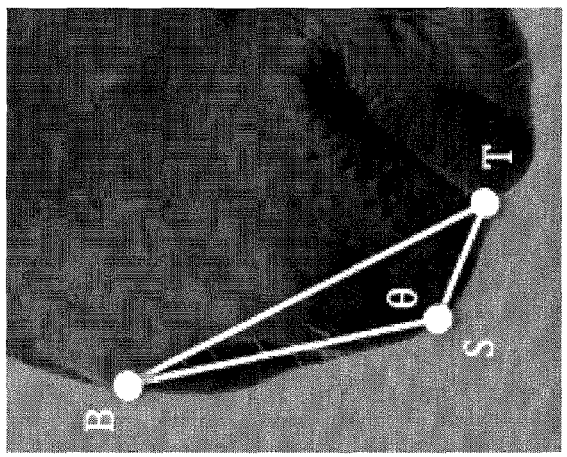
FIG. 4C shows facial description measurement AR04_Mouth Inflexion Angle.
Figure 4D:
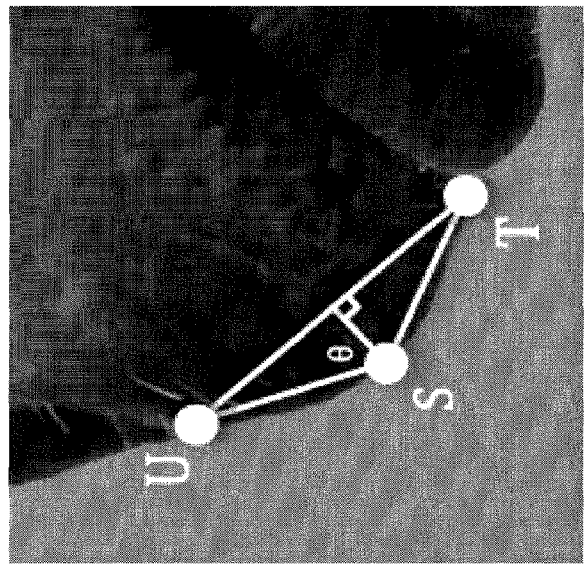
FIG. 4D shows facial description measurement AR04_Muzzle Roundness Proportion.
Figure 5A:
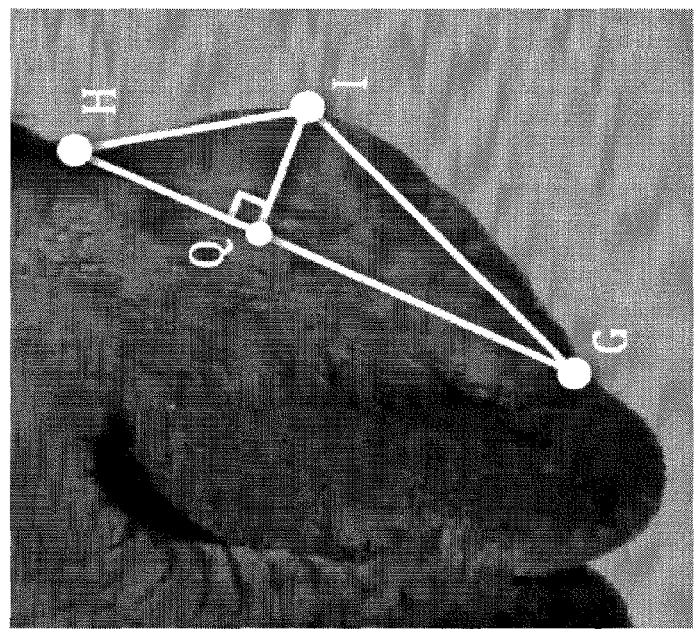
FIG. 5A shows facial description measurement AR05_Chin Firmness Proportion.
Figure 4F:
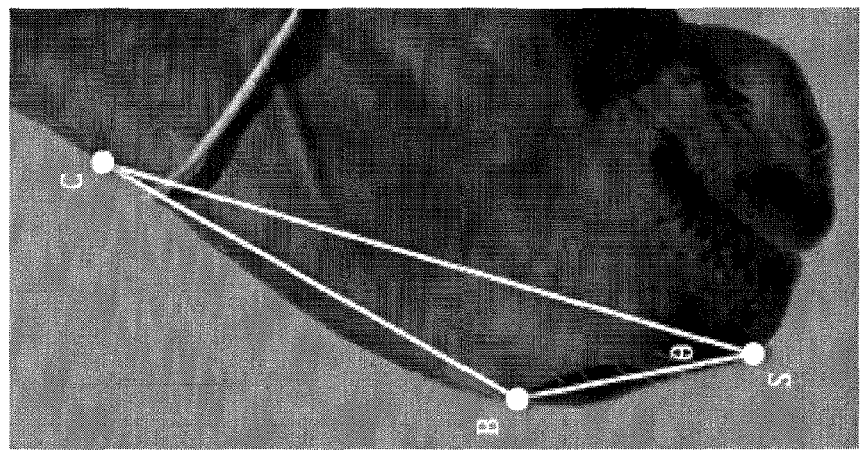
FIG. 4F shows facial description measurement AR04_Muzzle Slope Angle.
Figure 4E:
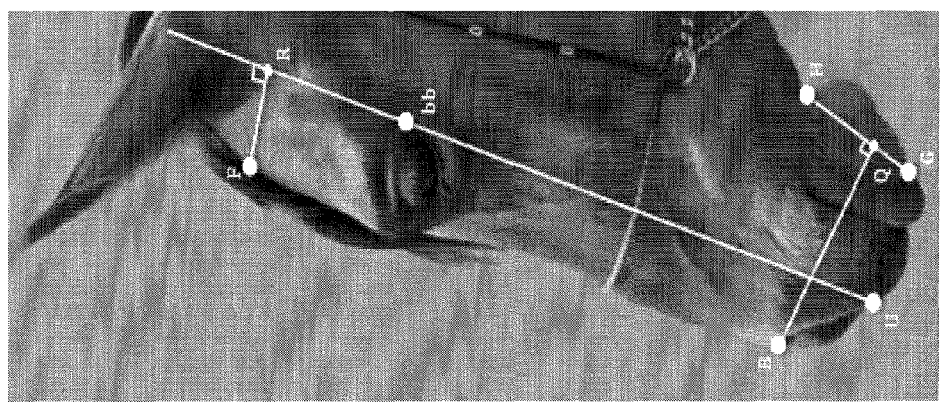
FIG. 4E shows facial description measurement AR04_Muzzle Size Proportion.
Figure 5D:
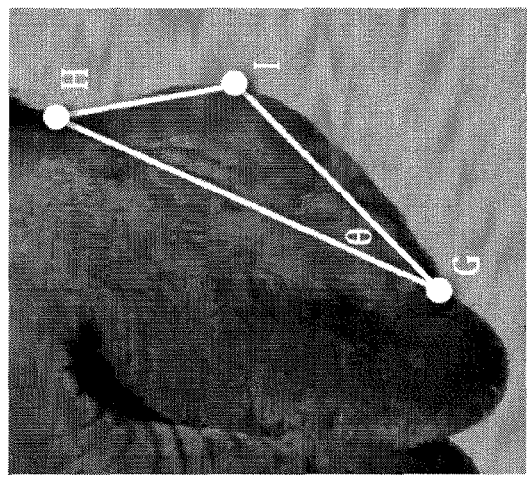
FIG. 5D shows facial description measurement AR05_Chin Thickness Angle.
Figure 5C:
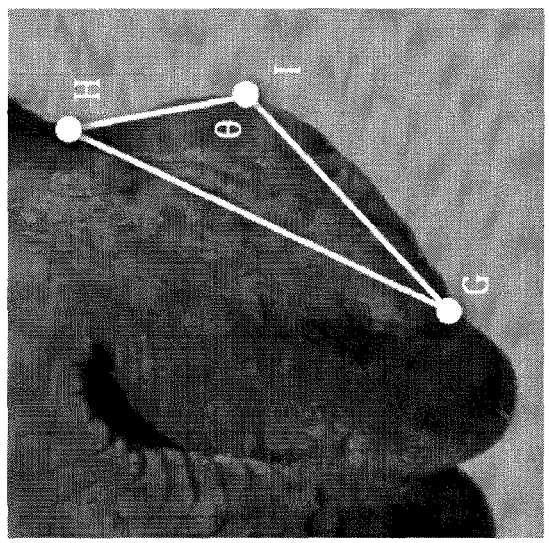
FIG. 5C shows facial description measurement AR05_Chin Length Angle.
Figure 5B:
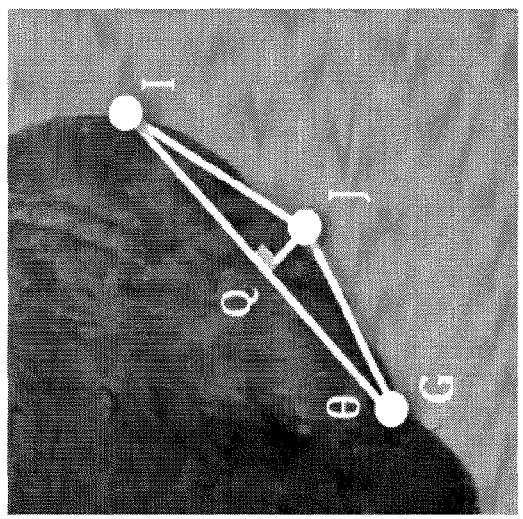
FIG. 5B shows facial description measurement AR05_Chin Fullness Proportion.
Figure 6A:
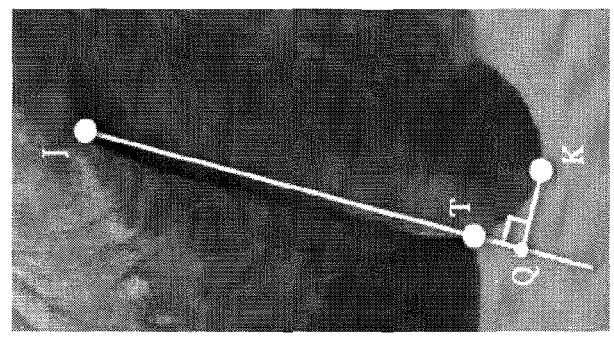
FIG. 6A shows facial description measurement AR06_Lip Protuberance Proportion.
Figure 5F:
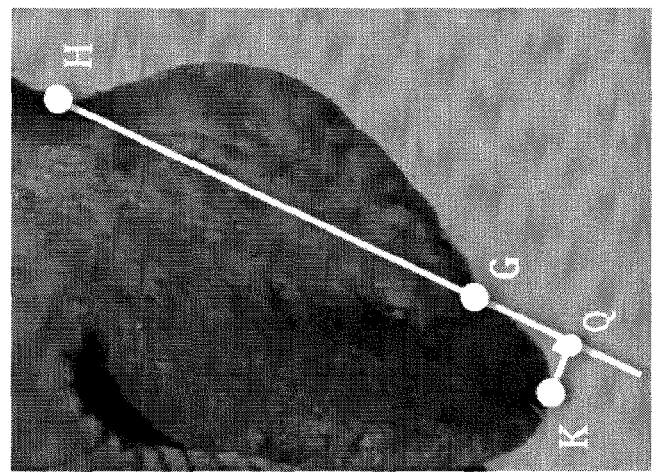
FIG. 5F shows facial description measurement AR05_Lip Length Proportion.
Figure 5E:
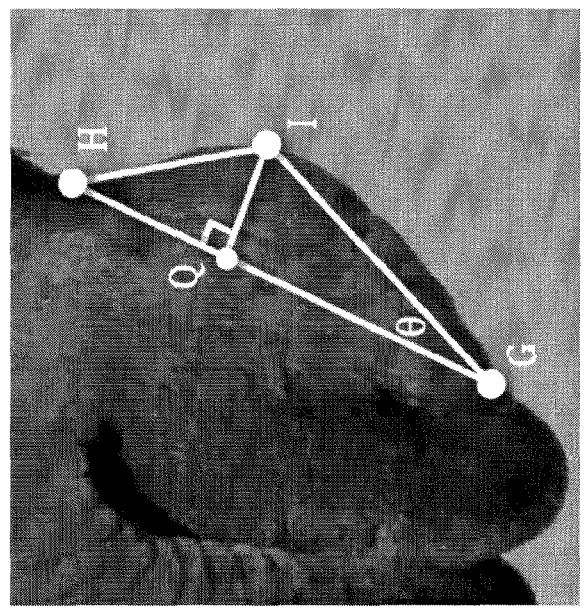
FIG. 5E shows facial description measurement AR05_Chin Width-to-Height Proportion.
Figure 7B:
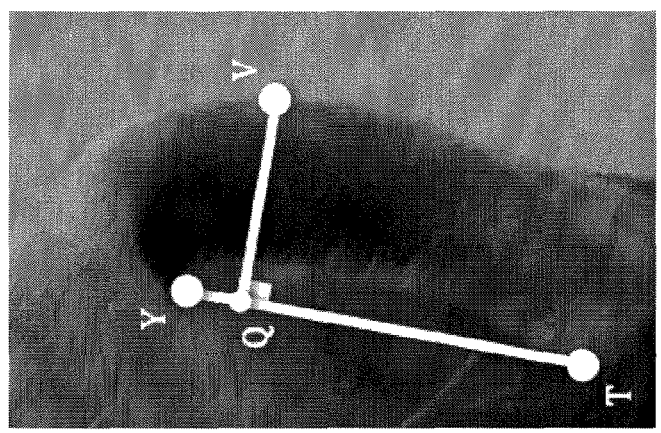
FIG. 7B shows facial description measurement AR07_Degree of Nostril Roundness.
Figure 7A:
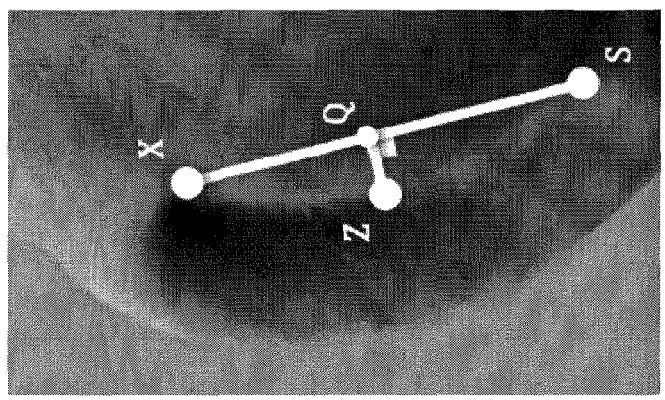
FIG. 7A shows facial description measurement AR07_Degree of Nostril Flutedness.
Figure 6B:
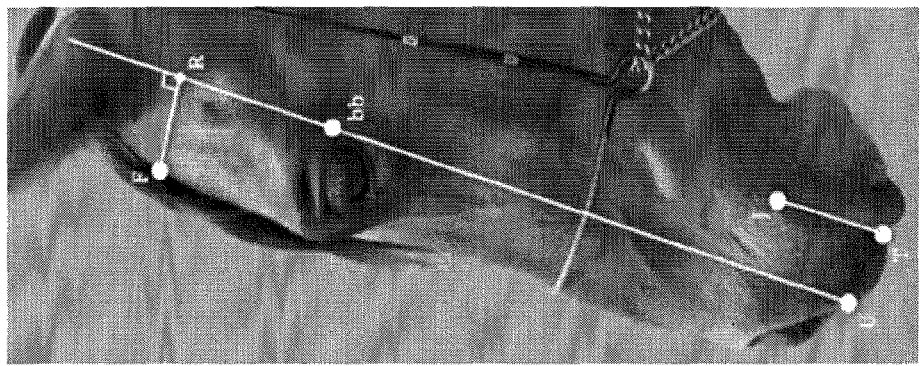
FIG. 6B shows facial description measurement AR06_Mouth Length Proportion.
Figure 7F:
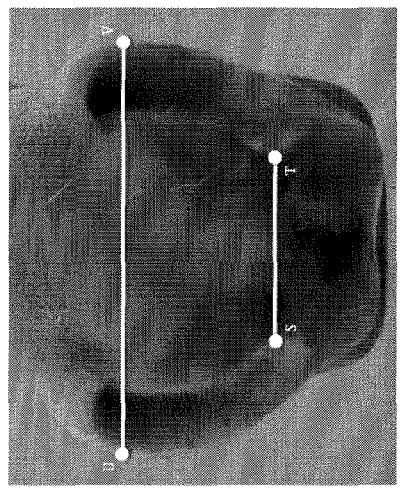
FIG. 7F shows facial description measurement AR07_Nostril Width Proportion.
Figure 8:
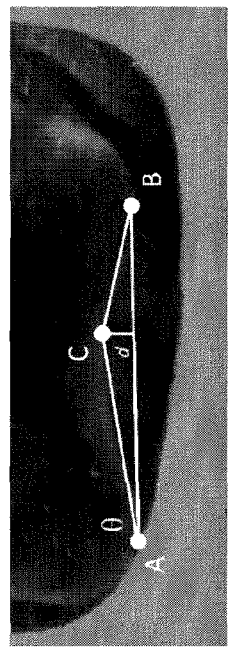
FIG. 8 shows facial description measurement AR08_Degree of Lip Inflexion.
Figure 7E:
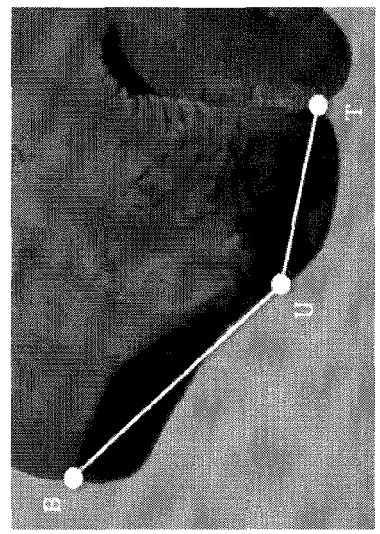
FIG. 7E shows facial description measurement AR07_Nostril Length Proportion.
Figure 7C:
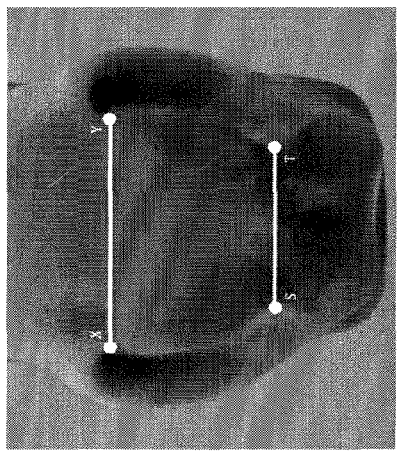
FIG. 7C shows facial description measurement AR07_Inner Nostril Convergence Proportion.
Figure 7D:
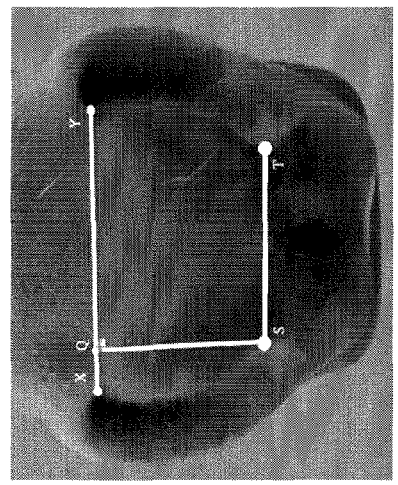
FIG. 7D shows facial description measurement AR07_Nose Width-to-Height Proportion.
Figure 9D:
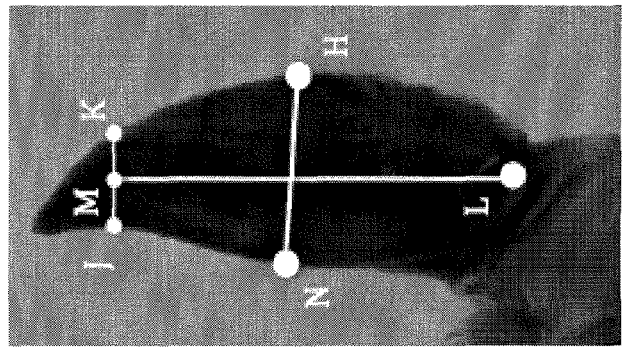
FIG. 9D shows facial description measurement AR09_Ear Width-to-Breadth Proportion.
Figure 9C:
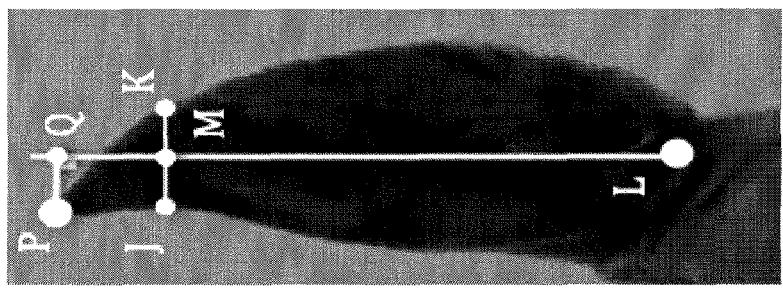
FIG. 9C shows facial description measurement AR09_Ear Roundness Proportion.
Figure 9B:
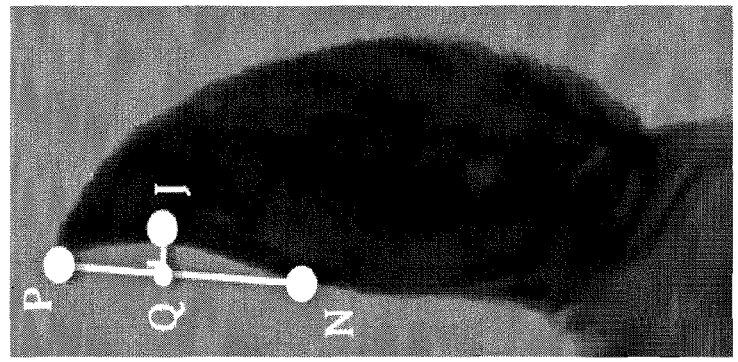
FIG. 9B shows facial description measurement AR09_Ear Inflexion Proportion.
Figure 9A:
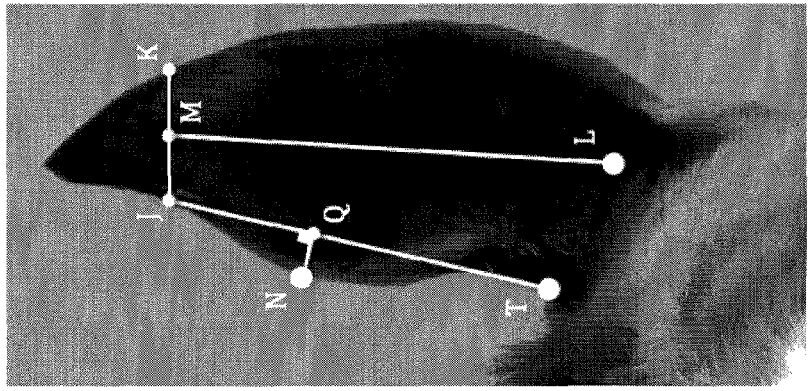
FIG. 9A shows facial description measurement AR09_Degree of Ear Flare.
Figure 10B:
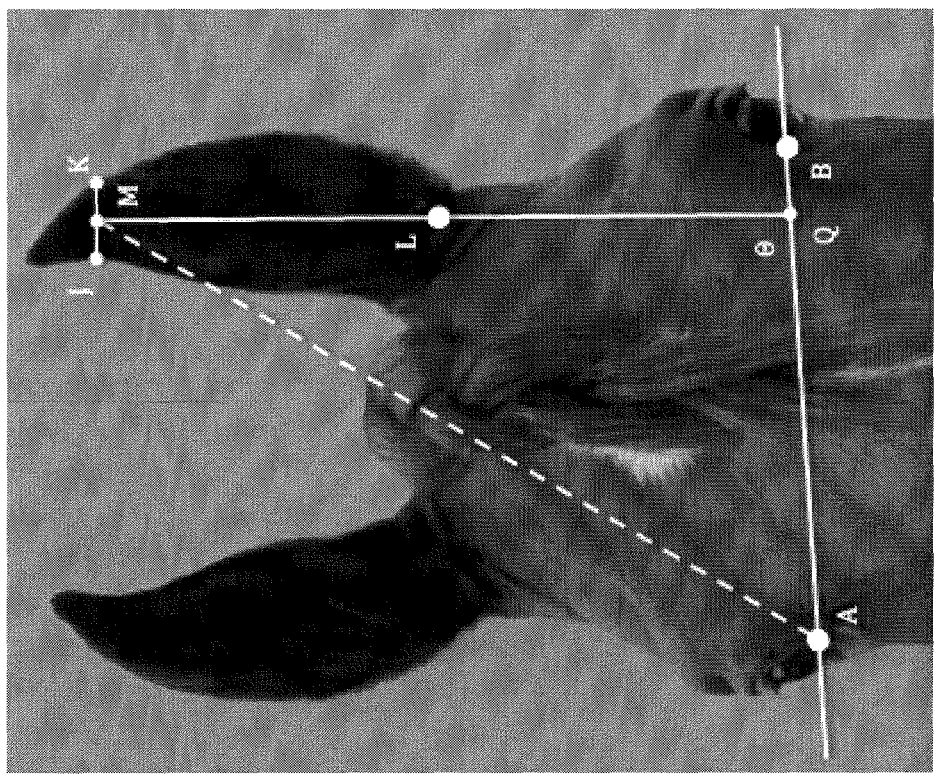
FIG. 10B shows facial description measurement AR10_Ear Set Angle.
Figure 10A:
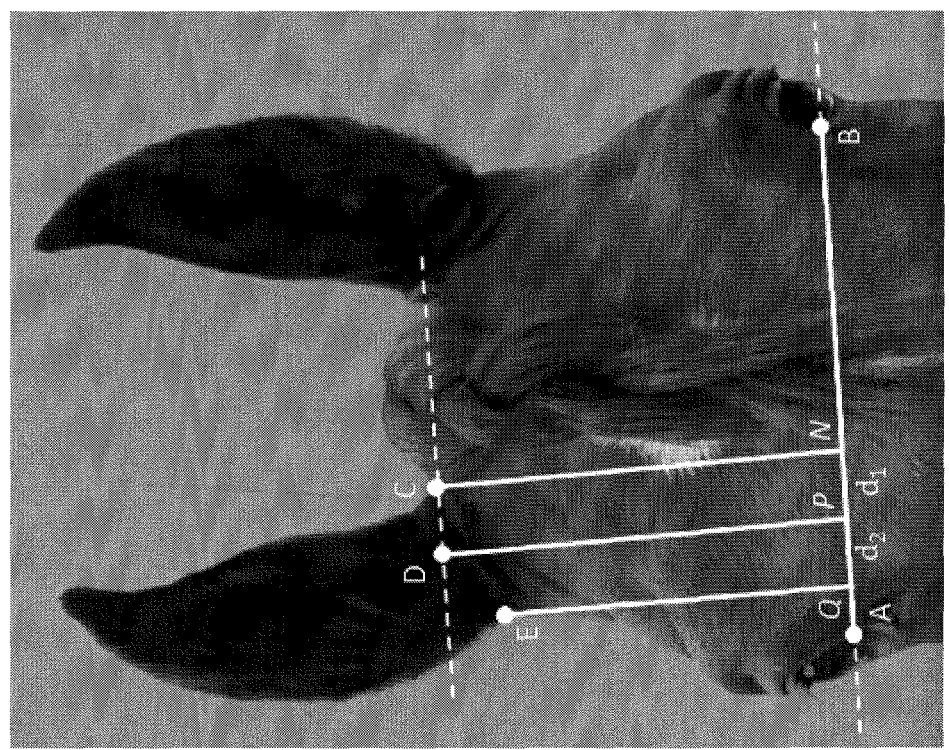
FIG. 10A shows facial description measurement AR10_Ear Rotation Proportion.
Figure 11E:
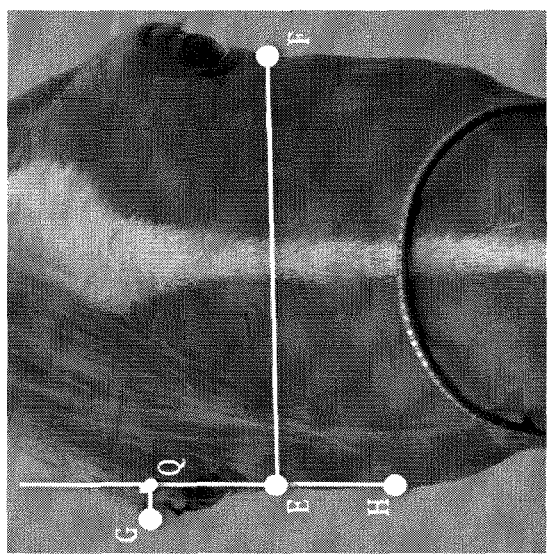
FIG. 11E shows facial description measurement AR11_Eye Orbital Lateral Protuberance Proportion.
Figure 11F:
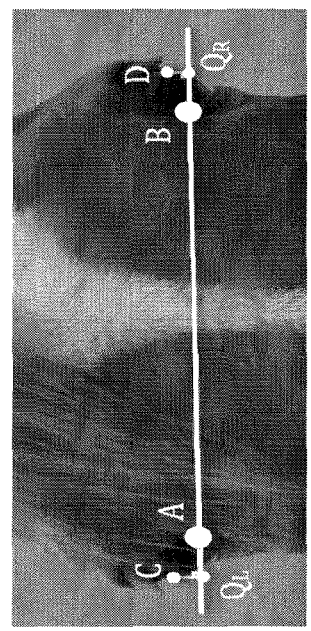
FIG. 11F shows facial description measurement AR11_Eye Protuberance Proportion.
Figure 11C:
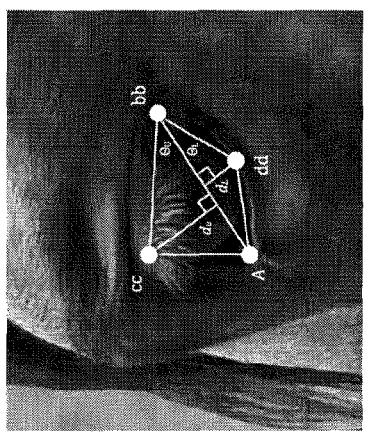
FIG. 11C shows facial description measurement AR11_Eye Height-to-Length Proportion.
Figure 11D:
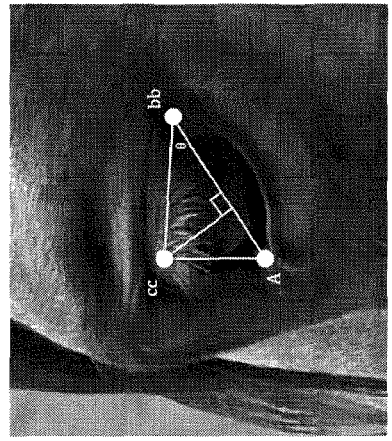
FIG. 11D shows facial description measurement AR11_Eye Height Proportion.
Figure 11A:
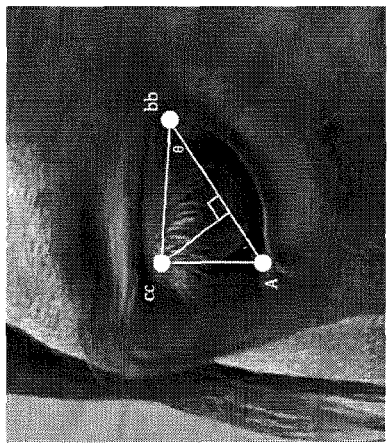
FIG. 11A shows facial description measurement AR11_Eye Height Proportion.
Figure 11B:
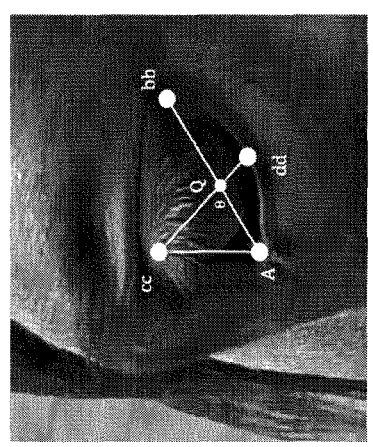
FIG. 11B shows facial description measurement AR11_Eye Extrema Intersect Angle.
Figure 11J:
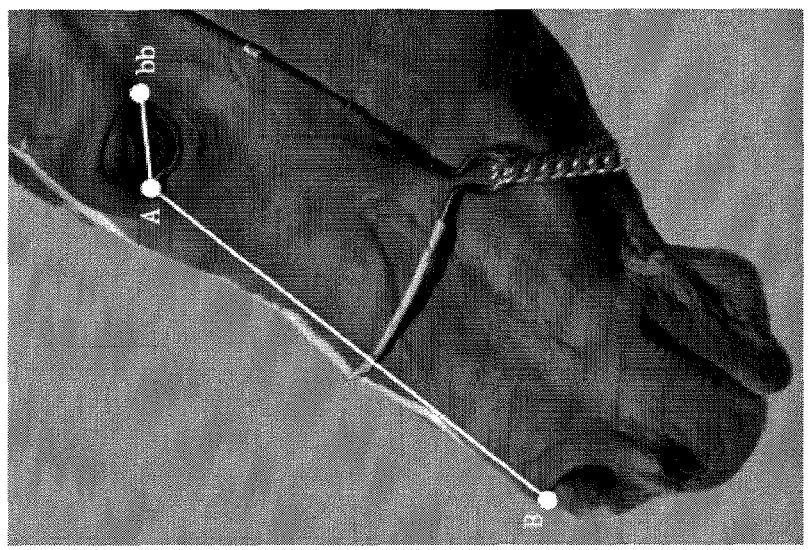
FIG. 11J shows facial description measurement AR11_Eye Size Proportion$_{Length}$.
Figure 11H:
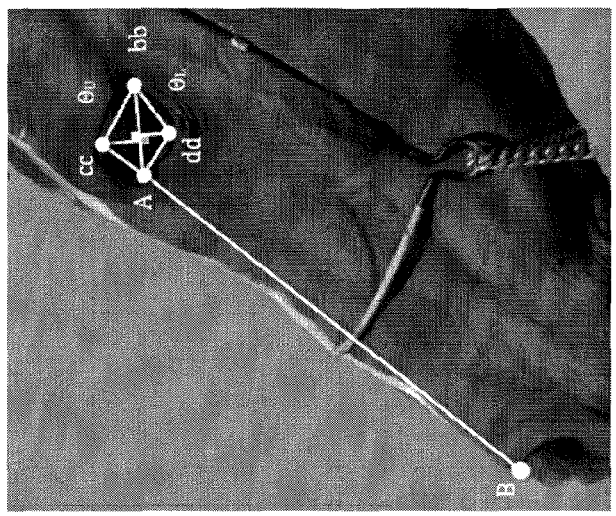
FIG. 11H shows facial description measurement AR11_Eye Size Proportion.
Figure 11G:
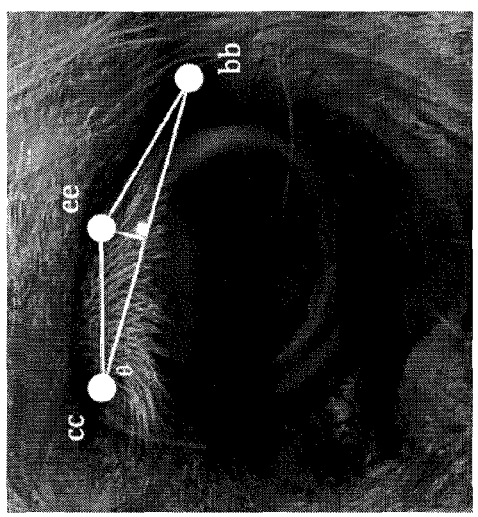
FIG. 11G shows facial description measurement AR11_Eye Roundness Proportion.
Figure 12:
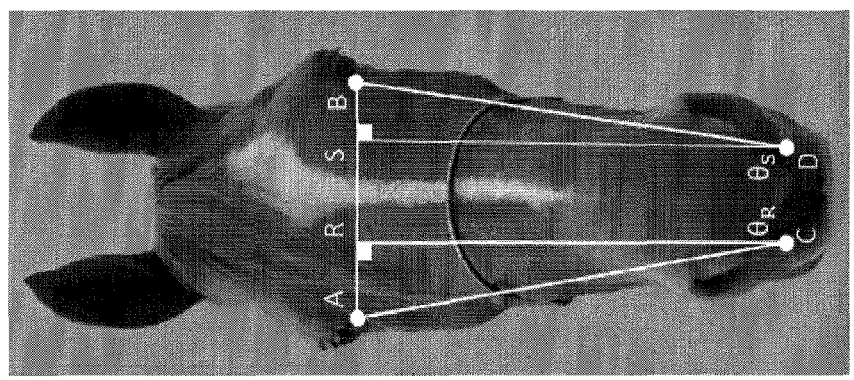
FIG. 12 shows facial description measurement AR12_Forehead Width Angle.
Figure 11M:
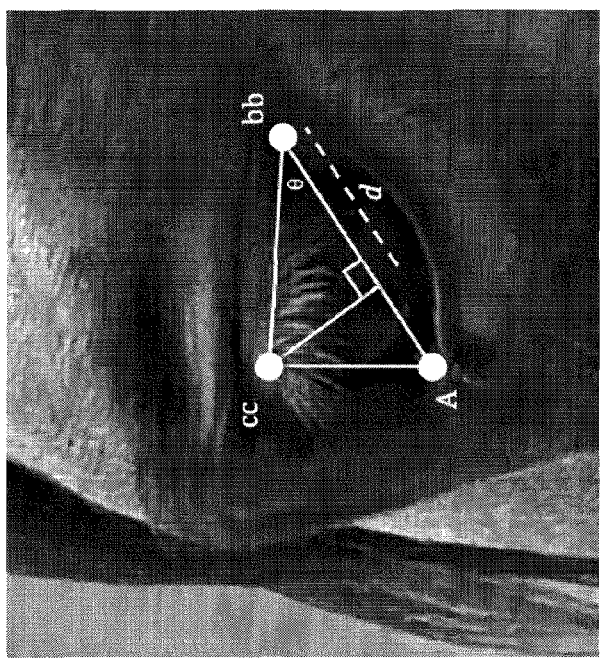
FIG. 11M shows facial description measurement AR11_Upper Maxima Point Proportion Eye.
Figure 11K:
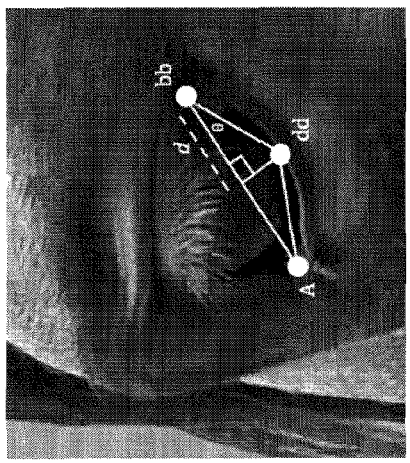
FIG. 11K shows facial description measurement AR11_Lower Minima Point Proportion Eye.
Figure 11L:
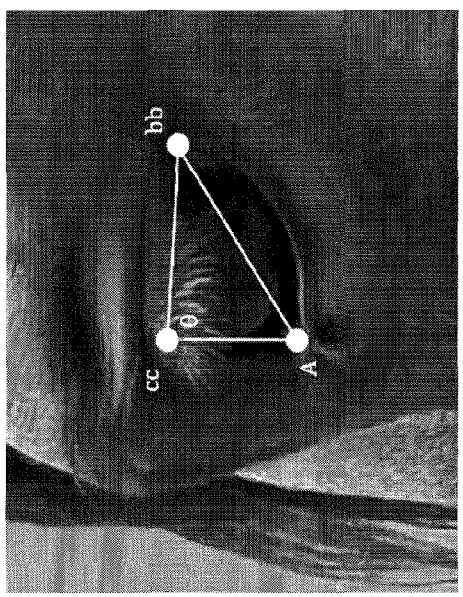
FIG. 11L shows facial description measurement AR11_Top Eye Angle.
Figure 13B:
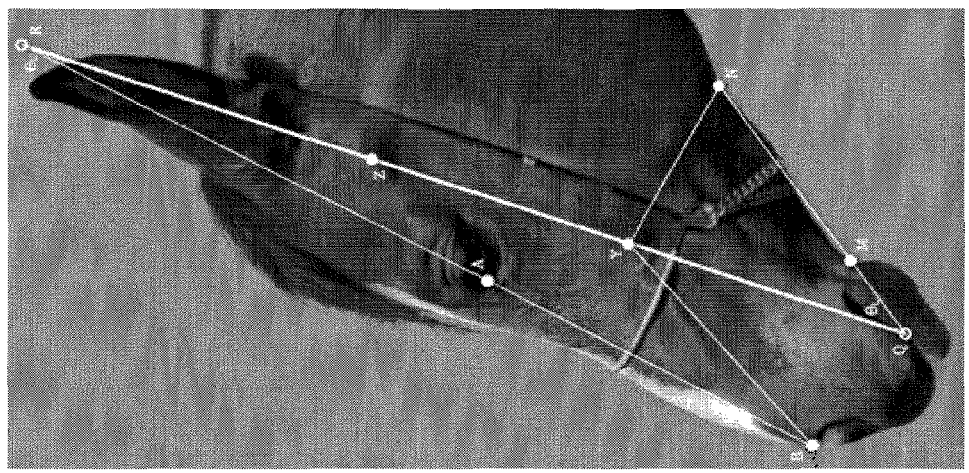
FIG. 13B shows facial description measurement AR13_Zygomatic Ridge Angles.
Figure 13A:
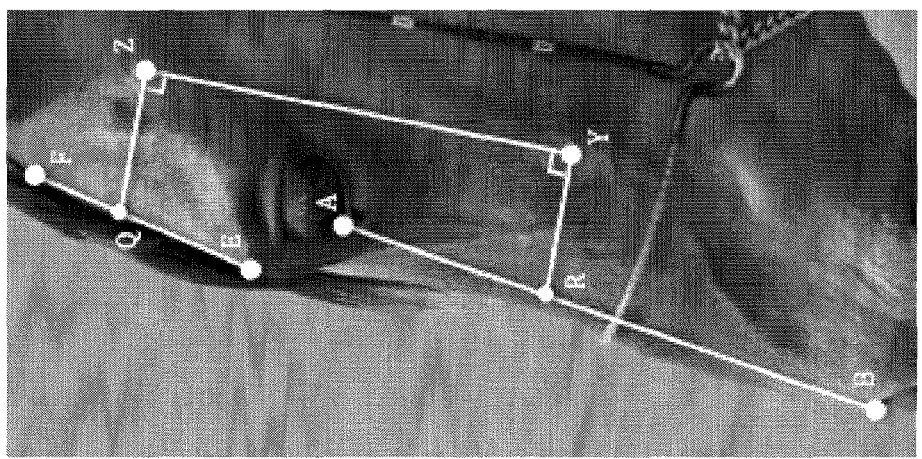
FIG. 13A shows facial description measurement AR13_Cheek-to-Zygomatic Height Ratio.

Various methods for using metrics associated with the physical form of an animal or human (including facial measurements) to predict a characteristic including behavior or suitability are described. While a greater number of examples are shown or described with respect to horses, pigs and humans, the methods apply equally to other mammals and non-mammals. Also, the methods described are used for the grouping, pairing or matching of mammals and non-mammals.

Methods for analyzing equine facial characteristics vary across the horse industry, and most are cherished as highly guarded trade secrets typically only passed down from aging trainers to their selected successors. To date there have been no formal scientific studies carried out on this topic, and only one published text exists which delineates one of these behavioral evaluation methods, namely "Getting in TTouch: Understand and Influence Your Horse's Personality" by Linda Tellington-Jones (North Pomfret: Trafalgar Square Publishing, 1995). As a result, this valuable but purely non-quantitative method remains obscure, highly subjective, and inaccessible to many individuals in the equestrian industry.

Within the equestrian industry there are many different styles of riding recognized as distinct riding disciplines. The riding discipline that a horse is trained for is the earliest and arguably the most important training decision of a horse's competitive career. Disciplines differ widely in the conformational characteristics that they favor and the physical demands that they place on the equine athlete. However, just as in human athletes, horses must also be cognitively well suited to the varying mentalities required within differing equestrian sports to succeed at the top levels of competition.

Due to the relationship in horses between facial features and temperament, in the experiments patterns of facial features were discerned between horses that excel in cognitive distinct riding disciplines. The embodiments include an effective computer model of the equine face quantitatively reflecting this pattern, allowing the riding discipline of a horse to be predicted computationally with a high degree of accuracy. Similarly, models derived from computationally determined facial measurements can be used to predict a horse's performance (e.g., win percentile) within a given riding discipline based on its relative cognitive suitability to that training style.

Moreover, the need for a computational system for analyzing facial characteristics to determine behavior and performance traits affected by the innate nature of an animal extends well beyond equine applications. For example, in addition to being companions, humans use dogs in many specialized ways such as police dogs, bomb-sniffing dogs, seeing-eye/service dogs, herding dogs, hunting dogs, cadaver dogs, therapeutic dogs, etc. Each of these specialized uses requires significant training. Like horses, dogs must be cognitively suited to the rigors of a particular specialization and it is imperative that this be determined as soon as possible due to the significant investment required for training. Dogs with behavioral traits making them suitable for particular specializations should have corresponding discernible facial features, much like the Russian foxes discussed above. An effective model of the canine face quantitatively reflects this pattern, enabling a highly-accurate, computational prediction of the suitability of a dog for a particular specialization.

Similar needs also exist with respect to animals raised to produce food or other materials for human consumption. For example, there is extensive debate in the swine production industry over the use of gestation crates versus gestation pens. Gestation crates are individual enclosures that allow the animal only enough room to stand up and lie down. In intensive swine production systems, such crates are the traditional housing option for sows during gestation. Many farmers contend that these crates enable them to provide sows with individualized care. Nevertheless, concerns from pork consumers over the mental and emotional welfare of sows living in these types of enclosures have placed considerable pressure on the swine production industry to adopt group housing such as gestation pens. The European Union has mandated that all gestation crates must be phased out of swine production systems by 2015. Although there is no corresponding regulation in the U. S., recently U. S. swine producers have faced significant market pressure from large buyers to begin phasing out gestation crates in favor of gestations pens. One of the industry's largest customers—a well-known fast-food chain—recently called for its suppliers to shift toward gestation pens, and other large customers are likely to enact similar requirements. The ultimate source of this U. S. market pressure is consumer concerns about swine welfare.

While the switch from crates to pens will provide sows with significant physical and emotional benefits, it is not without costs and risks. As a species, pigs are extremely aggressive animals that fight to establish and maintain social hierarchies. As farmers increasingly house their sows as groups in gestation pens, they will encounter new problems related to fights among these naturally aggressive animals. These fights can cause serious injury—including miscarriage—or even death to the sows involved, which is extremely undesirable to swine farmers.

To avoid such outcomes, what is needed is a method that reliably predicts aggression-related personality characteristics of individual sows and to what extent certain individuals will cohabitate in a gestation pens without harming each other. As discussed above with reference to horses, a solution to this problem is to use swine facial features to predict aspects of swine personality that correlate with aggression. Once these are known, an individual's aggression-related personality traits can be used to predict the outcome of that individual interacting socially with another individual. These predicted pair-wise outcomes can be used to predict the level or incidence of aggression among a larger group cohabitating in a gestation pen. By doing so, one can allocate groups of sows to individual gestation pens based on minimizing risk of aggression-related injuries to the individuals.

A reliable method to predict aggression-related personality characteristics of individual sows also would allow hog farmers to breed less aggressive animals through their selection of replacement gilts, thereby reversing the trend of increasingly aggressive and unmanageable hogs created through excessive breeding for weight gain. Such a method also may allow farmers to implement intelligent and humane animal management strategies. For example, sows predicted to be excessively aggressive can be placed in gestation crates while the rest of the population can be placed in more open gestation pens.

Similarly, there is a need to reduce the incidence of "mash deaths" among pig litters. Such deaths are among the leading cause of litter losses in lactation-age piglets (0-3 weeks). They occur when a piglet is unable to move out of the way of its mother as she lies down, and becomes asphyxiated under her greater body weight. Evidence suggests that mash deaths are much more common in pigs raised in large-scale production systems compared to farm-raised pigs, due in part to the confined living conditions and restricted fields of vision that farrowing crates place on sows as they nurse their litters.

Nevertheless, a sow's insufficient reactivity also contributes to the greater incidence of mash deaths in large-scale production systems. As wild animals, sows instinctively rose to their feet quickly whenever they heard distress cries or felt a piglet struggling beneath them. Domesticated sows appear to have lost this protective mothering reflex. Many experts believe that this loss of mothering instinct is part of the degradation of behavioral traits among high-performance pig lines due to heavy over-breeding for traits such as lean weight gain and weaning weights. If mash deaths are due to a loss of genetic potential for mothering, then the associated endocrine changes will also produce observable and quantifiable changes to facial morphology.

In such case, the anatomical structures of a sow's face are used to develop a computational model for predicting the expected number of mash deaths that the sow would incur per litter. The predicted behavioral outcomes are used to determine various management and/or maintenance strategies for high-risk sows, including increased supervision, larger pens, moving piglets off to reduce litter size, etc. Farmers could also use this model to select young female pigs ("gilts") as replacements for their maintenance rotation by taking into consideration which ones would make the most productive mothers. This would allow them to avoid the monetary loss of feeding a gilt to farrowing age only to have her prove unsuitable as a mother. It would also allow farmers to improve the mothering ability of their herd over time by selective breeding.

There exists a similar need to identify the existence of mothering-related behavioral traits in sheep. Many of the births by ewes are twins. However, certain ewes will not accept the second-born twin under any circumstances. In such cases, the anatomical structures of an ewe's face is used to develop a computational model to predict that individual's behavioral traits associated with mothering capacity, including willingness to accept all offspring. The predicted behavioral traits are used to determine various management solutions and/or maintenance strategies including identifying ewes with higher rejection rate potentials. These animals would benefit from being brought into confined birthing pens prior to parturition to allow for a more efficient imprinting process than would occur in open range-management situations. These computational models also could be used to predict ewes with highest capacities for accepting lambs; these ewes would then become candidates for receiving grafted lambs who could not be imprinted onto their original mother. These results benefit both animals and farmers.

Similar needs exist for identifying traits such as behavioral traits of animals used for purposes of recreation, training, work, etc. For example, there has been much concern about the welfare of horses and cattle used in rodeos, in particular the ones that buck aggressively while attempting to throw off a rider. While many of these animals are naturally aggressive, a certain amount of this behavior is due to the use of devices such as straps, electric prods, etc. that increase aggression but that many consider to be inhumane. Accordingly, it would be beneficial to use a computational model based on the facial structures of a horse or bull to measure or estimate a prospective rodeo animal's natural level of aggressive behavior. By selecting only the animals whose innate characteristics make them most suitable, rodeos could avoid the need for these controversial devices.

Consequently, one of the objects of the disclosure is to revolutionize, with the use of modern imaging and computing technology, the processes of ancient equine behavioral evaluation systems. Another object of the disclosure is to bring objectivity to an animal facial analysis process by utilizing mathematical techniques to quantify the relevant physiological facial features of animals such as horses, donkeys, cattle, oxen, llamas, sheep, goats, dogs, camels, geese, chickens, turkeys, cats, ferrets, and pigs. Another object is establish a set of measurements that provides a quantitative model for a type of animal that is effective for determining a characteristic of a particular animal of that type, such as the most suitable riding discipline or expected performance within a particular riding discipline for a horse. Another object is to provide a computational method for determining and evaluating a characteristic of a particular horse based on the model of the equine face. Yet another object is to provide a user-friendly system that embodies this computational method and is based on readily-available digital computing and imaging technology. Moreover, another object is to improve the efficacy of animal management and training by providing a computationally-efficient, accurate, and objective technique for predicting an animal's innate personality characteristics that affect the results of activities in which the animal may participate, such as a race or event.

The biological mechanism relied upon in the disclosed embodiments was first proposed in the ground-breaking 1999 Russian study entitled "Early Canid Domestication: The Fox Farm Experiment." Using an extensive breeding program of wild silver foxes, this study showed that selective breeding can be used to alter the innate personality traits or characteristics of a line of domesticated animals. More particularly, this study demonstrated that endocrine or hormone changes cause both the personality trait changes and a predictable suite of morphological changes, most predominantly in the structures of the face.

Figure 14:
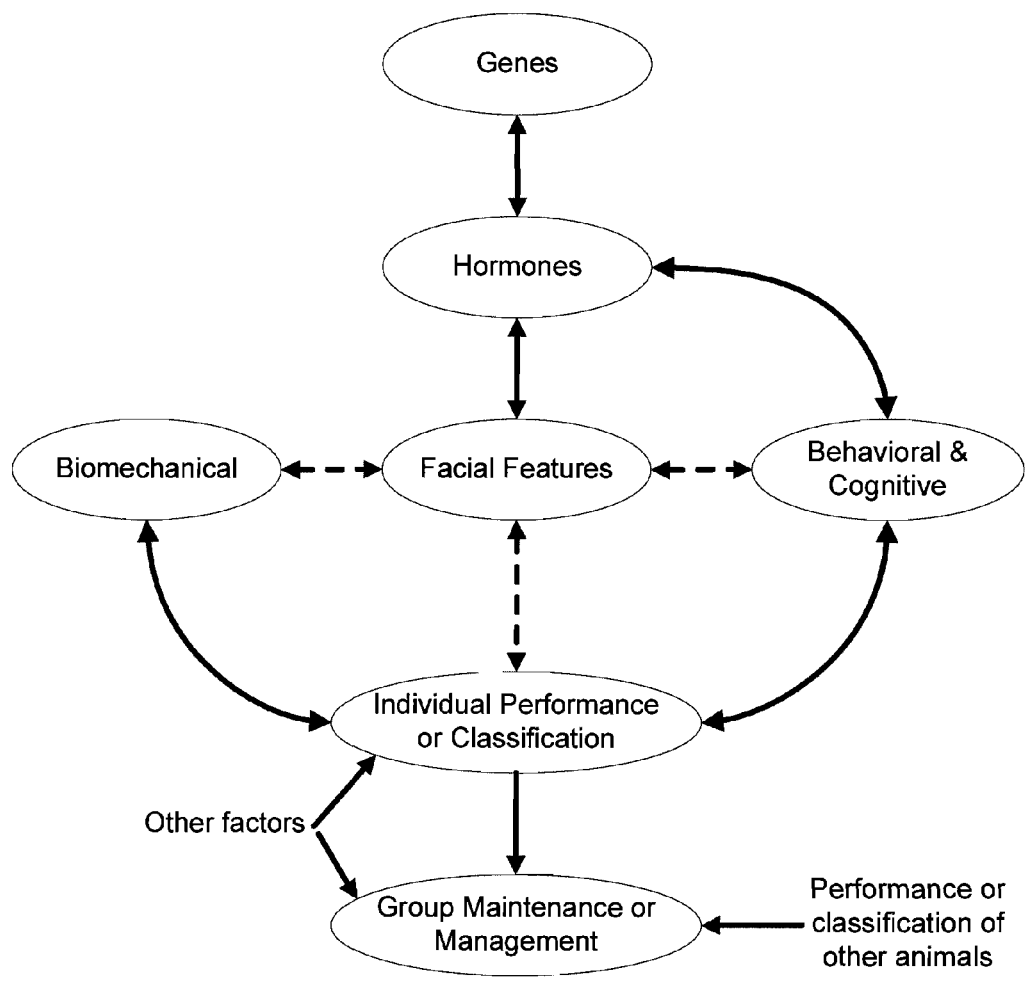
FIG. 14 shows various relationships between genes, hormones, behavior, and facial features of an animal.

As illustrated graphically in FIG. 14, the innate personality of an animal originates in its genetic composition. Genes dictate the basal levels of neurologically active hormones that control the behavior of an animal, such serotonin which inhibits aggression. Genes also dictate the timing of the release of these hormones, such as corticosteroids (stress response) that control the windows of postnatal cognitive and social development in young animals. The cognitive framework of an animal is determined from a combination of these innate personality traits provided by this genetically controlled endocrine makeup—the so-called "nature effect"—and the stimuli and experiences that the animal was subject to during development—the so-called "nurture effect." When viewed in the context of the animal's current environment, this cognitive framework dictates its behavioral performance, which may be defined in such terms as cognitive suitability to a specific task, success in performing a specific task, likelihood of displaying a specific type or pattern of behavioral responses, or, when compared against the personality types of its conspecifics, performance of an individual in group situations.

As mentioned above, variation in the basal levels of neurologically active hormones and their release windows during development account not only for differences in innate personality among animals of the same species, but also for variability in morphology, particularly of the face. This direct correlation between the facial structure and endocrine composition of an animal subsequently allows for quantifiable features of an animal's face to be correlated with and used as a proxy for predicting variability in the innate behavior of individual animals as a function of their neurochemical makeup. Variations in facial structure may also be used to predict the behavior and performance of an animal as a result of the variations in the degree of functionality that they allow, in terms such as field of vision, auditory acquisition, oxygen intake, feed intake, etc.

Various facial recognition and image matching techniques will mathematically model the equine face and allow the prediction of behavior and performance. While these embodiments are effective, the processes and techniques of facial recognition and image matching are generally computationally intensive. Therefore, trigonometric modeling is used by some embodiments. Combinations of facial/shape recognition, image matching and trigonometric modeling may be used to predict behavior and performance.

Figure 17:
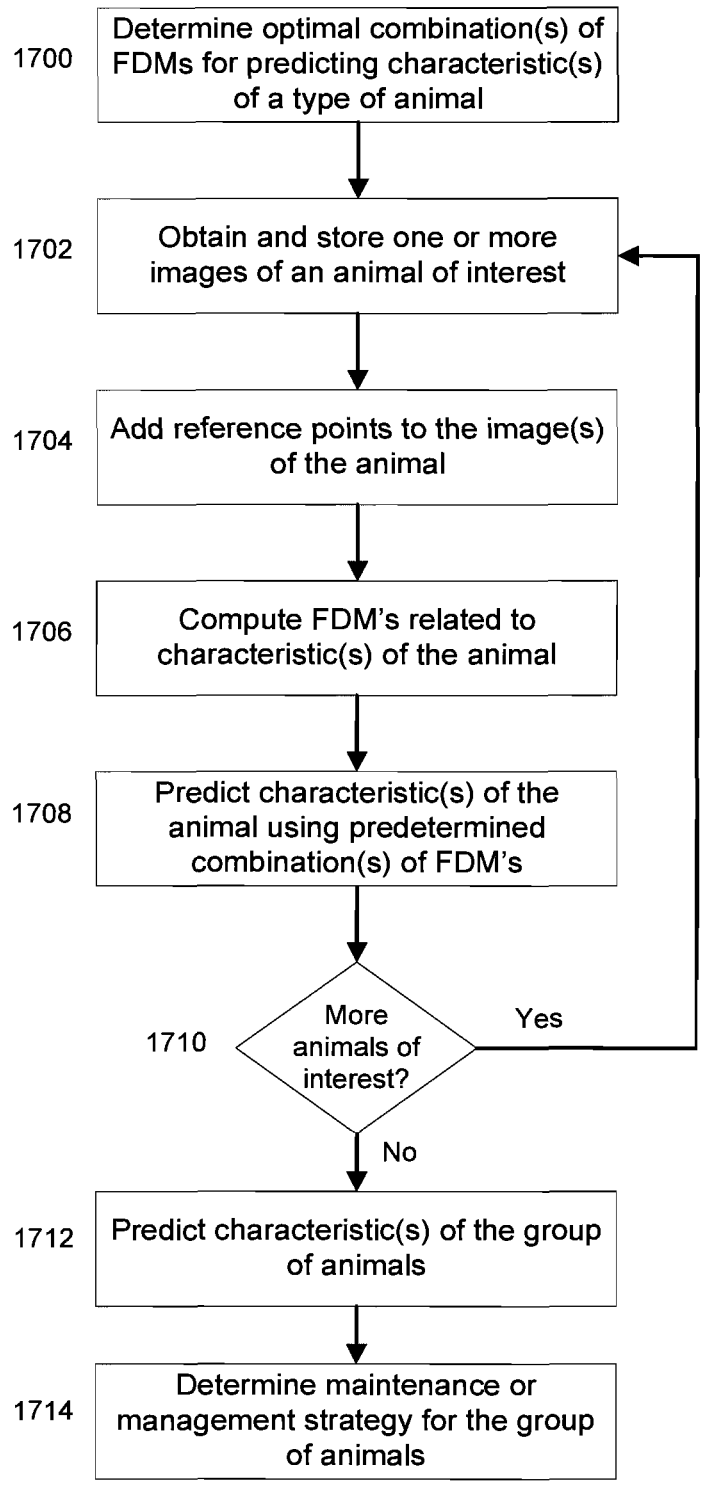
FIG. 17 shows a method for determining a maintenance or management strategy for one or more animals according to another embodiment of the present disclosure.

For example, equine facial features may be quantified based on thirteen independent anatomical regions. Within each region an individual horse can possess one of a plurality of discrete facial classification. The distinctions between these classifications, however, vary by anatomical region. Classifications in less structurally diverse regions can be described by a single structural feature, which can in turn be modeled with a single continuous measure. Classifications in anatomical regions with high structural complexity, however, show hierarchical relationships dependent on multiple structural features that must be modeled with multiple measured variables to distinguish between classifications. The first step in developing a mathematical model of the equine face was to identify the anatomical regions that show hierarchical relationships and determine the individual structural features that distinguish between classifications in these more complex systems. FIG. 17 shows an exemplary hierarchical system of equine facial profile features.

Based upon the identified continuous traits and hierarchical system, the identified structural features of relevance can be described using length measure and angles. Accordingly, a trigonometric model can be used to accurately characterize the equine face in lieu of more computationally expensive facial recognition and image matching techniques. FIGS. 1 through 13 illustrate the trigonometric model for each of the thirteen independent anatomical regions, denoted AR01 through AR13, respectively. Certain anatomical regions comprise multiple facial descriptor measurements. For example, AR01 (Facial Profile) comprises ten different facial descriptor measurements, denoted AR01_Degree of Facial Inflexion, AR01_Degree of Nose Rounding, AR01_Face Thickness Proportion, AR01_Forehead Slope Proportion, AR01_ Forehead Height Proportion, AR01_ Forehead Length Proportion, AR01_Nose Length Proportion, AR01_Nose Roundness Proportion, AR01_Nostril Position Proportion, and AR01_Degree of Eye Orbital Protrusion, as illustrated in FIGS. 1A through 1K, respectively. In total, the thirteen anatomical regions AR01 through AR13 comprise fifty-six (56) facial descriptor measurements as illustrated in FIGS. 1 through 13. The corresponding mathematical descriptions for each of these measurements are provided below.

| Descriptor Name: Degree of Nose Rounding | Anatomical Region of Face: AR01_FacialProfile |
|---|---|
| Describes the degree to which the boney structures of the nose rounds away from the true line of the face. Partially differentiates between "Roman" and "Moose" noses. | |
| $M_{ac} = \dfrac{(A_y - C_y)}{(A_x - C_x)}$ | finds the slope of line $\overline{AC}$ |
| $N_x = B_x - (A_x - B_x)$ | finds the x-coordinate for "imaginary" point N sufficiently far to the left of point B to complete the triangle |
| $N_y = M_{ac} * (N_x - C_x) + C_y$ | finds the y-coordinate of imaginary point N |
| $\overline{AB} = \sqrt{(B_x - A_x)^2 + (B_y - A_y)^2}$, $\overline{BN} = \sqrt{(B_x - N_x)^2 + (B_y - N_y)^2}$, $\overline{CN} = \sqrt{(C_x - N_x)^2 + (C_y - N_y)^2}$, $\overline{BC} = \sqrt{(B_x - C_x)^2 + (B_y - C_y)^2}$ finds distance values for all sides of triangle | |
| $\theta = \cos^{-1}\left(\dfrac{\overline{BN}^2 - \overline{BC}^2 - \overline{CN}^2}{-2*\overline{BC}*\overline{CN}}\right)$ | finds the angle for $\angle BCN$, denoted here as $\theta$ |
| $\overline{BL} = \sin(\theta) * \overline{BC}$ | finds the height of triangle $\triangle CBN$ (perpendicular displacement of Upper Nose Point from Upper Profile of Face) |

| | |
|---|---|
| $M_{bl} = -(M_{ac})^{-1}$ | finds the slope of the slope perpendicular to the line of the upper face |
| $L_x = \dfrac{(M_{bl} * B_x - M_{ac} * A_x + A_y - B_y)}{(M_{bl} - M_{ac})}$ | finds the x-coordinates of the intersection point between the line of the upper face and its perpendicular bisector inclusive of point B |
| $\sigma_u = \dfrac{(L_x - B_x)}{(\|L_x - B_x\|)}$ | finds the constant of nostril position with magnitude 1 indicating direction of position relative to the upper line of the face via sign ($\pm$) |
| $DoNR = \sigma_u * \left(\dfrac{d}{\overline{AB}}\right)$ | finds the Degree of Nostril Rounding, here defined as the degree to which the Upper Nostril Point rounds away from the True Line of the Face relative to the overall length of the face |

| Descriptor Name: Forehead Length Proportion | Anatomical Region of Face: AR01_FacialProfile |
|---|---|
| Describes the length of the horse's forehead relative to the overall length of the head. | |
| $M_{ubb} = \dfrac{(U_y - bb_y)}{(U_x - bb_x)}$ | finds the slope of the True Line of the Head |
| $M_p = -(M_{ubb})^{-1}$ | finds the slope perpendicular to the True Line of the Head |
| $R_x = \dfrac{(M_{ubb} * U_x - M_p * F_x + F_y - U_y)}{(M_{ubb} - M_p)}$, $R_y = M_{ubb} * (R_x - U_x) + U_y$ | |
| $Q_x = \dfrac{(M_p * E_x - M_{ubb} * U_x + U_y - E_y)}{(M_p - M_{ubb})}$ | finds the x-coordinate of perpendicular intercept point Q |
| $Q_y = M_{ubb} * (Q_x - U_x) + U_y$ | finds the y-coordinate of perpendicular intercept point Q |
| $\overline{UR} = \sqrt{(U_x - R_x)^2 + (U_y - R_y)^2}$, $\overline{QR} = \sqrt{(R_x - Q_x)^2 + (R_y - Q_y)^2}$ finds the length of lines $\overline{UR}$ and $\overline{QR}$ | |
| $FLP = \dfrac{\overline{QR}}{\overline{UQ}}$ | finds the Forehead Length Proportion, here defined the perpendicular length of the forehead relative to the overal length of the head |

| Descriptor Name: Face Thickness Proportion | Anatomical Region of Face: AR01_FacialProfile |
|---|---|
| Describes the overall depth of the overall depth of the jaw relative to the perpendicular height of the face. Indentifies a horse that is wide from the mid-nose bone to the jaw. | |
| $M_{ubb} = \dfrac{(U_y - bb_y)}{(U_x - bb_x)}$ | finds the slope of the True Line of the Head |
| $M_p = -(M_p)^{-1}$ | finds the slope perpendicular to the True Line of the Head |
| $Qn_x = \dfrac{(M_{ubb} * U_x - M_p * N_x + N_y - U_y)}{(M_{ubb} - M_p)}$, $Qn_y = M_{ubb} * (QN_x - U_x) + U_y$ finds the x and y-coordinates of perpendicular intersect point $Q_N$ | |
| $Qc_x = \dfrac{(M_{ubb} * U_x - M_p * C_x + C_y - U_y)}{(M_{ubb} - M_p)}$, $Qc_y = M_{ubb} * (Qc_x - U_x) + U_y$ | |
| finds the x and y-coordinates of perpendicular intersect point $Q_C$ $\overline{NQn} = \sqrt{(N_x - Qn_x)^2 + (N_y - Qn_y)^2}$, $\overline{CQc} = \sqrt{(C_x - Qc_x)^2 + (C_y - Qc_y)^2}$, | |
| $FTP = \dfrac{\overline{CQc}}{\overline{NQn}}$ | finds the Face Thickness Proportion, here defined as the ratio between perpendicular height of the face and the perpendicular thickness of the jaw |

| Descriptor Name: Nostril Position Proportion | Anatomical Region of Face: AR01_FacialProfile |
|---|---|
| Describes the angle at which the nose is set onto the face. Partially differentiates between a Roman Nose and Roman Head. Partially identifies a "Moose" nose. | |
| $M_{ac} = \dfrac{(A_y - C_y)}{(A_x - C_x)}$ | finds the slope of line |
| $N_x = B_x - (A_x - B_x)$ | finds the x-coordinate for "imaginary" point N sufficiently far to the left of point B to complete the triangle |
| $M_y = M_{ac} * (N_x - C_x) + C_y$ | finds the y-coordinate of imaginary point N |
| $\overline{BN} = \sqrt{(B_x - N_x)^2 + (B_y - N_y)^2}$, $\overline{CN} = \sqrt{(C_x - N_x)^2 + (C_y - N_y)^2}$, $\overline{BC} = \sqrt{(B_x - C_x)2 + (B_y - C_y)^2}$ finds distance values for all sides of triangle | |

| | |
|---|---|
| $\theta = \cos^{-1}\left(\dfrac{\overline{BN}^2 - \overline{BC}^2 - \overline{CN}^2}{-2*\overline{BC}*\overline{CN}}\right)$ | finds the angle for ∠BCN, denoted here as θ |
| $\overline{BL} = \sin(\theta) * \overline{BC}$ | finds the height of triangle ΔCBN, defined here as the distance of displacement of the nose from the line of the upper face |
| $M_{bl} = -(M_{ac})^{-1}$ | finds the slope of the slope perpendicular to the line of the upper face |
| $L_x = \dfrac{(M_{bl}*B_x - M_{ac}*A_x + A_y - B_y)}{(M_{bl} - M_{ac})}$, | finds the x-coordinate of the intersection point between the line of the upper face and its perpendicuklar bisector inclusive of point B |
| $\sigma_x = \left(\dfrac{L_x - B_x}{|L_x - B_x|}\right)$ | finds the constant of nostril position with magnitude 1 indicating direction of position relative to the upper line of the face via sign (±) |
| $NPP = \sigma_u * \left(\dfrac{\overline{BL}}{\overline{AB}}\right)$ | finds the Nostril Position Proportion, here defined as the degree to which the position of the nose varies from the upper line of the face relative to the overall size of the face. |

Descriptor Name: Forehead Slope Proportion    Anatomical Region of Face: AR01_FacialProfile Describes the slope of the forehead moving into the poll relative to the True Line of the Head.

| | |
|---|---|
| $M_{ubb} = \dfrac{(U_y - bb_y)}{(U_x - bb_x)}$ | finds the slope of line $\overline{UBb}$ |
| $M_p = -(M_{ubb})^{-1}$ | finds the slope of lines $\overline{EQ}$ and $\overline{FR}$ perpendicular to line $\overline{Ubb}$ |
| $Q_x = \dfrac{(M_p*E_x - M_{ubb}*U_x + U_y - E_y)}{(M_p - M_{ubb})}$ | finds the x-coordinate of perpendicular intercept point Q |
| $Q_y = M_{ubb} * (Q_x - U_x) + U_y$ | finds the y-coordinates of perpendicular intercept point Q |
| $R_x = \dfrac{(M_p*F_x - M_{ubb}*U_x + U_y - F_y)}{(M_p - M_{ubb})}$ | finds the x-coordinates of perpendicular intercept point R |
| $R_y = M_{ubb} * (R_x - U_x) + U_y$ | finds the y-coordinate of perpendicular intercept point R |
| $\overline{EQ} = \sqrt{(E_x - Q_x)^2 + (E_y - Q_y)^2}$, $\overline{FR} = \sqrt{(F_x - R_x)^2 + (F_y - R_y)^2}$ | finds the lengths of lines $\overline{EQ}$ and $\overline{FR}$ |
| $FSP = \dfrac{\overline{FR}}{\overline{EQ}}$ | finds the Forehead Slop Proportion, here defined as the ratio of perpendicular forehead height from the True Line of the Head at the roastal and caudal-most points of the forehead |

Descriptor Name: Forehead Height Proportion    Anatomical Region of Face: AR01_FacialProfile Describes the perpendicular height of the forehead above the True Line of the Face.

| | |
|---|---|
| $M_{AB} = \dfrac{(B_y - A_y)}{(B_x - A_x)}$ | finds the slope of line $\overline{AB}$ |
| $N_x = A_x + (A_x - B_x)$ | finds the x-coordinate for "imaginary" point N sufficiently far to the right of point A to complete the triangle |
| $N_y = M_{AB} * (N_x - A_x) + A_y$ | finds the y-coordinate of imaginary point N |
| $\overline{BN} = \sqrt{(B_x - N_x)^2 + (B_y - N_y)^2}$, $\overline{EN} = \sqrt{(E_x - N_x)^2 + (E_y - N_y)^2}$, $\overline{BE} = \sqrt{(S_x - E_x)^2 + (B_y - E_y)^2}$ | finds distance values for all sides of triangle |
| $\theta = \cos^{-1}\left(\dfrac{\overline{BE}^2 - \overline{BN}^2 - \overline{EN}^2}{-2*\overline{BN}*\overline{EN}}\right)$ | finds the angle for ∠BNE, denoted here as θ |
| $\overline{DL} = \sin(\theta) * \overline{EN}$ | finds the height of triangle ΔCDN (perpendicular displacement of Forehead from True Line of Face) |
| $M_{EL} = -(M_{AB})^{-1}$ | finds the slope of line $\overline{EL}$ |
| $L_x = \dfrac{(M_{EL}*E_x - M_{AB}*A_x + A_y - E_y)}{(M_{EL} - M_{AB})}$ | finds the x-coordinate of the perpendicular intersection point L |
| $\sigma_x = \left(\dfrac{L_x - E_x}{|L_x - E_x|}\right)$ | finds the constant of forehead position with magnitude 1 indicating direction of position relative the true line of the face via sign (±) |

-continued

| | |
|---|---|
| $FHP = \sigma_u * \left(\dfrac{DL}{\overline{AB}}\right)$ | finds the Forehead Height Proportion, here defined as the perpendicular displacement of the Upper Eye Orbital Point of the forehead from the True Line of the Face, relative to the length of the face. |

| Descriptor Name: Degree of Facial Inflexion | Anatomical Region of Face: AR01_FacialProfile |
|---|---|

Describes the degree of structural concavity/convexity of the True Line of the Face. Differentiates between a concave "dished", convex "roman", or straight bone structure.

$\overline{AB} = \sqrt{(B_x - A_x)^2 + (B_y - A_y)^2}$, $\overline{AC} = \sqrt{((C_x - A_x)^2 + (C_y - A_y)^2}$, $\overline{BC} = \sqrt{(C_x - B_x)^2 + (C_y - B_y)^2}$
finds distance values for all sides of triangle

| | |
|---|---|
| $\theta = \cos^{-1}\left(\dfrac{\overline{BC}^2 - \overline{AB}^2 - \overline{AC}^2}{-2 * \overline{AB} * \overline{AC}}\right)$ | finds the angle for $\angle BAC$, denoted here as $\theta$ |
| $d = \sin(\theta) * \overline{AC}$ | finds the height of triangle $\triangle ABC$, the distance of facial inflexion |
| $M_{ab} = \dfrac{(A_y - B_y)}{(A_x - B_x)}$ | finds slope of line $\overline{AB}$ |
| $Q_x = \left(\dfrac{C_y - A_y}{M_{ab}}\right) + A_x$ | finds x-coordinate of point Q intersected by line $\overline{AB}$ and its horizontal bisector inclusive of point C |
| $\sigma = Qx - Cx$ | finds a value for which $\sigma$ is either positive or negative, indicating respectively either convexity or concavity by the location of point C relative to the position of point Q on the Profile Line of the face |
| $\sigma_u = \dfrac{\sigma}{|\sigma|}$ | finds u, here defined of the Constant of Concavity with magnitude 1 indicating direction of inflexion via sign ($\pm$) |
| $DoFI = \sigma_u * \left(\dfrac{d}{\overline{AB}}\right)$ | finds Degree of Facial Inflexion, here defined as the degree of perpendicular deviation of the Upper Profile of the skull from the True Line of the Face relative to ovrall length of face. |

| Descriptor Name: Nose Roundness Proportion | Anatomical Region of Face: AR01_FacialProfile |
|---|---|

Describes the degree of roundness of the nasal bone as it results from the accretion of bone above the True Line of the Nose. Identifies convex "Moose" and "Roman" profiles.

$\overline{AB} = \sqrt{(B_x - A_x)^2 + (B_y - A_y)^2}$, $\overline{AC} = \sqrt{((C_x - A_x)^2 + (C_y - A_y)^2}$,
$\overline{BC} = \sqrt{(C_x - B_x)2 + (C_y - B_y)^2}$ finds distance values for all sides of triangle

| | |
|---|---|
| $\theta = \cos^{-1}\left(\dfrac{\overline{BC}^2 - \overline{AB}^2 - \overline{AC}^2}{-2 * \overline{AB} * \overline{AC}}\right)$ | finds the angle $\angle BAC$, denoted here as $\theta$ |
| $d = \sin(\theta) * \overline{AC}$ | finds the height of triangle $\triangle ABC$ (distance of nostril rounding) |
| $M_{ab} = \dfrac{(A_y - B_y)}{(A_x - B_x)}$ | finds the slope line of $\overline{AB}$ |
| $Q_x = \left(\dfrac{C_y - A_y}{M_{ab}}\right) + A_x$ | finds the x-coordinate of point Q intersected by line $\overline{AB}$ and its horizontal bisector inclusive of point C |
| $\sigma = Q_x - C_x$ | finds a value for which $\sigma$ is either positive or negative, indicating respectively either convexity or concavity by the location of point C relative to the position of point Q on the Profile Line of the face |
| $\sigma_u = \dfrac{\sigma}{|\sigma|}$ | finds $\sigma_u$, here defined of the Constant of Concavity with magnitude 1 indicating direction of inflexion/convection via sign ($\pm$) |
| $DoFI = \sigma_u * \left(\dfrac{d}{\overline{AB}}\right)$ | finds the Nose Roundness Proportion, here defined as the degree of perpendicular deviation of the Upper Profile of the skull above the True Line of the Nose relative to the length of the nose. |

| Descriptor Name: Nose_Length Proportion | Anatomical Region of Face: AR01_FacialProfile |
|---|---|

Describes the perpendicular length of a horse's nose relative to the overall length of the face.

| | |
|---|---|
| $M_{ab} = \dfrac{(A_y - B_y)}{(A_x - B_x)}$ | finds the slope of the True Line of the Face |
| $M_p = -(M_{ab})^{-1}$ | finds the slope perpendicular to the True Line of the Face |

-continued $Q_x = \dfrac{(M_p * C_x - M_{ab} * A_x + A_y - C_y)}{(M_p - M_{ab})}$     finds the x-coordinate of perpendicular intercept point Q $Q_y = M_{ab} * (Q_x - A_x) + A_y$     finds the y-coordinate of perpendicular intercept point Q $\overline{AB} = \sqrt{(A_x - B_x)^2 + (A_y - B_y)^2}, \overline{BQ} = \sqrt{(B_x - Q_x)^2 + (B_y - Q_y)^2}$
finds the length of lines $\overline{AB}$ and $\overline{BQ}$ $NLP = \dfrac{\overline{BQ}}{\overline{AB}}$     finds the Nose Length Proportion, here defined the perpendicular length of the nose relative to the overall length of the face

---

Descriptor Name: Degree of Facial Protuberance     Anatomical Region of Face: AR02_Protuberances Describes the degree of prominence/enlargement of the sinus cavities above the eyes ("Jibbah") as they protrude from the underlying boney structure of the True Line of the Face.

$M_{Bc} = \dfrac{(B_y - C_y)}{(B_x - C_x)}$     finds the slope of line $\overline{BC}$ $N_x = C_x + (A_x - B_x)$     finds the x-coordinate for "imaginary" point N sufficiently far to the right of point D to complete the triangle $N_y = M_{EC} * (N_x - C_x) + C_y$     finds the y-coordinate of imaginary point N $\overline{AC} = \sqrt{(C_x - A_x)^2 + (C_y - A_y)^2}, \overline{CN} = \sqrt{(C_x - N_x)^2 + (C_y - N_y)^2},$
$\overline{DN} = \sqrt{(D_x - N_x)^2 + (D_y - N_y)^2}, \overline{CD} = \sqrt{(D_x - C_x)^2 + (D_y - C_y)^2},$ $\theta = \cos^{-1}\left(\dfrac{\overline{CD}^2 - \overline{CN}^2 - \overline{ND}^2}{-2 * \overline{CN} * \overline{ND}}\right)$     finds distance values for all sides of triangle $\overline{DL} = \sin(\theta) * \overline{DN}$     finds the angle for ∠CND, denoted here as θ
finds the height of triangle ΔCDN (perpendicular displacement of Sinus from True Line of the Nose)

$DoFP = \dfrac{d}{\overline{AB}}$     finds the Degree of Facial Protuberance, here defined as the perpendicular displacement of the Sinus Protuberence Point from the True Line of the Nose, relative to the length of the upper portion of the face.

---

Descriptor Name: Jowl-toUnderline Proportion     Anatomical Region of Face: AR03_JowlSize Decribes the magnitude of the lateral length of the jowl relative to the length of the jaw bone. Partially differentiates between a large and small jowl.

$\overline{MN} = \sqrt{(M_x - B_x)^2 + (M_y - N_y)^2}$     Finds the length of the underline of the jaw $\overline{NO} = \sqrt{(N_x - O_x)^2 + (N_y - O_y)^2}$     Finds the lateral length across the jowl $JtUP = \overline{NO}/\overline{MN}$     Finds the Jowl-to-Underline Proportion, here defined as the magnitude of the lateral length of the jowl relative to the length of jaw bone

---

Descriptor Name: Degree of Eye Orbital Protrusion     Anatomical Region of Face: AR01_Facial Profile Describes the longitudinal placement of the eye orbital on the top of the skull as it is positioned in correlation with the sinus cavities. Partially identifies protruding sinus cavities.

$m_{ab} = \dfrac{B_y - A_y}{B_x - A_x}$     finds the slope of line $\overline{AB}$ $m_p = -(m_{ab})^{-1}$     Finds the slope perpendicular to the line $\overline{AB}$ $Q_x = \dfrac{m_{ab} * A_x - m_p * C_x + C_y - A_y}{m_{ab} - m_p}$     finds x-coordinate of the intersection point between line $\overline{AB}$ and its perpendicular bisector inclusive of point C $Q_y = m_{ab}(Q_x - A_x) + A_y$     finds the y-coordinates of intersect point "Q"

$P_x = \dfrac{m_{ab} * A_x - m_p * D_x + D_y - A_y}{m_{ab} - m_p}$     finds the x-coordinate of intersection point between line $\overline{AB}$ and perpendicular bisector inclusive of point D $P_y = m_{ab}(P_x - A_x) + A_y$     finds y-coordinate of intersect point "P"

$\overline{CQ} = \sqrt{(C_x - Q_x)^2 + (C_y - Q_y)^2}$     finds the distance of displacement of the base point of the eye orbital from line $\overline{AB}$ $\overline{DP} = \sqrt{(D_x - P_x)^2 + (D_y - P_y)^2}$     finds the distance of displacement of the tallest point of the eye orbital from line $\overline{AB}$ $\overline{AB} = \sqrt{(B_x - A_x)^2 + (B_y - A_y)^2}$     finds the overall length of the face -continued

| | |
|---|---|
| $DoEOP = \dfrac{\overline{DP} - \overline{CQ}}{\overline{AB}}$ | finds Degree of Eye Orbital Protrusion, defined here as distance of protrusion of the maxima point of the eye orbital its base on the skull relative to overall length of face |

| Descriptor Name: Jowl Protuberance Proportion | Anatomical Region of Face: AR03_JowlSize |
|---|---|
| colspan | |

Describes the degree to which the minima point of the jowl protrudes from the underline of the jaw. Identifies shallow jowls. Partially differentiates between large and small jowls.

| | |
|---|---|
| $m_{mn} = \dfrac{M_y - N_y}{M_x - N_x}$ | Finds the slope of the underline of the jaw |
| $Q_x = N_x + 2(N_x - M_x)$ | Finds x-coordinate for imaginary point "q", sufficiently far to the right of point N to complete a triangle on the line fit to the underline of the jaw |
| $Q_y = m_{mn}(Q_x - M_x) + M_y$ | Finds the y-coordinate corresponding to imaginary point "q" |
| $\overline{NP} = \sqrt{(N_x - P_x)^2 + (N_y - P_y)^2}$, $\overline{PQ} = \sqrt{(P_x - Q_x)^2 + (P_y - Q_y)^2}$, $\overline{NQ} = \sqrt{(N_x - Q_x)^2 + (N_y - Q_y)^2}$ | Finds distance values for all sides of triangle |
| $\theta = \cos^{-1}\left(\dfrac{\overline{PQ}^2 - \overline{NQ}^2 - \overline{NP}^2}{-2 * \overline{NQ} * \overline{NP}}\right)$ | Finds the angle measure $\angle NQP$, denoted here as $\theta$ |
| $d = \sin\theta * \overline{NP}$ | Finds the perpendicular distance from the line fit to the underline of the jaw to the minima point of the jowl |
| $\overline{MN} = \sqrt{(M_x - N_x)^2 + (M_y - N_y)^2}$ | Finds the length of the underline of the jaw |
| $JPP = d/\overline{MN}$ | Finds the Jowl Protuberence Proportion, which here describes the length of protuberance of the jowl from the line of the jowl relative to the full length of the underline of the jaw |

| Descriptor Name: Jowl Roundness Proportion | Anatomical Region of Face: AR03_JowlSize |
|---|---|

Describes degree of jowl rounding along the underline of the jowl as described by the ratio of the perpendicular distance of the Mid Jowl Point from the True Line of the Jowl and the overall length of the jowl.

| | |
|---|---|
| $\overline{MN} = \sqrt{(M_x - N_x)^2 + (M_y - N_y)^2}$ $\overline{NK} = \sqrt{(N_x - K_x)^2 + (N_y - K_y)^2}$ | $\overline{MK} = \sqrt{(M_x - K_x)^2 + (M_y - K_y)^2}$ Finds distance values for all sides of triangle |
| $\theta = \cos^{-1}\left(\dfrac{NK^2 - MN^2 - MK^2}{-2 * MN * MK}\right)$ | finds the angle for $\angle NMK$, denoted here as $\theta$ |
| $d = \sin(\theta) * \overline{MK}$ | finds the perpendicular depth of the jowl |
| $JRP = \dfrac{d}{\overline{MN}}$ | finds the Jowl Roundness Proportion, here defined as the perpendicular distance of rounding of the underline of the jowl from the True Line of the Jowl relative to the overall length of the jowl |

| Descriptor Name: Muzzle Size Proportion | Anatomical Region of Face: AR04_MuzzleShape |
|---|---|

Describes the overall size of the muzzle in terms of perpendicular height relative to overall length of the face

| | |
|---|---|
| $M_{ubb} = \dfrac{(U_y - bb_y)}{(U_x - bb_x)}$ | finds the slope of the True Line of the Head |
| $M_{pu} = -(M_{ubb})^{-1}$ | finds the slope perpendicular to the True Line of the Head |
| $R_x = \dfrac{(M_{ubb} * U_x - M_{pu} * F_x + F_y - U_y)}{(M_{ubb} - M_{pu})}$, | $R_y = M_{ubb} * (R_x - U_x) + U_y$ |
| finds the x and y-coordinates of intersect point R | |
| $M_{gh} = \dfrac{(G_y - H_y)}{(G_x - H_x)}$ | finds the slope of the True Line of the Chin |
| $M_{pk} = -(M_{gh})^{-1}$ | finds the slope perpendicular to the True Line of the Chin |
| $Q_x = \dfrac{(M_{gh} * G_x - M_{pb} * B_x + B_y - G_y)}{(M_{gh} - M_{pb})}$ | $Q_y = M_{ch} * (Q_x - G_x) + G_y$ |
| finds the x and y-coordinates of intersect point Q | |
| $\overline{BQ} = \sqrt{(B_x - Q_x)^2 + (B_y - Q_y)^2}$, $\overline{UR} = \sqrt{(U_x - R_x)^2 + (U_y - R_y)^2}$ finds the distance values for lines $\overline{BQ}$ and $\overline{UR}$ | |

| | |
|---|---|
| $\text{MSP} = \dfrac{\overline{BQ}}{\overline{UR}}$ | finds the Muzzle Size Proportion, here defined as the perpendicular height of the nuzzle relative to the overall length of the face |

| Descriptor Name: Mouth Inflexion Angle | Anatomical Region of Face: AR04_MuzzleShape |
|---|---|
| Describes the degree of inflexion/angulation taken by the lower portion of the muzzle as it contracts inwards from the Distal Nuzzle Point to the Distal Point of the Mouth. | |
| $\overline{BS} = \sqrt{(B_x - S_x)^2 + (B_y - S_y)^2}$, $\overline{BT} = \sqrt{(T_x - B_x)^2 + (T_y - B_y)^2}$, $\overline{ST} = \sqrt{(T_x - S_x)^2 + (T_y - S_y)^2}$ Finds distance values for all sides of triangle | |
| $\theta = \cos^{-1}\left(\dfrac{BT^2 - BS^2 - ST^2}{-2 * BS * ST}\right)$ | Finds angle value for Muzzle Slope Angle ($\angle ABC$), denoted here as $\theta$ |

| Descriptor Name: Full Angle Face | Anatomical Region of Face: AR04_MuzzleShape |
|---|---|
| Describes both the magnitude and rate of change of the thikness of the face. Gives an indication of the relationhip between the jowl region of the face and the muzzle. Identifies a "teacup muzzle". | |
| $m_{ab} = \dfrac{B_y - A_y}{B_x - A_x}$ | Finds the slope of the True Line of Face |
| $m_{cd} = \dfrac{D_y - C_y}{D_x - C_x}$ | Finds the slope of line fitted to underline of jaw |
| $Q_x = \dfrac{m_{ab} * A_x - m_{cd} * C_x + C_y - A_y}{m_{ab} - m_{cd}}$ | Finds the x-coordinate of the point "Q" where the rue line of the face and the line fitted to the underline of the jaw intersect |
| $Q_y = m_{ab}(Q_x - A_x) + A_y$ | Finds the y-coordinate for intersect point "Q" |
| $\overline{AC} = \sqrt{(C_x - A_x)^2 + (C_y - A_y)^2}$, $\overline{AQ} = \sqrt{(A_x - Q_x)^2 + (A_y - Q_y)^2}$, $\overline{CQ} = \sqrt{(C_x - Q_x)^2 + (C_y - Q_y)^2}$ Finds distance values for all sides of triangle | |
| $\text{FAF} = \theta = \cos^{-1}\left(\dfrac{\overline{AC}^2 - \overline{AQ}^2 - \overline{CQ}^2}{-2 * \overline{AQ} * \overline{CQ}}\right)$ | Finds the angle measurement for Full Angle Face ($\angle AQC$), here defined as the intersect angle of the upper and lower lines of the face (True Line of the Face & True Line of the Jaw) |

| Descriptor Name: Muzzle Roundness Proportion | Anatomical Region of Face: AR04_MuzzleShape |
|---|---|
| Dexcribes the degree of inflexion/angulation taken by the lower portion of the muzzle as it contracts inwards from the Distal Muzzle Point to the Distal Point of the Mouth. | |
| $\overline{ST} = \sqrt{(T_x - S_x)^2 + (T_y - S_y)^2}$, $\overline{SU} = \sqrt{(U_x - S_x)^2 + (U_y - S_y)^2}$, $\overline{UT} = \sqrt{(T_x - U_x)^2 + (T_y - U_y)^2}$ finds distance values for all sides of triangle | |
| $\theta = \cos^{-1}\left(\dfrac{\overline{UT}^2 - \overline{SU}^2 - \overline{ST}^2}{-2 * \overline{SU} * \overline{ST}}\right)$ | finds the angle for $\angle UST$, denoted here as $\theta$ |
| $\overline{d} = \sin(\theta) * \overline{EN}$ | finds the height of triangle $\Delta STU$ |
| $\text{MRP} = \dfrac{d}{\overline{UT}}$ | Finds the Muzzle Roundness Proportion, here defined as the perpendicular displacement of the Distal Muzzle Point from the line of the nuzzle formed by the Lower Nostril Point and Distal Mouth Point. |

| Descriptor Name: Forehead Height Angle | Anatomical Region of Face: AR04_MuzzleShape |
|---|---|
| Describes the angle of rise of the forehead along the topline of the face from the True Line of the Head. | |
| $m_{be} = \dfrac{B_y - E_y}{B_x - E_x}$ | Finds the slope of the True Line of Face |
| $m_{ubb} = \dfrac{U_y - bb_y}{U_x - bb_x}$ | Finds the slope of line fitted to underline of jaw |
| $Q_x = \dfrac{m_{be} * B_x - m_{ubb} * U_x + U_y - B_y}{m_{be} - m_{ubb}}$ | Finds the x-ccordinate of the point "Q" where the true line of the face and the line fitted to the underline of the jaw intersect |
| $Q_y = m_{be}(Q_x - B_x) + B_y$ | Finds the y-coordinate for intersect point "Q" |
| $\overline{Qbb} = \sqrt{(Q_x - bb_x)^2 + (Q_y - bb_y)^2}$ | $\overline{EQ} = \sqrt{(E_x - Q_x)^2 + (E_y - Q_y)^2}$, $\overline{Ebb} = \sqrt{(E_x - bb_x)^2 + (E_y - bb_y)^2}$, finds distance values for all sides of triangle |

-continued

| | |
|---|---|
| $FAF = \theta = \cos^{-1}\left(\dfrac{\overline{Ebb}^2 - \overline{EQ}^2 - \overline{Qbb}^2}{-2*\overline{EQ}*\overline{Qbb}}\right)$ | Finds the angle measure for Forehead Height Angle ($\angle EQB$), here defined as the intersect angle of the topline of the face and the True Line of the Head |

Descriptor Name: Muzzle Slope Angle      Anatomical Region of Face: AR04_MuzzleShape Describes the degree of slope/angulation taken by the top line of the muzzle and upper lip. Identifies a "moose" nose. Partially differentiates between a round and square muzzle.

| | |
|---|---|
| $\overline{BC} = \sqrt{(C_x - B_x)^2 + (C_y - B_y)^2}$, $\overline{BS} = \sqrt{(B_x - S_x)^2 + (B_y - S_y)^2}$, $\overline{CS} = \sqrt{(C_x - S_x)^2 + (C_y - S_y)^2}$ | Finds distance values for all sides of triangle |
| $\theta = \cos^{-1}\left(\dfrac{\overline{BS}^2 - \overline{BC}^2 - \overline{CS}^2}{-2*\overline{BC}*\overline{CS}}\right)$ | Finds angle valu for Muzzle Slope Angle ($\angle ABC$), denoted here as $\theta$ |

Descriptor Name: Zygomatic Ridge Angles      Anatomical Region of Face: AR13_ZygomaticProces Describes the angle of the Zygomatic Ridge, from the point of the Zygomatic Process Point to the Distal Check Point, relative to the upper and lower lines of the face.

| | |
|---|---|
| $m_{yz} = \dfrac{Z_y - Y_y}{Z_x - Y_x}$ | Finds the slope of the Zygomatic Ridge |
| $m_{ab} = \dfrac{B_y - A_y}{B_x - A_x}$ | finds the slope of the True Line of the Face |
| $m_{mn} = \dfrac{M_y - N_y}{M_x - N_x}$ | Finds the slope of the Line of the Jaw |
| $R_x = \dfrac{m_{ab}*A_x - m_{yz}*Z_x + Z_y - A_y}{m_{ab} - m_{yz}}$ | $R_y = m_{ab}(R_x - A_x) + A_y$ | finds the x-coordinate and y-coordinate of intersect point R

| | |
|---|---|
| $Q_x = \dfrac{m_{mn}*N_x - m_{yz}*Z_x + Z_y - N_y}{m_{mn} - m_{yz}}$ | $Q_y = m_{mn}(Q_x - N_x) + N_y$ | finds the x-coordinate and y-coordinate of intersect point Q $\overline{BR} = \sqrt{(B_x - R_x)^2 + (B_y - R_y)^2}$   $\overline{NQ} = \sqrt{(N_x - Q_x)^2 + (N_y - Q_y)^2}$
$\overline{BY} = \sqrt{(B_x - Y_x)^2 + (B_y - Y_y)^2}$   $\overline{NY} = \sqrt{(N_x - Y_x)^2 + (N_y - Y_y)^2}$
$\overline{RY} = \sqrt{(R_x - Y_x)^2 + (R_y - Y_y)^2}$   $\overline{QY} = \sqrt{(Q_x - Y_x)^2 + (Q_y - Y_y)^2}$ finds the distance values for all legs of the triangles

| | |
|---|---|
| $ZRAU = \theta_U = \cos^{-1}\left(\dfrac{\overline{BY}^2 - \overline{RB}^2 - \overline{RY}^2}{-2*\overline{BB}*\overline{BY}}\right)$ | Finds the Zygomatic Ridge Angle$_{Upper}$, here defined as the angkle of the Zygomatic Ridge bon as it relates to the True Line of the Face |
| $ZRAL = \theta_L = \cos^{-1}\left(\dfrac{\overline{NY}^2 - \overline{QY}^2 - \overline{QN}^2}{-2*\overline{QY}*\overline{QN}}\right)$ | finds the Zygomatic Ridge Angle$_{lower}$, here defined as the angle of the Zygomatic Ridge bone as it relates to the Line of the Jaw |

Descriptor Name: Top Eye Angle      Anatomical Region of Face: AR11_EyeShape

Describes degree of angulation in the bone structure of the upper portion of the eye orbital. Differentiates between hard and soft eyes. Partially identifies triangularly-shaped eyes.

| | |
|---|---|
| $\overline{Abb} = \sqrt{(bb_x - A_x)^2 + (bb_y - A_y)^2}$   $\overline{Acc} = \sqrt{(cc_x - A_x)^2 + (cc_y - A_y)^2}$ $\overline{bbcc} = \sqrt{(cc_x - bb_x)^2 + (cc_y - bb_y)^2}$ | Finds distance values for all sides of triangle |
| $\theta = \cos^{-1}\left(\dfrac{\overline{Abb}^2 - \overline{Acc}^2 - \overline{bbcc}^2}{-2*\overline{Acc}*\overline{bbcc}}\right)$ | Finds angle value for Top Eye Angle ($\angle ACB$), denoted here as $\theta$ |

Descriptor Name: Eye Size Proportion$_{Length}$      Anatomical Region of Face: AR11_EyeShape Describes the size of the eye orbital in terms of length relative to the scale of the face as a whole.

| | |
|---|---|
| $\overline{AB} = \sqrt{(B_x - A_x)^2 + (B_y - A_y)^2}$ | Finds the length of the True Line of the Face |
| $\overline{Abb} = \sqrt{(A_x - bb_x)^2 + (A_y - bb_y)^2}$ | Finds the lateral distance of the eye |
| $ESP_L = \overline{Abb}/\overline{AB}$ | Finds the Eye Size Proportion$_{Height}$ measure, which measures the size of the eye normalized the conserved distance of the True Line of the Face |

-continued

| Descriptor Name: Eye Protuberance Proportion | Anatomical Region of Face: AR11_EyeShape |
|---|---|
| Describes the overall portion of the eye visible from a frontal view in terms of lateral protrusion distance relative to the overall width of the forehead, which effects the range of a horse's frontal vision when set up into the bridle. | |
| $M_{ab} = \dfrac{(A_y - B_y)}{(A_x - B_x)}$ | finds the slope of the True Line of the Forehead |
| $M_p = -(M_{ab})^{-1}$ | finds the slope perpendicular to the True Line of the Forehead |
| $Q_{lx} = \dfrac{(M_p * C_x - M_{ab} * A_x + A_y - C_y)}{(M_p - M_{ab})}$ | finds the X-coordinate of perpendicular intercept point $Q_L$ |
| $Q_{ly} = M_{ab} * (Q_{lx} - A_x) + A_y$ | finds the y-coordinate of perpendicular intercept point $Q_L$ |
| $Q_{rx} = \dfrac{(M_d * D_x - M_{ab} * A_x + A_y - D_y)}{(M_p - M_{ab})}$ | finds the x-coordinate of perpendicular intercept point $Q_L$ |
| $Q_{ry} = M_{ab} * (Q_{rx} - A_x) + A_y$ | finds the y-coordinate of perpendicular intercept point $Q_L$ |
| $\overline{AB} = \sqrt{(A_x - B_x)^2 + (A_y - B_y)^2}$ | finds the overall distance across the forehead |
| $\overline{AQ_l} = \sqrt{(A_x - Q_{lx})^2 + (C_y - Q_{ly})^2}$ | finds the maximal lateral distance of eye proportion of the left eye |
| $\overline{BQ_r} = \sqrt{(A_x - Q_{rx})^2 + (C_y - Q_{ry})^2}$ | finds the maximal lateral distance of eye proportion of the right eye |
| $EPP = \dfrac{\overline{AQ_l} - \overline{BQ_r}}{2 * \overline{AB}}$ | finds the Eye Protuberance Proportion, here defined as the average distance of lateral protrusion of the eye relative to the overall distance across the forehead |

| Descriptor Name: Eye Height Proportion | Anatomical Region of Face: AR11_EyeShape |
|---|---|
| Describes the perpendicular height of the eye above the midline of the eye relative to the eyes overall length. | |
| $\overline{Abb} = \sqrt{(bb_x - A_x)^2 + (bb_y - A_y)^2}$    $\overline{Acc} = \sqrt{(cc_x - A_x)^2 + (cc_y - A_y)^2}$ | |
| $\overline{bbcc} = \sqrt{(cc_x - bb_x)^2 + (cc_y - bb_y)^2}$ | Finds distance values for all side of triangle |
| $\theta_U = \cos^{-1}\left(\dfrac{\overline{Acc}^2 - \overline{Abb}^2 - \overline{bbcc}^2}{-2 * \overline{Abb} * \overline{Bcc}}\right)$ | finds the angle for $\angle ABC$, denoted here as $\theta$ |
| $d = \sin(\theta) * bbcc$ | finds the perpendicular height of the eye |
| $EHP = \dfrac{d}{\overline{Abb}}$ | finds the Eye Height Proportion, here defined as the ratio of the perpendicular height of the eye and the overall length of the eye |

| Descriptor Name: Eye Size Proportion$_{Height}$ | Anatomical Region of Face: AR11_EyeShape |
|---|---|
| Describes the size of the eye orbital in terms of length relative to the scale of the face as a whole. | |
| $\overline{AB} = \sqrt{(B_x - A_x)^2 + (B_y - A_y)^2}$ | Finds the length of the True Line of the Face |
| $\overline{Abb} = \sqrt{(bb_x - A_x)^2 + (bb_y - A_y)^2}$, $\overline{Acc} = \sqrt{(cc_x - A_x)^2 + (cc_y - A_y)^2}$, | |
| $\overline{Add} = \sqrt{(dd_x - A_x)^2 + (dd_y - A_y)^2}$, $\overline{bbcc} = \sqrt{(cc_x - bb_x)^2 + (cc_y - bb_y)^2}$, | |
| $\overline{bbdd} = \sqrt{(dd_x - bb_x)^2 + (dd_y - bb_y)^2}$ | Finds distance values for all sides of triangle |
| $\theta_U = \cos^{-2}\left(\dfrac{\overline{Acc}^2 - \overline{Abb}^2 - \overline{bbcc}^2}{-2 * \overline{Abb} * \overline{Bcc}}\right),$ | $d_U = \sin(\theta) * \overline{bbdd}$ |
| | finds the perpendicular height of the eye |
| $\theta_L = \cos^{-2}\left(\dfrac{\overline{Add}^2 - \overline{Abb}^2 - \overline{bbdd}^2}{-2 * \overline{Abb} * \overline{bbdd}}\right),$ | $d_L = \sin(\theta) * \overline{bbdd}$ |
| | finds the perpendicular depth of the eye |
| $ESP_H = \dfrac{d_U + d_L}{\overline{AB}}$ | finds the Eye Size Proportion$_{Height}$, which measures the cumulative perpendicular height of the eye relative to the length of the True Line of the Face |

| Descriptor Name: Uppr Maxima Point Proportion Eye | Anatomical Region of Face: AR11_EyeShape |
|---|---|
| Describes the location of the highest point of the eye orbital relative to the lateral extrema of the eye. Identifies triangular-shaped eyes. | |
| $\overline{Abb} = \sqrt{(bb_x - A_x)^2 + (bb_y - A_y)^2}$    $\overline{Acc} = \sqrt{(cc_x - A_x)^2 + (cc_y - A_y)^2}$ | |
| $\overline{bbcc} = \sqrt{(cc_x - bb_x)^2 + (cc_y - bb_y)^2}$ | Finds distance values for all sides of traingle |

-continued

| | |
|---|---|
| $\theta = \cos^{-1}\left(\dfrac{\overline{Acc}^2 - \overline{Abb}^2 - \overline{bbcc}^2}{-2 * \overline{Abb} * \overline{Bcc}}\right)$ | Finds the angle measure ∠ABC, denoted here as θ |
| d = cos θ * $\overline{bbcc}$ | Finds the distance between the right extrema point of the eye and the perpendicular intersect point of the upper maxima point of the eye |
| UMPP = d/Abb | Finds the Upper Maxima Point Preportion of the Eye, which is here defined as the proportion of the lateral distance across the eye located bhind the perpendicular intersect of the upper maxima point of the eye |

| Descriptor Name: Eye Roundness Proportion | Anatomical Region of Face: AR11_EyeShape |
|---|---|
| Describes the perpendicular height of deviation of the Upper Media Eye Point from the Caudal Line of the Eye relative to the ovrall length of the backside of the eye. | |
| $\overline{bbcc} = \sqrt{(bb_x - cc_x)^2 + (bb_y - cc_y)^2}$ <br> $\overline{ccee} = \sqrt{(cc_x - ee_x)^2 + (cc_y - ee_y)^2}$ | $\overline{bbee} = \sqrt{(bb_x - ee_x)^2 + (bb_y - ee_y)^2}$ <br> Finds distance values for all sides of triangle |
| $\theta = \cos^{-1}\left(\dfrac{\overline{bbee}^2 - \overline{bbcc}^2 - \overline{ccee}^2}{-2 * \overline{bbcc} * \overline{ccee}}\right)$ | finds the angle for ∠BCE, denoted here as θ |
| d = sin(θ) * $\overline{ccee}$ | finds the perpendicular roundness height of the eye |
| ERP = $\dfrac{d}{\overline{bbcc}}$ | finds the Eye Roundness Proportion, here defined as the perpendicular deviation height of the Upper Media Eye Point relative to the overall length of the Caudal Line of the Eye |

| Descriptor Name: Lower Minima Point Proportion Eye | Anatomical Region of Fees: AR11_Eye Shape |
|---|---|
| Describes the location of the lowest point of the eye orbital relative to the lateral extrema of the eye. Identifies "almond"-shaped eyes. | |
| $\overline{Abb} = \sqrt{(bb_x - A_x)^2 + (bb_y - A_y)^2}$ <br> $\overline{bbdd} = \sqrt{(dd_x - bb_x)^2 + (dd_y - bb_y)^2}$ | $\overline{Add} = \sqrt{(dd_x - A_x)^2 + (dd_y - A_y)^2}$ <br> Finds distance values for all sides of triangle |
| $\theta = \cos^{-1}\left(\dfrac{\overline{Add}^2 - \overline{Abb}^2 - \overline{bbdd}^2}{-2 * \overline{Abb} * \overline{bbdd}}\right)$ | Finds the angle measure ∠ABD, denoted here as θ |
| d = cosθ * $\overline{bbdd}$ | Finds the distance between the right extrema point of the eye and the perpendicular intersect point of the lower minima point of the eye |
| UMPP = d/Abb | Finds the Lower Minima Point Proportion of the Eye, which is here defined as the proportion of the lateral distance across the eye located bhind the perpendicular intersect of the lower minima point of the eye |

| Descriptor Name: Eye Height-to-Length Proportion | Anatomical Region of Face: AR11_EyeShape |
|---|---|
| Describes the cumulative perpendicular height of the eye relative to the overall length of the eye. | |
| $\overline{Abb} = \sqrt{(bb_x - A_x)^2 + (bb_y - A_y)^2}$ <br> $\overline{Add} = \sqrt{(dd_x - A_x)^2 + (dd_y - A_y)^2}$ <br> $\overline{bbdd} = \sqrt{(dd_x - bb_x)^2 + (dd_y - bb_y)^2}$ | $\overline{Acc} = \sqrt{(cc_x - A_x)^2 + (cc_y - A_y)^2}$ <br> $\overline{bbcc} = \sqrt{(cc_x - bb_x)^2 + (cc_y - bb_y)^2}$ <br> Finds distance values for all sides of triangle |
| $\theta_U = \cos^{-1}\left(\dfrac{\overline{Acc}^2 - \overline{Abb}^2 - \overline{bbcc}^2}{-2 * \overline{Abb} * \overline{Bcc}}\right)$ | $d_U = \sin(\theta) * \overline{bbdd}$ <br> finds the perpendicular height of the eye |
| $\theta_L = \cos^{-1}\left(\dfrac{\overline{Add}^2 - \overline{Abb}^2 - \overline{bbdd}^2}{-2 * \overline{Abb} * \overline{bbdd}}\right)$ | $d_L = \sin(\theta) * \text{bbdd}$ <br> finds the perpendicular depth of the eye |
| EHtLP = $\dfrac{d_U + d_L}{\overline{Abb}}$ | finds the Eye Height-to-Length Proportion, here defined as the ratio of the cumulative perpendicular height of to the horizontal length of the eye |

| Descriptor Name: Eye Height Proportion | Anatomical Region of Face: AR11-EyeShape |
|---|---|
| Describes the perpendicular height of the eye above the midline of the eye relative to the eyes overall length. <br> $\overline{Abb} = \sqrt{(bb_x - A_x)^2 + (bb_y - A_y)^2}$, $\overline{Add} = \sqrt{(dd_x - A_x)^2 + (dd_y - A_y)^2}$, <br> $\overline{bbdd} = \sqrt{(dd_x - bb_x)^2 + (dd_y - bb_y)^2}$, Finds distance values for all sides of triangle | |

| | |
|---|---|
| $\theta = \cos^{-1}\left(\dfrac{\overline{Add}^2 - \overline{Abb}^2 - \overline{bbdd}^2}{-2*\overline{Abb}*\overline{bbdd}}\right)$ | finds the angle for ∠ABD, denoted here as θ |
| $d = \sin(\theta) * \overline{bbdd}$ | finds the perpendicular depth of the eye |
| $\theta_U = \cos^{-1}\left(\dfrac{\overline{Acc}^2 - \overline{Abb}^2 - \overline{bbcc}^2}{-2*\overline{Abb}*\overline{Bcc}}\right)$ | finds the Eye Depth Proportion, here defined as the ratio of the perpendicular depth of the eye and the overall length of the eye |

| Descriptor Name: Eye Orbital Lateral Protuberance Proportion | Anatomical Region of Face: AR11_EyeShape |
|---|---|

Describes the degree to which the lateral-most point of the boney portion of the eye orbital extends beyond the line of the cheek, which effects the range of a horses causal and ventral vision when set up into the bridle.

| | |
|---|---|
| $M_{oh} = \dfrac{(E_y - H_y)}{(E_x - H_x)}$ | finds the slope of the Line of the Cheek |
| $M_o = -(M_{eh})^{-1}$ | finds the slope perpendicular to the Line of the Cheek |
| $Q_x = \dfrac{(M_p * G_x - M_{ab} * E_x + E_y - G_y)}{(M_p - M_{ab})}$ | finds the x-coordinate of perpendicular intercept point Q |
| $Q_y = M_{eh} * (Q_x - E_x) + E_y$ | finds the y-coordinate of perpendicular intercept point Q |
| $\overline{GQ} = \sqrt{(G_x - G_x)^2 + (G_y - G_y)^2}$ | finds the distance of eye orbital protrusion |
| $\overline{BF} = \sqrt{(B_x - F_x)^2 + (B_y - F_y)^2}$ | finds the maximal lateral thickness of the cheeks |
| $EOLPP = \dfrac{\overline{GQ}}{\overline{EP}}$ | finds the Eye Orbital Lateral Protuberance Proportion, here defined as the overall perpendicular distance of eye orbital displacement from the line of the cheek relative to the overall measure of cheek thickness |

| Descriptor Name: Eye Extrema Intersect Angle | Anatomical Region of Face: AR11_EyeShape |
|---|---|

Describes the angle at which the upper and lower extreme points of the eye are set against one another in relation to the True Line of the Eye.

| | |
|---|---|
| $M_{Abb} = \dfrac{(A_y - bb_y)}{(A_x - bb_x)}$ | finds the slope od line $\overline{Abb}$ |
| $M_{ccdd} = \dfrac{(cc_y - dd_y)}{(cc_x - dd_x)}$ | finds the slope of line ccdd |
| $Q_x = \dfrac{(M_{Abb} * A_x - M_{ccdd} * cc_x + cc_y - A_y)}{(M_{Abb} - M_{ccdd})}$ | finds the x-coordinate of the intersect point Q |
| $Q_y = M_{Abb} * (Q_x - A_x) + A_y$ | finds the x-coordinate of the intersect point Q |
| $\overline{AQ} = \sqrt{(Q_x - A_x)^2 + (Q_y - A_y)^2}$ | $\overline{Acc} = \sqrt{(cc_x - A_x)2 + (cc_y - A_y)^2}$ |
| $\overline{Qcc} = \sqrt{(cc_x - Q_x)^2 + (cc_y - Q_y)^2}$ | finds distance values for all sides of triangle |
| $EXIA - \theta = \cos^{-1}\left(\dfrac{\overline{Acc}^2 - \overline{AQ}^2 - \overline{Qcc}^2}{-2*\overline{AQ}*\overline{Qcc}}\right)$ | finds the Eye Extrema Intersect Angle, here defined as angle θ |

| Descriptor Name: Forehead Width Angle | Anatomical Region of Face: AR12_ForeheadWidth |
|---|---|

Describes the degree to which the forehead widens beyond the nares (central line of the skull)

| | |
|---|---|
| $m_{ab} = \dfrac{B_y - A_y}{B_x - A_x}$ | Finds the slope of the True Line of the Forehead, here defined as the line between the inner extrema points of the eyes |
| $m_p = -(m_{ab})^{-1}$ | Finds the slope perpendicular to the True Line of the Forehead |
| $R_x = \dfrac{m_{ab} * A_x - m_p * C_x + C_y - A_y}{m_{ab} - m_p}$ | Finds the x-coordinate of the intersection point between the true line of the face and its perpendicular bisector incluive of point C |
| $R_y = m_{ab}(R_x - A_x) + A_y$ | Finds the y-coordinate of the intersection point "R" |
| $S_x = \dfrac{m_{ab} * A_x - m_p * D_x + D_y - A_y}{m_{ab} - m_p}$ | Finds the x-coordinate of the intersection point between the true line of the forehead and its perpendicular bisector inclusive of pint D |

-continued

| | |
|---|---|
| $S_y = m_{ab}(S_x - A_x) + A_y$ | Finds the y-coordinate of intersect point "S" |
| $\overline{AC} = \sqrt{(C_x - A_x)^2 + (C_y - A_y)^2}$, $\overline{AR} = \sqrt{(A_x - R_x)^2 + (A_y - R_y)^2}$, $\overline{BD} = \sqrt{(D_x - B_x)^2 + (D_y - B_y)^2}$, $\overline{BS} = \sqrt{(B_x - S_x)^2 + (B_y - S_y)^2}$ | Finds distance values for all sides of triangles |
| $\theta_R = \sin^{-1}\left(\dfrac{AR}{AC}\right)$ | Finds the angle measure ∠ACR of forehead protuberance for the left side of the face |
| $\theta_S = \sin^{-1}\left(\dfrac{BS}{BD}\right)$ | Finds the angle measure ∠BDS of forehead protuberance for the right side of the face |
| $FWA = (\theta_B + \theta_S)/2$ | Finds the Forehead Width Angle, the average of the two angles of deviation of the extrema points of the eyes from the center line of the face |

| Descriptor Name: Check-to-Zygomatic Height Ratio | Anatomical Region of Face: AR13_ZygomaticProces |
|---|---|

Describes the ratio of Cheek and Zygomatic Process height in terms of distance from the topline of the face.

| | |
|---|---|
| $m_{yz} = \dfrac{Z_y - Y_y}{Z_x - Y_x}$ | finds the slope of the Zygomatic Ridge |
| $m_{ab} = \dfrac{A_y - B_y}{A_x - B_x}$ | finds the slope of the True Line of the Face |
| $m_{yz} = \dfrac{Z_y - Y_y}{Z_x - Y_x}$ | finds the slope of the Line of the Forehead |
| $m_p = -(m_p)^{-1}$ | finds the slope perpendicular to the Zygomatic Ridge |
| $Q_x = \dfrac{m_{ef} * E_x - m_p * Z_x + Z_y - E_y}{m_{ef} - m_p}$ | $Q_y = m_{ef}(Q_x - E_x) + E_y$ |
| | finds the x-coordinate and y-coordinate of intersect point Q |
| $R_x = \dfrac{m_{ab} * A_x - m_p * Y_x + Y_y - A_y}{m_{ab} - m_p}$ | $R_y = m_{ab}(R_x - A_x) + A_y$ |
| | finds the x-coordinate and y-coordinate of intersect point R |
| $\overline{RY} = \sqrt{(R_x - Y_x)^2 + (R_y - Y_y)^2}$ | finds the height of line RY, here defined as the height of the cheek |
| $\overline{QZ} = \sqrt{(Q_x - Z_x)^2 + (Q_y - Z_y)^2}$ | finds the height of line RY, here defined as the height of the Zygomatic Process |
| $CtZHP = \overline{RY}/\overline{QZ}$ | Finds the Cheek-to-Zygomatic Height Proportion, here defined as the ratio between the distance from the Distal Cheek Point to the True Line of the Face and the distance from the Zygomatic Process Point and the Line of the Forehead |

| Descriptor Name: Ear Inflexion Proportion | Anatomical Region of Face: AR09_EarShape |
|---|---|

Describes the degree to which the inner line of the ear curves inward between the upper-most point of the ear and the medial pinna point.

| | |
|---|---|
| $M_{np} = \dfrac{(N_y - P_y)}{(N_x - P_x)}$ | finds the slope of line $\overline{NP}$ |
| $M_p = -(M_{np})^{-2}$ | finds the slope perpendicular to line $\overline{NP}$ |
| $Q_x = \dfrac{(M_p * J_x - M_{np} * N_x + N_y - J_y)}{(M_p - M_{np})}$ | finds the x-coordinate of perpendicular intercept point Q |
| $Q_y = M_{np} * (Q_x - P_x) + P_y$ | finds the y-coordinate of perpendicular intercept point Q |
| $\overline{QJ} = \sqrt{(J_x - Q_x)^2 + (J_y - Q_y)^2}$ | finds the distance of eye orbital protrusion |
| $\overline{PN} = \sqrt{(P_x - N_x)^2 + (P_y - N_y)^2}$ | finds the maximal lateral thickness of the cheeks |
| $EIP = \dfrac{\overline{QJ}}{\overline{PN}}$ | finds the Ear Inflexion Proportion, here defined as the perpendicular distance of inflexion relative to the overall distance of concavity along the inner line of the ear |

-continued

| Descriptor Name: Ear Width-to-Breadth Proportion | Anatomical Region of Face: AR09_EarShape |
|---|---|

Describes the overall width of the broadcast section of the ear relative to its overall length.

$M_x = 0.5(|K_x - J_x|) + J_x, M_y = I_y = K_y$ finds the upper mid-ear point

| | |
|---|---|
| $\overline{LM} = \sqrt{(L_x - M_x)^2 + (L_y - M_y)^2}$ | finds the length of the ear |
| $\overline{NH} = \sqrt{(N_x - H_x)^2 + (N_y - H_y)^2}$ | finds the width of the ear |
| $EIP = \dfrac{\overline{NH}}{\overline{LM}}$ | finds the Ear Width-to-Breadth Proportion, here defined as the width of the ear at its broadest point relative to its overall length |

| Descriptor Name: Degree of Ear Flare | Anatomical Region of Face: AR09_EarShape |
|---|---|

Describes degree to which the medical portion of the inner ear flares inward beyond the base structure of the ear.

| | |
|---|---|
| $M_x = 0.5(|K_x - J_x|) + J_x*$ | finds the upper mid-ear point |
| $M_y = I_y = K_y$ | |
| $m_{jt} = \dfrac{J_y - T_y}{J_x - T_x}$ | finds the slope of the line $\overline{JT}$ |
| $M_p = -(M_{jt})^{-1}$ | finds the slope perpendicular to line JT |
| $Q_x = \dfrac{(M_p * N_x - M_{jt} * J_x + J_y - N_y)}{(M_p - M_{jt})}$ | $Q_y = m_{ab} * (Q_x - A_x) + A_y$ |
| | finds the x and y-coordinates of perpendicular intersect point Q |
| $\overline{NQ} = \sqrt{(N_x - Q_x)^2 + (N_y - Q_y)^2}$ | finds the perpendicular distance of flaring |
| $\overline{LM} = \sqrt{(L_x - M_x)^2 + (L_y - M_y)^2}$ | finds the overall length of the ear |
| $DoEF = \dfrac{\overline{NQ}}{\overline{LM}}$ | finds the Degree of Ear Flare, here defined as the degree of perpendicular rise of the medial portion of the inner ear relative to the overall length of the ear |

| Descriptor Name: Chin Width-to-Height Proportion | Anatomical Region of Face: AR05_ChinShape |
|---|---|

Describes the ratio of the coverall length of the chin to its height at its minimal-most point.

$\overline{GH} = \sqrt{(G_x - H_x)^2 + (G_y - H_y)^2}, \overline{GI} = \sqrt{(G_x - I_x)^2 + (G_y - I_y)^2},$
$\overline{HI} = \sqrt{(H_x - I_x)^2 + (H_y - I_y)^2}$ Finds distance values for all sides of triangle

| | |
|---|---|
| $\theta = \cos^{-1}\left(\dfrac{\overline{HI}^2 - \overline{GI}^2 - \overline{GH}^2}{-2*\overline{GI}*\overline{GH}}\right)$ | finds the angle for $\angle HGI$, denoted here as $\theta$ |
| $\overline{QI} = \sin(\theta) * \overline{GI}$ | finds the finds the height of triangle $\Delta GHI$ (perpendicular height of the chin) |
| $CWtHP = \dfrac{\overline{QI}}{\overline{GH}}$ | finds the Chin Width-to-Height Proportion, here defined as the ratio of the length of the chin to its maximal perpendicular height |

| Descriptor Name: Chin Length Angle | Anatomical Region of Face: AR05_ChinShape |
|---|---|

Describes the overall length of the chin relative to the degree to chich it protrudes from the underside of the jowl bone. Differentiates between a long and short chin. Partially identifies a thin chin.

$\overline{GH} = \sqrt{(G_x - H_x)^2 + (G_y - H_y)^2}, \overline{GI} = \sqrt{(G_x - I_x)^2 + (G_y - I_y)^2},$
$\overline{HI} = \sqrt{(H_x - I_x)^2 + (H_y - I_y)^2}$ Finds distance values for all sides of triangle $\theta = \cos^{-1}\left(\dfrac{\overline{GH}^2 - \overline{GI}^2 - \overline{HI}^2}{-2*\overline{GI}*\overline{HI}}\right)$     Finds angle value for Chin Length Angle ($\angle ACB$), denoted as $\theta$

| Descriptor Name: Chin Firmness Proportion | Anatomical Region of Face: AR05_ChinShape |
|---|---|

Describes the overall tightness of the chin, as reflected closeness of the Chin Maxima Point to the Caudal Chin Point relative to the overall length of the chin

| | |
|---|---|
| $M_{gh} = \dfrac{(G_y - H_y)}{(G_x - H_x)}$ | finds the slope of line $\overline{GH}$ |
| $M_{qi} = -(M_{qi})^{-1}$ | finds the slope of line $\overline{QI}$, perpendicular to line $\overline{GH}$ |
| $Q_x = \dfrac{(M_{gh} * G_x - M_{gi} * I_x + I_y - G_y)}{(M_{gh} - M_{gi})}$ | finds the x-coordinate of the perpendicular intersection point Q |

-continued

| | |
|---|---|
| $Q_y = M_{gh} * (Q_x - G_x) + G_y$ | finds the y-coordinate of intersect point Q |
| $\overline{GH} = \sqrt{(G_x - H_x)^2 + (G_y - H_y)^2}, \overline{GQ} = \sqrt{(G_x - Q_x)^2 + (G_y - Q_y)^2}$ Finds distance values for lines $\overline{GH}$ and $\overline{GQ}$ | |
| $CFP = \dfrac{\overline{GQ}}{\overline{GH}}$ | finds the Chin Firmness Proportion, here defined as the distance at which the Chin Minima Point is located from the front of the chin |

Descriptor Name: Chin Thickness Angle — Anatomical Region of Face: AR05_ChinShape Describes the position of the minima point of chin relative to the point where the chin first becomes distinguishable from the lip. Diferentiates between a relaxed and tight chin.

$$\overline{GH} = \sqrt{(G_x - H_x)^2 + (G_y - H_y)^2}, \overline{GI} = \sqrt{(G_x - I_x)^2 + (G_y - I_y)^2},$$
$$\overline{HI} = \sqrt{(H_x - I_x)^2 + (H_y - I_y)^2} \text{ Finds distance values for all sides of triangle}$$

| | |
|---|---|
| $\theta = \cos^{-1}\left(\dfrac{\overline{HI}^2 - \overline{GI}^2 - \overline{GH}^2}{-2 * \overline{GI} * \overline{GH}}\right)$ | Finds the angle value for Chin Thickness Angle ($\angle BAC$), denoted here as $\theta$ |

Descriptor Name: Lip Length Proportion — Anatomical Region of Face: AR05_ChinShape Describes the length of overhand of the lower lip as it compares to the overall length of the chin.

| | |
|---|---|
| $M_{gh} = \dfrac{(G_y - H_y)}{(G_x - H_x)}$ | finds the slope of line $\overline{GH}$ |
| $M_{kq} = -(M_{kq})^{-1}$ | finds the slope of line $\overline{KQ}$, perpendicular to line $\overline{GH}$ |
| $Q_x = \dfrac{(M_{gh} * G_x - M_{kq} * K_x + K_y - G_y)}{(M_{gh} - M_{kq})}$ | finds the x-coordinate of the perpendicular intersection point Q |
| $Q_y = M_{gh} * (Q_x - G_x) + G_y$ | finds the y-coordinate of intersect point Q |
| $\overline{HQ} = \sqrt{(H_x - Q_x)^2 + (H_y - Q_y)^2}, \overline{GQ} = \sqrt{(G_x - Q_x)^2 + (G_y - Q_y)^2}$ Finds distance values for lines $\overline{HQ}$ and $\overline{KQ}$ | |
| $LLP = \dfrac{\overline{GQ}}{\overline{HQ}}$ | finds the Lip Length Proportion, here defined as the length of overhang of the lower lip relative to the overall length of the chin |

Descriptor Name: Chin Fullness Proportion — Anatomical Region of Face: AR05_ChinShape Describes the fullness/roundness of the chin as the perpendicular deviation of the profile of the chin from the front line of the chin relative to the overall length of the front line of the chin.

$$\overline{GI} = \sqrt{(G_x - I_x)^2 + (G_y - I_y)^2}, \overline{GJ} = \sqrt{(G_x - J_x)^2 + (G_y - J_y)^2},$$
$$\overline{JI} = \sqrt{(J_x - I_x)^2 + (J_y - I_y)^2} \text{ Finds distance values for all sides of the triangle}$$

| | |
|---|---|
| $\theta = \cos^{-1}\left(\dfrac{\overline{JI}^2 - \overline{GI}^2 - \overline{GJ}^2}{-2 * \overline{GI} * \overline{GJ}}\right)$ | finds the angle for $\angle GJI$, denoted here as $\theta$ |
| $\overline{QI} = \sin(\theta) * \overline{GI}$ | finds the finds the height of triangle $\Delta GJI$ (perpendicular thickness height of the chin) |
| $CWtHP = \dfrac{\overline{QJ}}{\overline{GI}}$ | finds the Chin Fullness Proportion, here defined as the perpendicular deviation of the Mid-Chin Point from the front line of the chin relative to the overall length of the front line of the chin |

Descriptor Name: Mouth Length Proportion — Anatomical Region of Face: AR06_MouthLength Describes the length of the mouth relative to the overall length of the head

| | |
|---|---|
| $M_{ubb} = \dfrac{(U_y - bb_y)}{(U_x - bb_x)}$ | finds the slope of the True Line of the Head |
| $M_{pu} = -(M_{ubb})^{-1}$ | finds the slope perpendicular to the True Line of the Head |
| $R_x = \dfrac{(M_{ubb} * U_x - M_{pu} * F_x + F_y - U_y)}{(M_{ubb} - M_{pu})}$ | $R_y = M_{ubb} * (R_x - U_x) + U_y$ |
| | finds the x and y-coordinates of intersected point R |
| $\overline{JT} = \sqrt{(J_x - T_x)^2 + (J_y - T_y)^2}$ | finds the length of the mouth |
| $\overline{UR} = \sqrt{(U_x - R_x)^2 + (U_y - R_y)^2}$ | finds the full length of the head |

-continued

| | |
|---|---|
| $\text{MLP} = \dfrac{\overline{JT}}{\overline{UR}}$ | finds the Mouth Length Proportion, here defined as the length of the mouth relative to the overall length of the head |

| Descriptor Name: Lip Protuberance Proportion | Anatomical Region of Face: AR06_MouthLength |
|---|---|
| Describes the degree to which the lower lip protrudes beyond the distal-most point of the mouth. | |
| $m_{jt} = \dfrac{J_y - T_y}{J_x - T_x}$ | finds the slope of the line of the mouth |
| $m_p = -(m_{jt})^{-1}$ | Finds the slope perpendicular to the line of the mouth |
| $Q_x = \dfrac{m_{jt} * T_x - m_p * K_x + K_y - T_y}{m_{jt} - m_p}$ | finds the x-coordinate of perpendicular intersect point Q |
| $Q_y = m_{jt}(Q_x - T_x) + T_y$ | finds the y-coordinate of intersect point "Q" |
| $\overline{JQ} = \sqrt{(J_x - Q_x)^2 + (J_y - Q_y)^2}$ | finds the total length of the lower lip |
| $\overline{TQ} = \sqrt{(T_x - Q_x)^2 + (T_y - Q_y)^2}$ | finds the distance which the distal-most point of the lower lip protrudes beyond the distal-most point of the mouth |
| $\sigma_u = \left(\dfrac{Q_x - T_x}{|Q_x - T_x|}\right)$ | finds the constant of lip position with magnitude 1 indicating the position of the lip beyond or behind the distal-most point of the mouth |
| $\text{LPP} = \sigma_u * \left(\dfrac{\overline{TQ}}{\overline{JQ}}\right)$ | finds the Lip Protuberance Proportion, which here defines the position of the distal-most point of the lower lip relative to the distal most point of the mouth |

| Descriptor Name: Nostril Length Proportion | Anatomical Region of Face: AR07_NostrilShape |
|---|---|
| Describes the lateral length across the nostril relative to the overall length of the upper lip. | |
| $\overline{BU} = \sqrt{(B_x - U_x)^2 + (B_y - U_y)^2}$ | Finds the length of the nostril |
| $\overline{UT} = \sqrt{(U_x - T_x)^2 + (U_y - T_x)^2}$ | Finds the length of the upper lip |
| $\text{NWP} = \overline{BU}/\overline{UT}$ | Finds the Nostril Length Proportion, here defined at the lateral length of the nostril relative to the overall length of the upper lip |

| Descriptor Name: Degree of Nostril Flutendess | Anatomical Region of Face: AR07_NostrilShape |
|---|---|
| Describes the degree to which excess skin along the inside of the nostril extends and curls around the inner line of the nostril. | |
| $M_{xs} = \dfrac{(X_y - S_y)}{(X_x - S_x)}$ | finds the slope of the Line of the Inner Nostril |
| $M_p = -(M_{xs})^{-1}$ | finds the slope perpendicular to the Line of the Inner Nostril |
| $Q_x = \dfrac{(M_{xs} * S_x - M_p * Z_x + Z_y - S_y)}{(M_{xs} - M_u)}$ | $Q_y = M_{ty} * (Q_x - T_x) + T_y$ |
| | finds the x and y-coordinates of intersect point Q |
| $\overline{XS} = \sqrt{(X_x - S_x)^2 + (X_y - S_y)^2}$ | finds the overall length of the nostril |
| $\overline{ZQ} = \sqrt{(Z_x - Q_x)^2 + (Z_y - Q_y)^2}$ | finds the perpendicular distance of rise of the fleshy skin flap of the inner nostril from the Line of the Inner Nostril |
| $\text{DoNF} = \dfrac{\overline{ZQ}}{\overline{XS}}$ | finds the Degree of Nostril Flutedness, here defined as the distance of inflexion of the skin of the inner nostril from the Line of the Inner Nostril (the flute of the nose) relative to the overall length of the nostril |

| Descriptor Name: Nose Width-to-Height Proportion | Anatomical Region of FAce: AR07_NostrilShape |
|---|---|
| Describes the perpendicular height of the nose relative to the overall breadth of the nose. | |
| $M_{xy} = \dfrac{(X_y - Y_y)}{(X_x - Y_x)}$ | finds the slope of the Upper Line of the Nostril |
| $M_p = -(M_{xy})^{-1}$ | finds the slope perpendicular to the Upper Line of the Nostril |
| $Q_x = \dfrac{(M_{xy} * Y_x - M_p * S_x + S_y - Y_y)}{(M_{xy} - M_u)}$ | $Q_y = M_{xy} * (Q_x - X_x) + X_y$ |
| | finds the x and y-coordinates of intersect point Q |
| $\overline{XY} = \sqrt{(X_x - Y_x)^2 + (X_y - Y_y)^2}$ | finds the overall breadth of the nostril |
| $\overline{QS} = \sqrt{(S_x - Q_x)^2 + (S_y - Q_y)^2}$ | finds the perpendicular height of the nose |

-continued

| | |
|---|---|
| $DWtHP = \dfrac{\overline{QS}}{\overline{XY}}$ | finds the Nose Width-to-Height Proportion, here defined as the ratio between the perpendicular height of the nostrils and the overall breadth of the nose |

| Descriptor Name: Degree of Nostril Roundness | Anatomical Region of Face: AR07_NostrilShape |
|---|---|

Describes the perpendicular height of the outer edge of the nostril above the line of the innr nostril. Identifies horses with large and/or flared nostrils.

| | |
|---|---|
| $M_{ty} = \dfrac{(T_y - Y_y)}{(T_x - Y_x)}$ | finds the slope of the Line of the Inner Nostril |
| $M_p = -(M_{ty})^{-1}$ | finds the slope perpendicular to the Line of the Inner Nostril |
| $Q_x = \dfrac{(M_{ty} * T_x - M_p * V_x + V_y - T_y)}{(M_{ty} - M_u)}$ | $Q_y = M_{ty} * (Q_x - T_x) + T_y$ |
| | finds the x and y-coordinates of intersect point Q |
| $\overline{TY} = \sqrt{(T_x - Y_x)^2 + (T_y - Y_y)^2}$ | finds the overall length of the nostril |
| $\overline{VQ} = \sqrt{(V_x - Q_x)^2 + (V_y - Q_y)^2}$ | finds the perpendicular width of the nostril at its widest point |
| $DoNR = \dfrac{\overline{VQ}}{\overline{TY}}$ | finds the Degree of Nostril Roundness, here defined as the perpendicular width of the nostril at its widest point elative to the overall length of the nostril |

| Descriptor Name: Inner-Nostril Convergence Proportion | Anatomical Region of Face: AR07_NostrilShape |
|---|---|

Describes the horizontal positions of the upper and lower medial points of the nostrils relative to one another as they align with the mid-line of the face. Differentiated between horses with flat vertically aligned nostrils and horses with highly curved angled nostrils.

| | |
|---|---|
| $\overline{ST} = \sqrt{(S_x - T_x)^2 + (S_y - T_y)^2}$ | Finds lateral distance across the upper bridge of the nose |
| $\overline{XY} = \sqrt{(X_x - Y_x)^2 + (X_y - Y_x)^2}$ | Finds lateral distance across the lower bridge of the nose |
| $INCP = \overline{ST}/\overline{XY}$ | Finds the Inner-Nostril Convergence Proportion, as the ratio between the lateral distance between the upper and lower portions of the bridge of the nose |

| Descriptor Name: Nostril Width Proportion | Anatomical Region of Face: AR07-NostrilShape |
|---|---|

| | |
|---|---|
| $\overline{ST} = \sqrt{(S_x - T_x)^2 + (S_y - T_y)^2}$ | Finds lateral distance across muzzle non-inclusive of nostril area |
| $\overline{UV} = \sqrt{(U_x - V_x)^2 + (U_y - V_x)^2}$ | Finds total lateral distance across the muzzle |
| $NWP = \overline{ST}/\overline{UV}$ | Finds the Nostril Width Proportion, here defined as the lateral distance of the bridge of the nose relative to the overall distance across the muzzle inclusive of nostrils |

| Descriptor Name: Degree of Lip Inflexion | Anatomical Region of Face: AR08_LipShape |
|---|---|

Describes degree of inflexion/curvature of upper lip. Differentiates between flat and "heart-shaped" upper lip.

$\overline{AB} = \sqrt{(B_x - A_x)^2 + (B_y - A_y)^2}$, $\overline{AC} = \sqrt{(C_x - A_x)^2 + (C_y - A_y)^2}$,
$\overline{BC} = \sqrt{(C_x - B_x)^2 + (C_y - B_y)^2}$, Finds distance values for all sides of triangle

| | |
|---|---|
| $\theta = \cos^{-1}\left(\dfrac{\overline{BC}^2 - \overline{AB}^2 - \overline{AC}^2}{-2 * \overline{AB} * \overline{AC}}\right)$ | Finds the angle measure for $\angle BAC$, denoted here as $\theta$ |
| $d = \sin\theta * \overline{AC}$ | Finds the distance "d" of inflexion |
| $DoLP = d/\overline{AB}$ | Finds Degree of Lip Inflexion, which is here defined to the distance of medial inflexion of the lip relative to the overall width of the lips |

| Descriptor Name: Ear Roundness Proportion | Anatomical Region of Face: AR09_EarShape |
|---|---|

Describes the degree to which the tip of the ear curves inward away from the midline of the ear. This measure distinguishes between curvatures at the top of the ear due to cancavity at the tip and curvature due to actual rounding of the ear structure.

$M_x = 0.5(|K_x - J_x|) + J_x^*$, $M_y = I_y = K_y$
finds the upper mid-ear point

| | |
|---|---|
| $m_{ml} = \dfrac{M_y - L_y}{M_x - L_x}$ | finds the slope of the Midline of the Ear |
| $M_p = -(M_{ml})^{-1}$ | finds the slope perpendicular to the Midline of the Ear |
| $Q_x = \dfrac{(M_p * P_x - M_{ml} * L_x + L_y - P_y)}{(M_p - M_{ml})}$ | $Q_y = M_{ab} * (Q_x - A_x) + A_y$ |

| | |
|---|---|
| $\overline{PQ} = \sqrt{(P_x - Q_x)^2 + (P_y - Q_y)^2}$ | finds the x and y-coordinates of intersect point Q<br>finds the perpendicular distance of rounding at the tip of the ear |
| $\overline{LM} = \sqrt{(L_x - M_x)^2 + (L_y - M_y)^2}$ | finds the overall length of the ear |
| $ERP = \dfrac{\overline{QJ}}{\overline{PN}}$ | finds the Ear Roundness Proportion, here defined as the perpendicular distance of inward curvature of the tip of the ear from the midline of the ear, reltive to the overall length of the ear |

| Descriptor Name: Ear Rotation Proportion | Anatomical Region of Face: AR10_EarPosition |
|---|---|

Describes the degree of rotation of the ear as it is naturally set onto the forehead. Ears that are set wider apart and therefore farther down the poll are rotated laterally and show from the frontal view lesser pinna area. This measure reflects the proportion of area located at the base of the ear visually identified as pinna, differentiating between horses with wide and narrow set ears.

| | |
|---|---|
| $m_{ab} = \dfrac{B_y - A_y}{B_x - A_x}$ | Finds the slope of the True Line of the Forehead, here defined as the line between the inner extrema points of the eyes |
| $m_p = -(m_{ab})^{-1}$ | Finds the slope perpendicular to the True Line of the Forehead |

$$N_x = \frac{m_{ab}*A_x - m_p*C_x + C_y - A_y}{m_{ab} - m_p} \quad P_x = \frac{m_{ab}*A_x - m_p*D_x + D_y - A_y}{m_{ab} - m_p}$$

$$Q_x = \frac{m_{ab}*A_x - m_p*E_x + E_y - A_y}{m_{ab} - m_p}$$

FInds the x-coordinates of the intersection points between the true line of the forehead and its perpendicular bisector incluive of pint C, D, and E respectively
$N_y = m_{ab}(N_x - A_x) + A_y \quad P_y = m_{ab}(P_x - A_x) + A_y$
$Q_y = m_{ab}(Q_x - A_x) + A_y$
Find the y-coordinated corresponding to intersect points N, P, and Q

| | |
|---|---|
| $\overline{NP} = \sqrt{(P_x - N_x)^2 + (P_y - N_y)^2}$ | Finds the distance across the base of the ear non-inclusive of pinna |
| $\overline{NQ} = \sqrt{(Q_x - N_x)^2 + (Q_y - N_y)^2}$ | Finds the total distance across the base of the ear |
| $ERP = \overline{NP}/\overline{NQ}$ | Finds the Ear Rotation Proportion, here defined as the proportion of the base of the ear non-inclusive of pinna as a indication of degree of rotation and wideness of set |

| Descriptor Name: Ear Set Angle | Anatomical Region of Face: AR10_EarPosition |
|---|---|

Describes the angle at which the ears are positioned onto the top of the skull, reflecting the natural position of the ears when the horse is in an emotionally neutral state of mind. Differentiates between wide, narrow, and vertically places ears.
When the anatomical reference points are manually selected, the most appropriate to use must be chosen based on how clearly the anatomical reference point can be seen and by which ear shows the highest degree of forward rotation.. The point on the inside curvature of the ear should be at the medial-most point of the curve, and the point of the outside curvature of the ear should be traced over so that the horizontal cross-hairs remain aligned horizontally with the inner ear point.

| | |
|---|---|
| $M_x = 0.5(|K_x - J_x|) + J_x*$<br>$M_y = I_y = K_y$ | finds the upper mid-ear point |
| $m_{ml} = \dfrac{M_y - L_y}{M_x - L_x}$ | finds the slope of the Midline of the Eare |
| $Q_x = \dfrac{(M_{ab}*A_x - M_{ml}*L_x + L_y - A_y)}{(M_{ab} - M_{ml})}$ | finds the x and y-coordinates of intersect point Q |

$Q_y = M_{ab} * (Q_x - A_x) + A_y$
$\overline{AB} = \sqrt{(A_x - B_x)^2 + (A_y - B_y)^2}, \quad \overline{AM} = \sqrt{(M_x - A_x)^2 + (M_y - A_y)^2}, \quad \overline{MQ} = \sqrt{(M_x - Q_x)^2 + (M_y - Q_y)^2}$
Finds the lengths of all sides of the triangle

| | |
|---|---|
| $ESA = \theta = \cos^{-1}\left(\dfrac{AM^2 - AB^2 - MQ^2}{-2*AB*MQ}\right)$ | Finds the Ear Set Angle, defined here as the angle at which the midline of the ear meets the True Line of the Face |

Nevertheless, these anatomical regions and measurements are exemplary rather than exhaustive, as others could be added to or removed from the set within the spirit and scope of the disclosure. Moreover, although FIGS. 1 through 13 show anatomical regions of the equine face, embodiments may be applied to other equine anatomical regions or to anatomical regions of other domesticated animals, such as donkeys, cattle, oxen, llamas, sheep, goats, dogs, camels, geese, chickens, turkeys, cats, and pigs.

Figure 15:
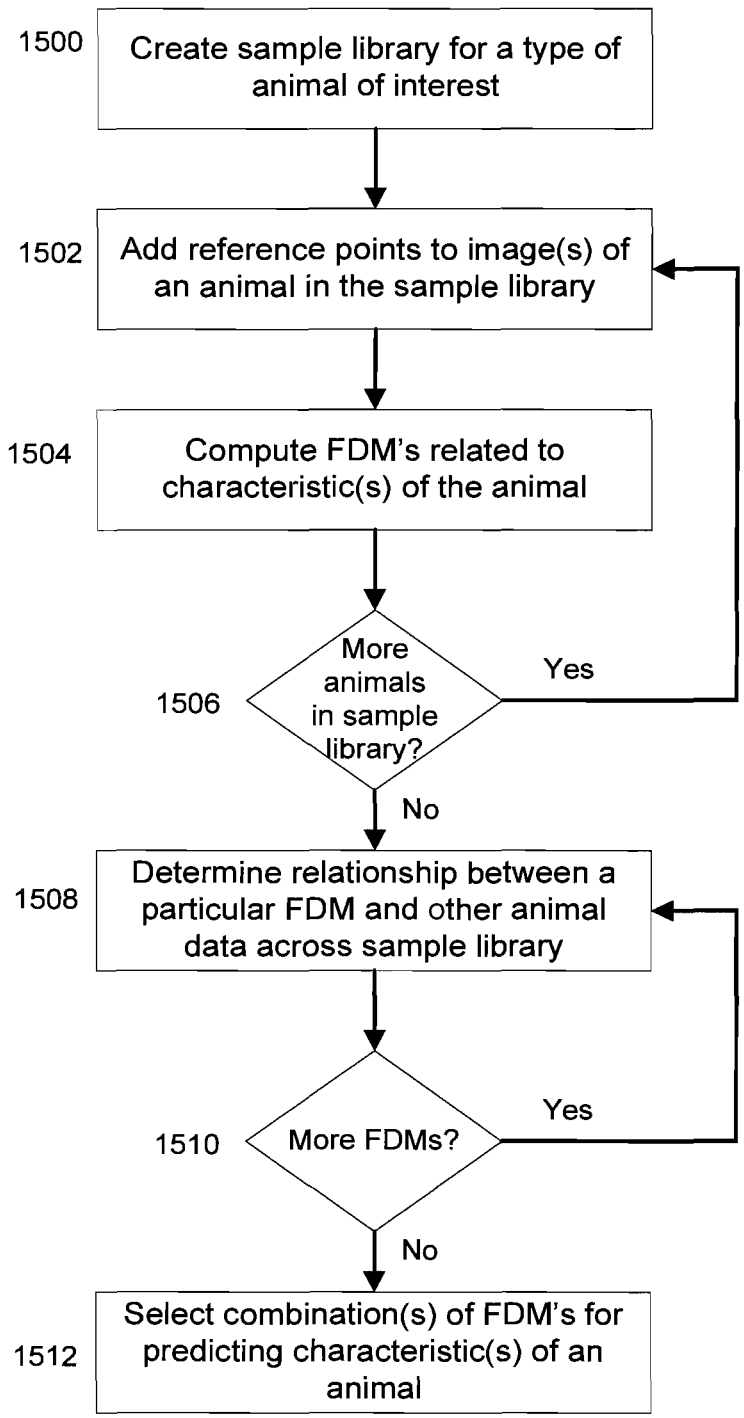
FIG. 15 shows a method for determining a predictor of a characteristic of an animal according to an embodiment of the present disclosure.

FIG. 15 shows an embodiment in the form of a method for determining a predictor of a characteristic of a particular type of animal. As used herein, "type" refers to breed, species, sub-species, or any other relevant genetic similarity. In step 1500, a sample library is created for the type of animal of interest. This step comprises obtaining one or more digital images of an anatomical region for each of a plurality of animals of interest, e.g., an equine face. The image may be obtained in various ways, such as from a memory card of a digital camera, by downloading via File Transfer Protocol (FTP), via email, etc. Once obtained, the images are stored in a memory operably connected to a digital computer, such as memory that is either locally or remotely accessible by the computer, including an attached hard drive, removable flash drive, network drive, RAID (redundant array of independent disks) drive, removable memory card, etc.

Step 1500 also comprises obtaining additional data related to the characteristic of the particular type of animal and storing it in the same or a different memory operably connected to the digital computer. As used herein, "data" may refer to performance records, vital statistics, and/or any other quantitative information that is related in some way to the characteristic of interest. While qualitative data may also be used, in many embodiments the qualitative data is converted into quantitative data for easier use by the system. The additional data may pertain to individual animals in the sample library, groups of animals in the sample library, or more generally the type of animal. The additional data is stored in a manner and location by which it can be associated with the sample library images, such as in a relational database accessible by the digital computer.

In an exemplary embodiment, the animal of interest is an Arabian horse and the characteristic of interest is whether the animal is best suited for the English Pleasure (EP), Western Pleasure (WP), or Working Western (WW) riding discipline. For this purpose, a sample library of digital images of Arabian horses may be collected, together with additional data relating to their known riding disciplines. The number of horses in the sample library may be chosen based on availability and desired statistical accuracy of the predictor, as readily understood by persons of ordinary skill in the art. In the exemplary embodiment, the sample library comprises 81 Arabian horses, each with annotated images and information about their riding discipline.

In step 1502, a plurality of reference points are added to the one or more stored images of a particular animal in the sample library. This may be accomplished in an automated fashion or manually, for example by use of a program with a graphical user interface (GUI) running on the digital computer. For example, the one or more images can be processed by MATLAB, an advanced mathematical analysis program sold by The Mathworks, Inc., of Natick, Massachusetts (http://www.mathworks.com). MATLAB provides advanced image processing features and flexible options for definition of large numbers of variables, specifically matrices. Reference points are added to each of the images by using the MATLAB "GInput" command, which provides an interactive selection GUI. In some embodiments, reference points are manually selected on the image. One such embodiment is the exemplary equestrian embodiment, in which FIGS. 1 through 13 were manually annotated with reference points (e.g., points A, B, and C in FIG. 1A). In other embodiments, reference points may be added automatically by MATLAB or another software application based on a generic model of the animal's face. Once the reference points are entered onto an image, MATLAB maps their pixel locations within the image to numerical coordinates within the corresponding matrix to facilitate further computation.

In step 1504, one or more facial descriptor measurements (FDMs) related to the characteristic of interest are computed from the set of reference points that were added to the one or more digital images of the animal. In the exemplary equestrian embodiment, the facial descriptor measurements may be computed using distance measurements and trigonometric functions as illustrated in FIGS. 1-13. Because length distance measurements are based on coordinate positions within the pixel matrix, the absolute distance values may be sensitive to factors such as camera resolution, artifacts of one or more compressions of the image, and cropping applied to isolate the face. To overcome such factors, the length measurements may be normalized to structural reference lengths that are effectively constant among animals of the same type and subject to the same set of factors. For example, in FIG. 1A, the facial inflection distance, d, is normalized by the overall length of the facial profile, AB. However, it is apparent to one of ordinary skill that the facial descriptor measurements may be based upon absolute or non-normalized length measurements if the factors described above were not present or were not a concern. In other embodiments, one or more of the facial descriptor measurements may be based on an angular measurement or an area measurement. The facial descriptor measurements may be based on non-trigonometric calculations, such integral calculus calculations, or a combination of trigonometric and non-trigonometric calculations.

In some embodiments, one or more of the digital images of the animal are three-dimensional images. Such images may be created by combining multiple two-dimensional images of the animal using stereophotogrammetry or other methods known to persons of ordinary skill in the art. In such embodiments, one or more of the facial descriptor measurements may be based on a three-dimensional measurement, such as an absolute volume, a volumetric ratio, a solid angle, or a combination thereof.

As shown in FIG. 15, steps 1502 and 1504 are repeated for each animal in the sample library. Once complete, in step 1508, a relationship is determined between a particular facial descriptor measurement and the additional data related to the characteristic of interest using all animals in the sample library. For example, the relationship can be determined from the mathematical correlation between the facial descriptor measurement and additional data for all animals in the sample library. The correlation may be normalized or scaled as necessary to make it meaningful for further computation or interpretation. Other measures can be used to determine the effectiveness of a facial descriptor measurement in the model. For example, in categorical models (e.g., those used to predict riding discipline), ROC curve analysis may be used to select indicator of categorical potential, as described further below. Multi-dimensional, Euclidean distance analysis also may be used to separate two groups categorically. Other methods for determining a relationship based on appropriate statistical models are apparent to persons of ordinary skill in the art. In the exemplary equestrian embodiment, the relationship is based on the correlation between the facial descriptor measurement and the known riding discipline. As illustrated in FIG. 15, step 1506 is repeated for each facial descriptor measurement.

In step 1512, one or more of the facial descriptor measurements are selected to be used as predictors of the characteristic of interest. Any number of facial descriptor measurements—up to and including the entire set—may be selected. If there are multiple characteristics of interest, then a separate selection may be made for each characteristic. The selection may be made in various ways, depending on the available information and the characteristic of interest. Moreover, in step 1512, the combination of the selected facial descriptor measurements that optimizes the predictor is also determined. For example, an optimal linear combination of the selected subset of facial descriptor measurements is determined using statistical analysis techniques. In the spirit of the disclosure, however, a non-linear combination of the entire set, or a selected subset, of the facial descriptor measurements also may be determined from the sample library. If multiple characteristics are of interest, then an optimal combination for each characteristic may be selected.

Figure 21:
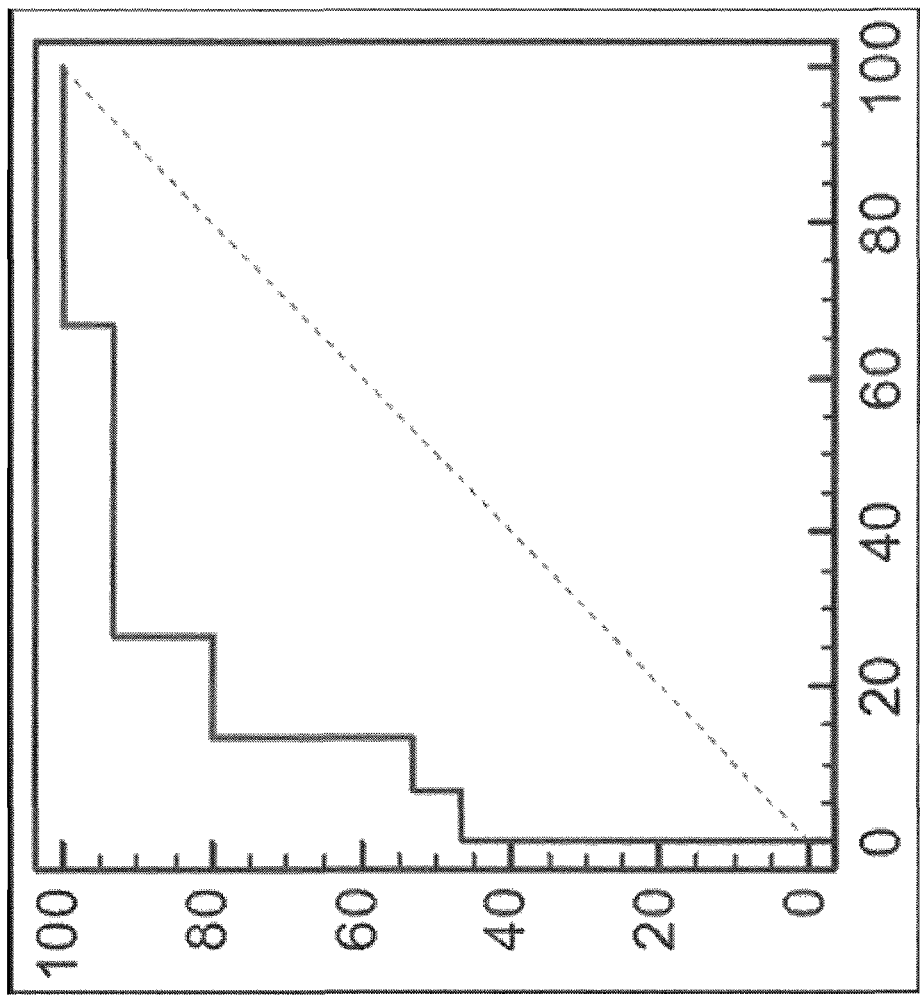
FIG. 21 shows an exemplary receiver operating characteristic (ROC) curve.

In the exemplary equestrian embodiment, facial descriptor measurements may be selected for predicting whether an Arabian horse is best suited for the English Pleasure (EP), Western Pleasure (WP), or Working Western (WW) riding discipline. Based on the categorical power of the facial descriptor measurements, ROC (receiver operating characteristic) analysis can be used to select facial descriptor measurement(s) that best categorizes the sample of horses into their actual riding disciplines. FIG. 21 shows an exemplary ROC curve, where the false positive rate is shown on the horizontal axis and the true positive rate is shown on the vertical axis. The ROC curve shown in FIG. 21 has an area of 0.801; a ROC curve area greater than 0.65 indicates that a particular facial descriptor measurement is useful for prediction or categorization.

In the subset selection of the exemplary embodiment, two sets of ROC curves were generated: one containing binomial separations (A vs. B) and the other single discipline isolations from the full population (A vs. B+C). The discipline combination among the isolation curves with the highest separation values was selected for use in the first tier of the classification model. The remaining two groups were then separated binomially in the second tier of the model. For each classification level of the model, the two individual facial descriptor measurements with the highest ROC scores were selected at the optimization variables. The strongest set of isolation ROC curves chosen to comprise the first tier of the model was the WW separation using descriptor values for AR03_Jowl Protuberance Proportion (ROC area=0.819) and AR03_Jowl-to-Underline Proportion (ROC area=0.817) as optimization variables. The second tier of the model separated binomially the EP and WP groups, utilizing descriptor values for AR10_Ear Rotation Proportion (ROC area=0.863) and AR11_Eye Size Proportion (ROC area=0.755).

Figure 18:
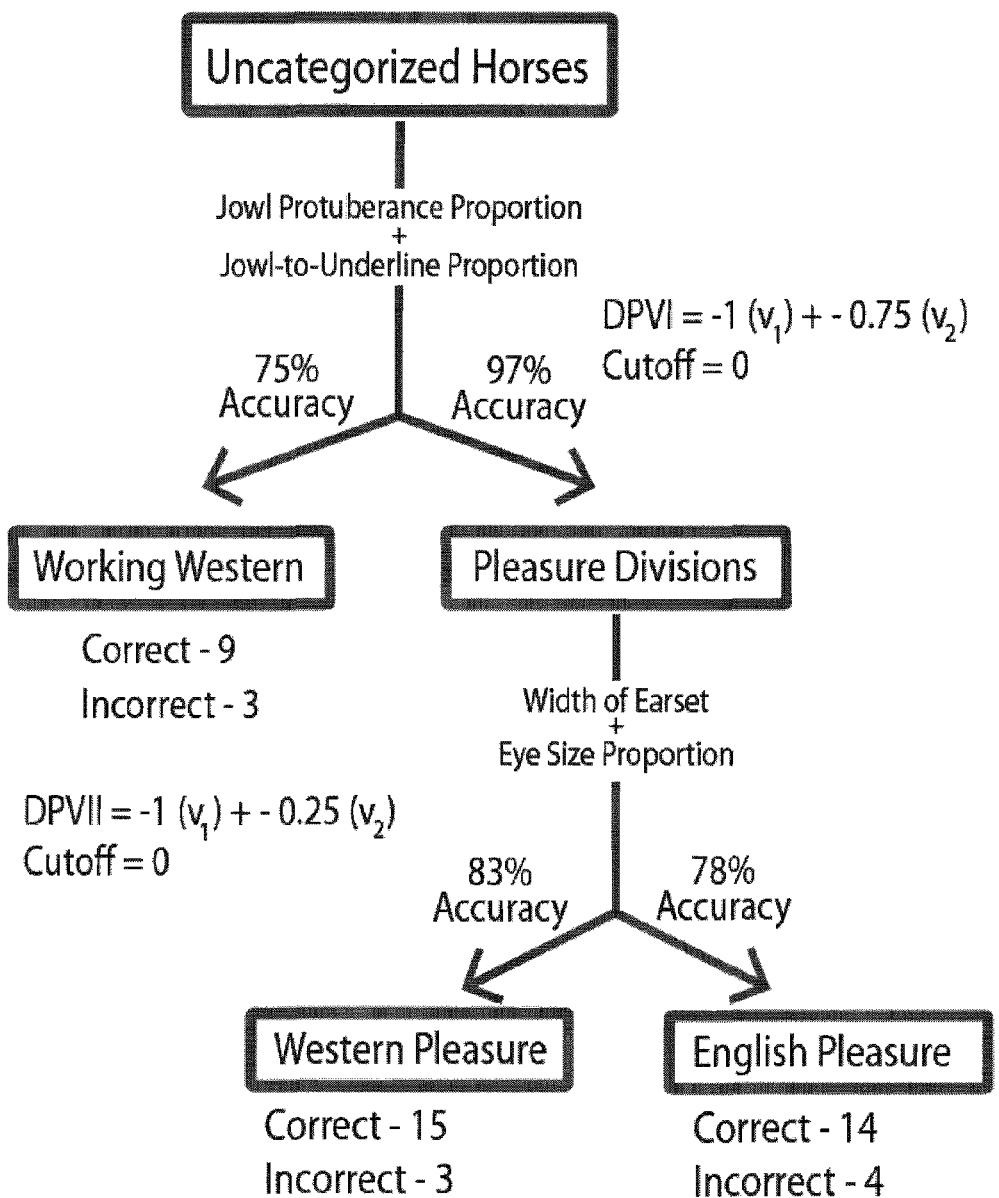
FIG. 18 shows an exemplary application of an embodiment of the present disclosure in categorizing horses into one of three different equestrian events.

At each tier of the model, the z-scores (also commonly known as standard scores or z-values) of the facial descriptor measurements selected as the optimization variables were linearly combined. Coefficients for these variables, in addition to the cutoff value itself, were then optimized on a training set consisting of eleven randomly selected horses in the sample library from each of the three riding disciplines. The optimization resulted in linear equations capable of producing discipline descriptor values that would accurately categorize the highest possible number of horses into their known disciplines. The optimized linear equations and cutoff were then used on the remaining 48 horses in the 81-horse sample library to validate the accuracy of the model. FIG. 18 shows the results of subset selection process as applied to the 81-horse sample library, resulting in selection of a linear combination of two of the facial descriptor measurements. The described method of selecting an optimal linear combination of the selected facial descriptor measurements is merely exemplary. In an alternate embodiment, the linear combination coefficients may be selected using the entire sample library. In the same manner, a non-linear combination of the selected facial descriptor measurements may be selected using optimization techniques including, but not limited to, Newton's Method and Lagrange's Method.

Figure 16:
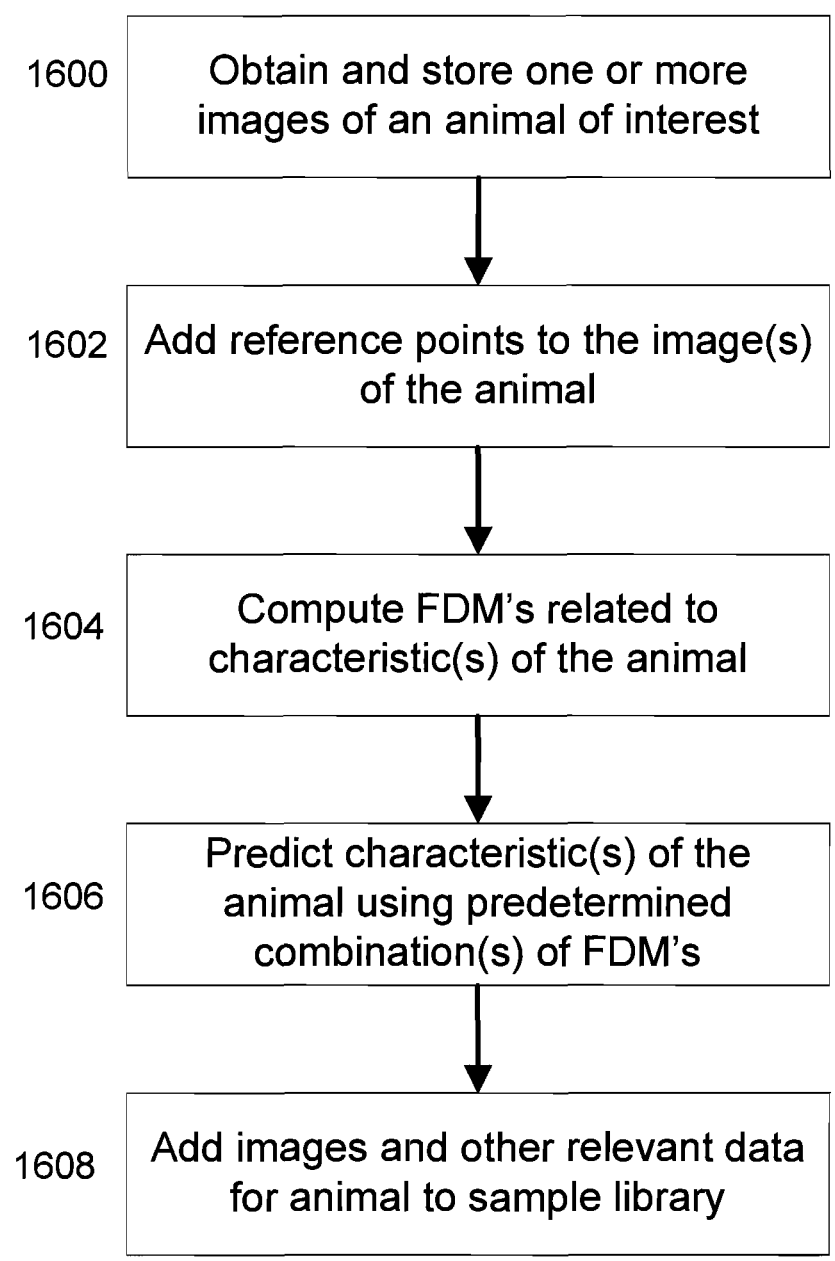
FIG. 16 shows a method for determining a characteristic of an animal according to another embodiment of the present disclosure.

According to the embodiment illustrated by FIG. 16, the selected subset and combination of facial descriptor measurements then can be used to predict a characteristic of an animal based on the facial descriptor measurements for that animal. In other words, the subset and combination selected based on the sample library can be applied to other animals of the same type to determine the characteristic for those animals. In step 1600, digital images and additional data is obtained and stored for an animal of interest, in the same manner as described above with reference to the sample library (i.e., step 1500 of FIG. 15). In step 1602, reference points consistent with those of the images in the sample library are added to the images of the animal of interest. In step 1604, facial descriptor measurements are calculated for the animal of interest. In the exemplary equestrian embodiment, the reference points and facial descriptor measurements are illustrated by FIGS. 1 through 13.

In step 1606, the subset and combination selected in step 1512 is applied to the facial descriptor measurements of the animal to predict the characteristic of interest. By way of example, the subset and combination shown in FIG. 18 is applied to the facial descriptor measurements of an Arabian horse to determine whether that animal is best suited for EP, WP, or WW riding discipline. In step 1608, the sample library optionally may be augmented by adding the image(s), additional data, and facial descriptor measurements for this animal. Subsequently, the method of FIG. 15 can be repeated using the augmented sample library, and the resulting predictor can be applied to additional animals of the same type in accordance with the method of FIG. 16.

Using the method illustrated by FIG. 15, facial descriptor measurements also may be selected for use in determining the performance of a particular horse in a desired riding discipline. Few accurate measures of performance exist within the equestrian industry. One exemplary measure of competitive performance is win percentile scores, here defined as the percentage of horses that a given horse was able to beat at point qualifying competition in a given season out of the total number of horses shown against. For each of the 81 horses, win percentiles were calculated for every season with the best win percentile retained. In one embodiment, selection of the subset of facial descriptor measurements is done by finding r-squared values representing the correlation between win percentiles and each of the facial descriptor measures for each discipline. For each riding discipline, the four descriptor values with the highest correlations were selected to be used to determine the performance characteristic for that discipline. However, the choice of four descriptor measurements is merely exemplary; fewer or more descriptor measurements may be selected.

Figure 19:
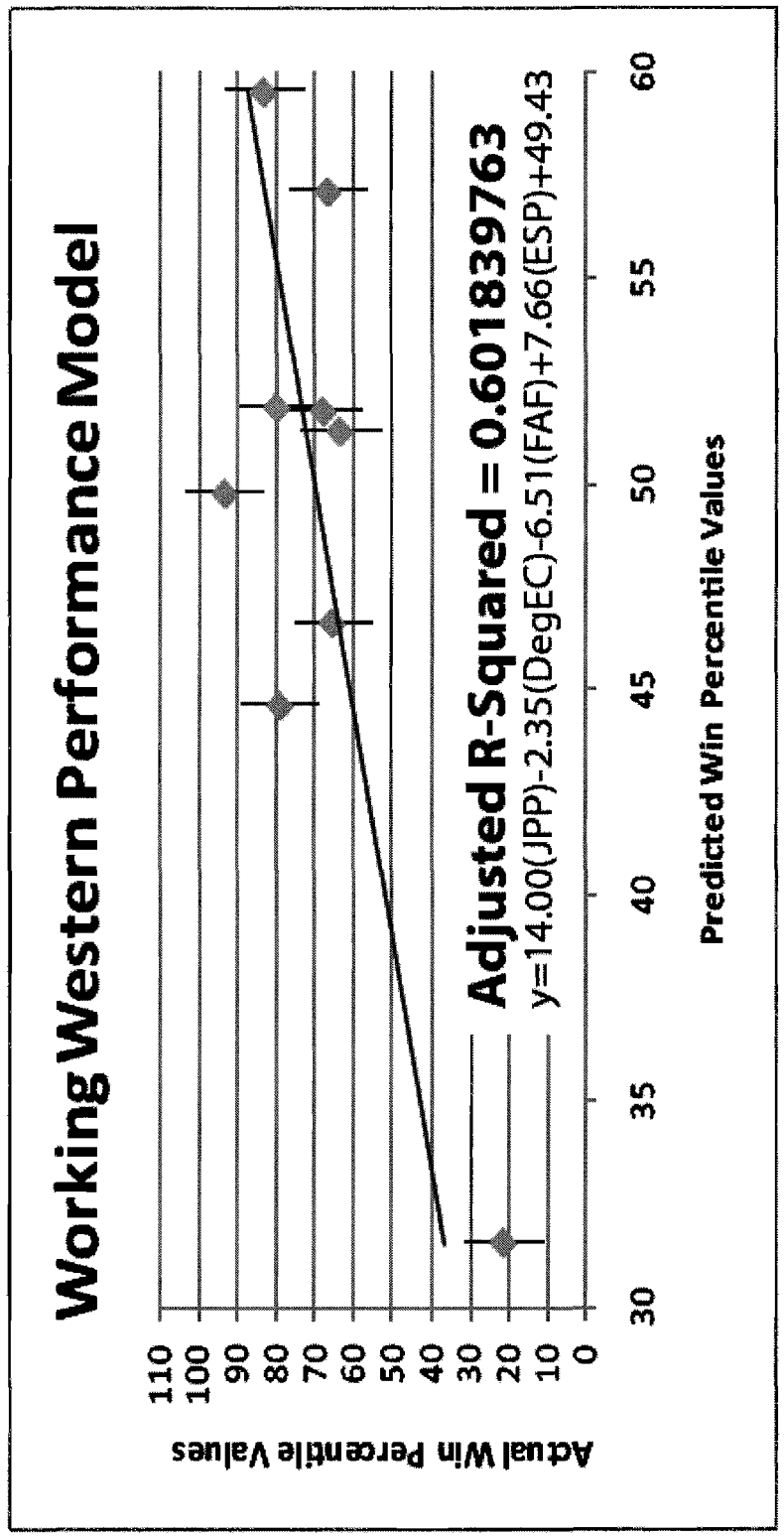
FIG. 19 shows an exemplary application of an embodiment of the present disclosure in predicting the performance of horses in a particular equestrian event.
Figure 20:
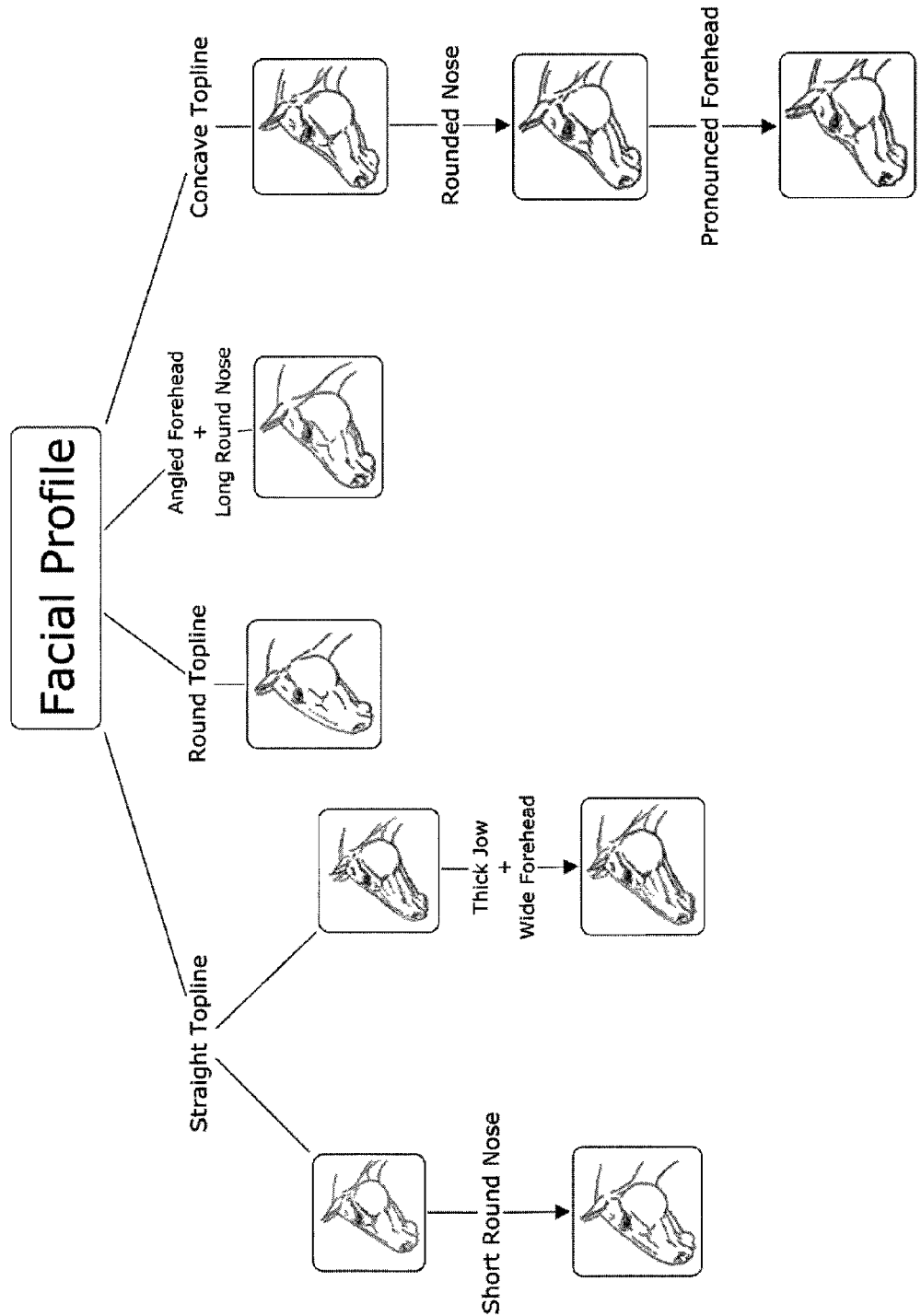
FIG. 20 shows an exemplary hierarchical system of the features of the equine facial profile.

In addition, for each riding discipline of interest, an optimal combination of the selected facial descriptor measurements is determined for that riding discipline. In some embodiments, the selected facial descriptor measurements may be combined linearly or non-linearly. In other embodiments, functions of the selected facial descriptor measurements may be combined linearly or non-linearly. In the exemplary equestrian embodiment described above, the z-scores of the facial descriptor measurements are combined linearly. The z-score for a particular facial descriptor measurement of an individual horse may be calculated using the mean and standard deviation of that facial descriptor measurement for all horses in the same library. More generally, the linear combination coefficients may be determined by applying multiple regression statistical techniques to the four selected facial predictor measurements for all horses in the sample library, all horses in the sample library that participate in a particular discipline, or a subset of horses from the sample library that participate in a particular discipline. The selected subset and combination of facial descriptor measurements are used to calculate a characteristic, also called a "performance model," indicative of the performance of horses of the same breed in the particular equestrian event. FIG. 19 shows an exemplary performance model for the WW event comprising a linear combination of the z-scores of facial descriptor measurements AR03_Jowl Protuberance Proportion, AR04_Full Angle Face, AR09_Degree of Ear Flare, and AR11_Eye Size Proportion. This performance model for the particular event, e.g., WW, can be applied to other horses outside of the sample library to predict the performance in that event based upon the selected facial descriptor measurements.

While embodiments have been described above in relation to categorizing and predicting the performance of horses in equestrian show events, embodiments also may be used to categorize and determine equestrian performance in racing events. This application is very important for a variety of reasons. First, due to the large investment in time and resources required to train a race horse, it is desirable to minimize the risk of investment by careful choice of which horses to, train for racing. Second, once trained for racing, these horses are poorly suited to other non racing activities (e.g., dressage, show jumping, pleasure riding etc.), and require a significant investment of time and skill to retrain to a new use off the track. Horses that are trained but eventually found to be unsuitable for racing often are euthanized or sold for slaughter, which could be avoided by more careful preliminary selection of training candidates.

The methods described above with reference to FIGS. 15 and 16 may be applied to racing horses in several different ways. First, as a threshold test, embodiments may determine a particular horse's suitability for racing. By analyzing features of the facial region, such as the ones described above, a potential buyer of a yearling race prospect can determine whether the cognitive and/or behavioral suitability of that horse for a racing justifies the purchase price and the necessary follow-on investment in training. Second, for those horses that are determined to be suitable for racing, embodiments also may determine which of the racing formats (i.e., distances) is most suited to that horse. For instance, embodiments may be used to determine whether the horse is best suited for sprints, middle-distance races, or longer-distance races such as a mile or more. Since each type of event entails a different but expensive training regimen, it is imperative to direct the racing-capable horse to the most suitable event. By ensuring that horses are placed only into races of distances which they are cognitively suited to handle, such information would allow owners to avoid placing unnecessary strain on their racing prospects that may ultimately lead to costly injuries and even breakdowns. Third, embodiments also may be applied to estimate the performance of a particular horse in a particular event. All three of these applications may be used individually or in combination.

In some embodiments, the facial analysis methods described above with reference to FIGS. 15 and 16 may be applied to each horse in the field of a particular race to predict the outcome of the race based on mental or other suitability of the horses to particular racing conditions or situations. For example, in maiden horses races, where natural speed of the individual horses is not so great a factor as their lack of racing experience, the disclosed facial analysis methods may be used to predict the horse most likely to win based on ability to adapt to the unfamiliar stress and distractions of a race day environment. The disclosed facial analysis methods may also be used to identify horses likely to place highly in races due to an innate "will to win". It is a widely accepted idea within the horse racing industry that thoroughbred racehorses run for different for different reasons. Most run simply because they are told, some run out of the pure joy of doing what they were bred to do, but true champions run because they come to understand the meaning of victory and thirst for the praise and attention of the winner's circle. In the final furlongs of long-distance, classic-format races, where all horses suffer from the exhaustion of considerable lactic acid build up, the courage to rally back and claim the win is especially important in determining the outcome of the race. In the same manner, the disclosed facial analysis methods may be used to predict horses unlikely to place highly in races due to an innate unwillingness to run at the front of or beyond the pack due either to an inherent lack of confidence, submissive nature, or general inability to overcome herd mentality in the simulated fight-or-flight scenario of a race environment.

Embodiments of the disclosed facial analysis methods may also be used to predict the performance of a racehorse and their subsequent placing in a specific race based their response to variable racing conditions. Some horses become nervous and tire quickly in high-traffic races with considerable bumping, and would therefore likely run poorly in large or closely matched fields. Similarly, some especially sensitive horses loose heart quickly when running at the back of a large pack where dirt from the other horses hooves is kicked up into their face, indicating that these horses will likely not place well in races with large fields where their chances of breaking at the front is greatly reduced or under muddy track conditions. When the innate responsiveness of an individual horse to such racing conditions—as predicted by the disclosed facial analysis methods—is taken into consideration with the their previous performances under standard racing conditions (i.e., racing history) and the predicted performances of the other horses in the field, the movements of horses within the field during the race and their final placing can be predicted by employing the disclosed facial analysis methods. Thus, the methods can be used to predict the performance of an individual horse in a particular race. Various conditions or factors can be accounted for by the method, or simply the distance of the race may be used.

While the methods to predict the outcome of a race are described with respect to horses, the same method may be deployed with other animals that compete or race, for example, dogs or camels.

In other embodiments, the methods described above with reference to FIGS. 15 and 16 may be used to predict non-performance-related characteristics for a particular breed of horse such as temperament, human interaction, cognitive ability, suitability for a particular task, load-bearing ability, pain tolerance, and/or desirability for breeding. For example, embodiments may determine whether a horse is suitable for use in a therapeutic riding program for children and/or adults with disabilities. In the same manner, embodiments may be applied to aid in matching a particular horse with a particular human disability. For example, embodiments may be used to predict that a particular horse is best suited for persons with cognitive disabilities and that another horse is best suited for persons with physical (non-cognitive) disabilities.

By way of example, embodiments may predict from facial features whether a horse will be cognitively suited to a challenging career as a therapy horse. Most therapeutic riding (also known as "hippotherapy") programs are characterized by limited resources and volunteer experience that often severely restrict the amount of training that can be invested into new therapy horses. For a horse to be successful in such a program, they must have an innate tolerance for the challenging circumstances such as the often colorful and often loud training tools and the discomfort of the claustrophobic and cumbersome riding apparatuses standardly used in therapeutic riding sessions. Such horses must also be incredibly patient and tolerant of the fast, unpredictable, and at times even painful movements of their riders both in the saddle and on the ground.

By using the method described above with reference to FIG. 15, a facial analysis model capable of accurately assessing whether an individual horse innately possesses such characteristics may be developed via statistical analysis of common facial structures readily identified within populations of well suited working therapy mounts. By applying such a model as described above with reference to FIG. 16, therapeutic riding programs can predict which horses would be suitable for working under these challenging conditions, drastically reducing the time and resources that they must invest selecting new therapy mounts.

In other embodiments, a facial analysis model can be developed and applied, as described above with reference to FIGS. 15 and 16, to match riders of varying physical and cognitive disabilities to the most appropriate mount. As experience has shown, many therapy horses prove best suited to a specific type of rider. For example, larger and/or older persons suffering from physical disabilities that limit their motor control on the horse, or which can lead to uncontrolled cramping, often work best with calmer and somewhat aloof mounts that are capable of ignoring the discomfort of their rider's limitations. Alternatively younger and/or smaller persons, or those suffering from cognitive disabilities, often benefit from more sensitive and engaged horses that are able to readily pick up on their fears and respond appropriately to comfort them and build confidence. A facial analysis model capable of accurately predicting such characteristics, as sensitivity and engagement that readily distinguish between horses best suited to physically or cognitively disabled riders, thereby allowing therapeutic riding programs to more easily match new clients to the most appropriate horse and avoid the strain of poor pairings felt by both riders and horses.

By way of example, facial images of a statistically significant number of working therapy horses that have proven well suited for riders with cognitive disabilities are analyzed to determine desired characteristic physical features, as described above with reference to FIG. 15. This establishes a model for predicting a candidate horse's suitability for this particular therapeutic riding task. Subsequently, new candidate horses may be measured and their suitability for use as a therapeutic horse for riders with cognitive disabilities may be predicted using the method described above with reference to FIG. 16. Investment in therapeutic horse training can be directed to those horses that are predicted to be suitable in this manner.

Embodiments may also be used as a preventative measure in horses against the development maintenance-based vices. The competitive lifestyles of high-performance show and racehorses are typified by high-concentrate diets, extended periods of stall confinement, and excessive stress. By nature, horses are adapted both mentally and physiologically to highly mobile lifestyles consisting primarily of long periods of time obtaining and digesting high-fiber, forage-based diets. When subjected to the unnatural conditions such as 24-hour stall confinement and limited activities that occupy their time, many horses develop undesirable behaviors such as cribbing, weaving, and stall walking. These behaviors ultimately may be destructive both to facilities and to the horse's health. Some horses are by nature at a higher risk of developing these vices as a function of their innate personalities. Once developed, these undesirable behaviors are difficult to change. The methods described above with reference to FIGS. 15 and 16 could be used to predict horses likely to exhibit these behaviors, so that preventative maintenance solutions could be employed before these behavioral patterns become established.

Since the domestication phenotype is common across many species of animals, embodiments, including those described above, are applicable to a broad range of animals, both mammals and non-mammals, such as donkeys, cattle, oxen, llamas, sheep, goats, turkey, geese, dogs, foxes, cats, ferrets, camels, geese, chickens, pigs, fish, etc. For example, embodiments may be used to predict a characteristic, such as mothering ability, of a sow based upon the anatomical structures of the sow's face. One suitable metric of mothering ability is the expected number of mash deaths that a sow would incur per litter of piglets. Initially, one or more digital images of a sow's face (e.g., front, profile, and/or top views) are obtained and stored in a memory operably connected to a digital computer. Additional data may be associated with the images, such as mash death statistics, which may be obtained from farrowing records regularly kept for hog farms. This step may be repeated as necessary based upon the number of sows in a group of interest.

Next, for each sow of interest, a plurality of reference points are added to the one or more stored images in a manner such as described above with reference FIGS. 15 and 16. Using these reference points, a plurality of facial measurements are determined from the one or more stored digital images for each sow of interest. The plurality of facial measurements may be—but are not necessarily—similar to the ones for horses discussed above with reference to FIGS. 1 through 13. Relationships between each of the facial descriptor measurements and the additional data of the sample library are then determined. Using these relationships, facial descriptor measurements are selected and an optimal combination of the selected facial descriptor measurements is determined, based on being most predictive of the actual mash death statistics of the sows in the sample library. Statistical techniques such as those described above with reference to FIGS. 18-21 may be used in the subset selection, or any other appropriate techniques known to persons skilled in the art may be used.

The selected facial descriptor measurements and the optimal combination then can be applied to determine the mothering ability characteristic of a particular sow based on the facial descriptor measurements for that animal, in the manner described above with reference to FIG. 16. In other words, the combination of measurements selected based on the sample library may be applied to sows of interest outside the sample library to predict the mothering ability of those animals. As this embodiment is applied to new sows, the sample library can be augmented by adding the images, additional data, and facial descriptor measurements for these animals. Selection of facial descriptor measurements and their optimal combination then can be carried out using the augmented sample library, in the same manner as described above and illustrated in FIG. 16.

In this manner, using facial descriptor measurements, an embodiment can be used to predict animal characteristics such as number or percentage of mash deaths per litter that a sow would be naturally inclined to incur. Furthermore, other embodiments utilize these predicted characteristics to determine management and/or maintenance strategies to use for individual high-risk sows. These strategies may include increasing supervision, using larger pens, moving piglets off a sow to reduce litter size, etc. Selection of one or more of these strategies may be based on a sow's predicted mash death rate and, optionally, one or more environmental factors such as farrowing crate dimensions, etc. and/or one or more other factors such as the sow's age, size, weight, and average litter size.

In some embodiments, other non-facial measurements or metrics that relate to influences on the behavioral development of an animal during the key imprinting windows of early life may also be used in combination with the facial measurements in the analysis. For example, and without limitation, such non-facial measurements or metrics may include birth weight, sow weaning weight, litter weight percentile, gender composition of litter, age, litter number, nursery pen weight, percentile, finishing pen weight percentile, gestation weight percentile, and leg length. In other embodiments, the predicted mothering behavior may be used to select gilts as replacements for a maintenance rotation, allowing swine farmers to avoid the financial loss of feeding gilts to farrowing age only to have them prove unsuitable as mothers.

Other embodiments may be used to determine maintenance and/or management strategies for one or more animals, as illustrated in FIG. 17. In step 1700, one or more optimal combinations of facial descriptor measurements are selected for predicting one or more characteristics of interest for a particular type of animal. Step 1700 may be carried out according to the method described above with reference FIG. 15, or in other ways within the scope of the present embodiment. The one or more characteristics of interest preferably are related to the maintenance and/or management strategies under consideration. As discussed above, step 1700 may include generation of a sample library for a particular type of animal comprising digital images, additional data, and a plurality of facial descriptor measurements. The facial measurements may be—but are not necessarily—similar to the ones for horses discussed above with reference to FIGS. 1 through 13. Non-facial physical measurements may also be used with the method.

In step 1702, digital images and additional data for a particular animal of interest are obtained and stored, in the same manner as described above with reference to the sample library (e.g., step 1500 of FIG. 15). In step 1704, reference points consistent with those added to the images in the sample library are added to the images of the animal of interest. In step 1706, facial descriptor measurements consistent with those in the sample library are calculated for the animal of interest. In step 1708, the one or more optimal combinations determined in step 1700 are applied to the facial descriptor measurements of the individual animal to predict the characteristic of interest, in a manner such as described above with reference to FIG. 16. Steps 1702 through 1708 are repeated for each individual animal included in the maintenance and/or management strategy. In step 1712, the predicted characteristics of interest for the individual animals are used to predict one or more characteristics for the group of animals. Finally, in step 1714, the predicted group characteristics and/or predicted individual characteristics are used to determine a maintenance and/or management strategy for the group of animals. Other factors and information may be used in either or both of steps 1712 and 1714, including factors related to individual animals, factors related to the group of animals, and/or factors related to the environment of the animals.

By way of example, the embodiment illustrated by FIG. 17 may be used to predict aggression-related characteristics of individual sows and to what extent certain combinations of sows will cohabitate in a gestation pen without harming each other. Step 1700 may include selecting facial descriptor measurements and an optimal combination of the selected facial descriptor measurements that is most predictive of characteristics related to fighting in a gestation pen. Example characteristics include food aggression, territoriality, dominance in novel environments, etc. Statistical techniques such as those described above with reference to FIGS. 18-21 may be used to select the facial descriptor measurements and their optimal combination(s). Other appropriate statistical techniques known to persons skilled in the art also may be used. To the extent that characteristics related to fighting in a gestation are independent or not fully correlated with each other, multiple subsets of facial descriptor measurements and/or multiple optimal combinations may be selected to predict the respective characteristics.

The selected facial descriptor measurements and optimal combination then can be applied to predict or estimate an individual sow's natural aggression/dominance level in each relevant personality characteristic. Information other than the facial descriptor measurements may be incorporated into this prediction or estimate, including the masculinity ratio of the sow's lactation litter, which indicates the level of testosterone that the sow was exposed to during conception, and weight rank of the sow within its lactation litter.

Furthermore, in some embodiments, this prediction or estimate of a sow's aggression-related characteristics may be used to predict the outcome of that sow's social interactions with one or more other sows in a gestation pen, or an overall level of aggressive behavior in a gestation pen. For example, observations about the number of gestation pen fights and the predicted aggression-related characteristics for sows of interest may be used to determine a weighted model for gestation pen aggression that is independent of the composition of animals within a pen. Alternately, these observations and predictions of aggression-related characteristics may be used to predict or estimate the number of fights a particular sow would engage in a gestation pen with a particular composition of animals.

More specifically, observations and predictions of aggression-related characteristics may be used to segment the sows of interest into multiple aggression levels or categories, such as I ("Dominant Aggressive") II ("Subordinate Defensive"), and III ("Submissive Evasive"). After sows of interest are categorized accordingly, a group characteristic such as the frequency of social aggression can be computed based on the number of animals of each category in the pen. A group characteristic such as the frequency of social aggression among sows cohabitating in a gestation pen also can be predicted by first averaging each of the selected facial descriptor measurements across all individuals comprising the group and then computing an optimized linear combination of the group averages.

By further example, a group characteristic such as aggression level can be predicted according to the method illustrated in FIG. 17 as follows. First, the optimal combination of facial descriptor measurements determined in step 1700 can be utilized according to steps 1702 through 1710 to predict the social aggressiveness of individual sows in the group. Next, the set of predicted social aggression levels can be combined optimally to form a predictor of the level of social aggression within the group. In other words, the predicted social aggression level for the ith sow in the group can be expressed as $SA_1 = a_1 \cdot F_1 + a_2 \cdot F_2 + \ldots + a_M \cdot F_M$, where $F_1 \ldots F_M$ are the selected facial descriptor measurements and $a_1 \ldots a_M$ are the optimal linear combining coefficients. Likewise, if the group comprises N individual sows, the predicted group social aggression can be expressed as $GSA = b_1 \cdot SA_1 + b_2 \cdot SA_2 + \ldots + b_N \cdot SA_N$, where $b_1 \ldots b_N$ are the optimal linear combining coefficients for the group. Furthermore, in the combined group model, the individual sows may be ordered in a variety of ways. For example, the predicted individual aggression levels $SA_1 \ldots SA_N$ may be rearranged in descending numerical order $SA'_1 \ldots SA'_N$, with $SA'_1$ corresponding to the most aggressive sow. In such case, each optimal coefficient $b_i$ may be selected, at least in part, based on the position within the group. This would allow, for example, coefficients $b_1$ to be selected to emphasize the characteristics of the most aggressive and/or submissive animals in the group.

Group dynamics and group characteristics such as aggression level among a group of sows in a gestation pen can be predicted in various other ways known to persons skilled in the art. For example, methods may be employed that are analogous to the Hartree-Fock equation, which is commonly used to predict the behavior of the electrons in an atom. Alternately, a computational method based on a NETLOGO model can be used. An advantage of this approach is that factors other than the aggression-related behavior traits predicted from the facial descriptor measurements can be incorporated. Such factors may include the estimated activity level and the resulting number of interaction between animals in a pen, as well as environmental factors such as crowding.

While the group dynamics and group characteristics have been described with references to pigs, the same or similar methods and systems can be applied to various other animals. In some embodiments, the disclosed methods may be used to determine appropriate pasture assignments on horse boarding facilities, where pasture injuries can at best be aesthetically unpleasing in show horses and at worst permanently crippling and costly. In other embodiments, the disclosed methods may be used to identify which dogs are behaviorally suited to group-pen housing in kennel situations, and those that need individual enclosures to minimize fighting.

Persons of ordinary skill in the art would understand that any of these computational methods may be embodied in various combinations of hardware and software. For instance, the computations may be carried out by a specialized or general-purpose digital computer, such as a laptop, desktop, tablet, smartphone, workstation, etc. Moreover, this hardware may be programmed to carry out such computations in various ways, such as by programs written in human-readable languages such as C, C++, etc. and compiled into machine-readable code for execution. Alternately, the methods may be expressed in the particular language of a specialized computational software package, such as Matlab, which are further interpreted and/or compiled into machine-readable code. In the same manner, computerized selections may be carried out by accessing one or more electronically stored database(s) comprising information about the animal of interest; other animals of the same type, species, or breed; environmental factors; and other relevant information.

Figure 22:
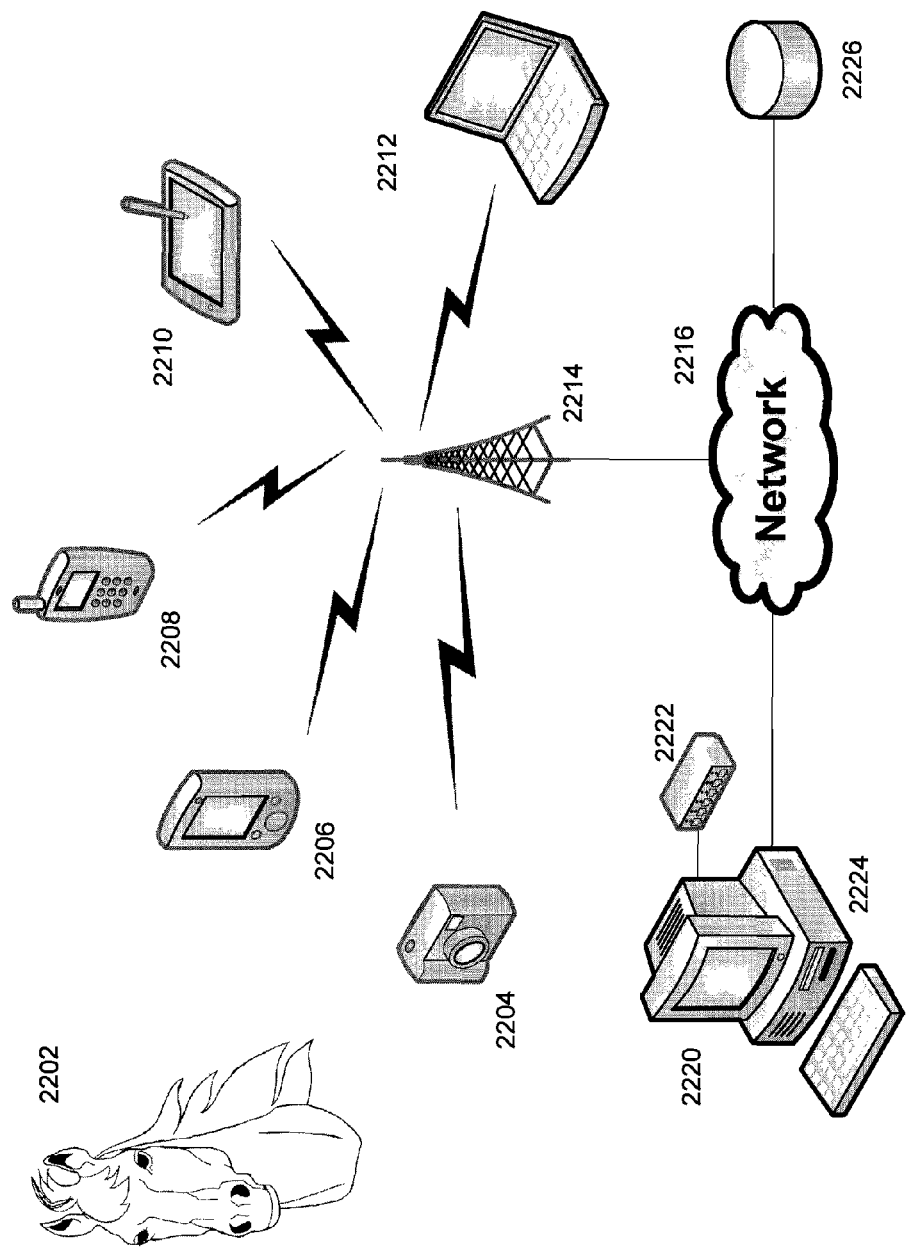
FIG. 22 shows a system that can be used to implement any of the methods of the present disclosure.
Figure 23C:
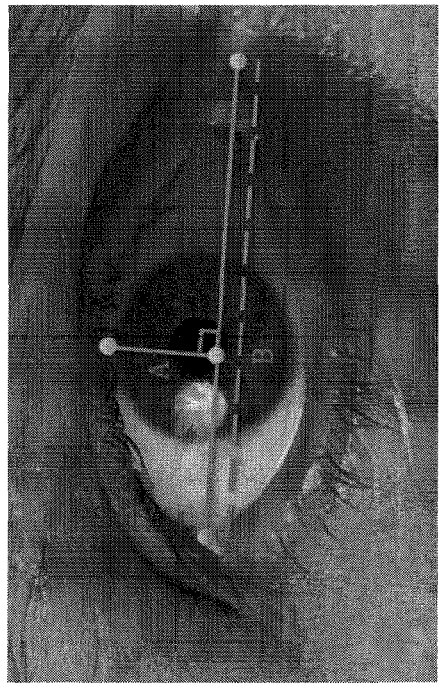
FIG. 23C shows facial descriptor measurement Eye Height Proportion, A/B.
Figure 23D:
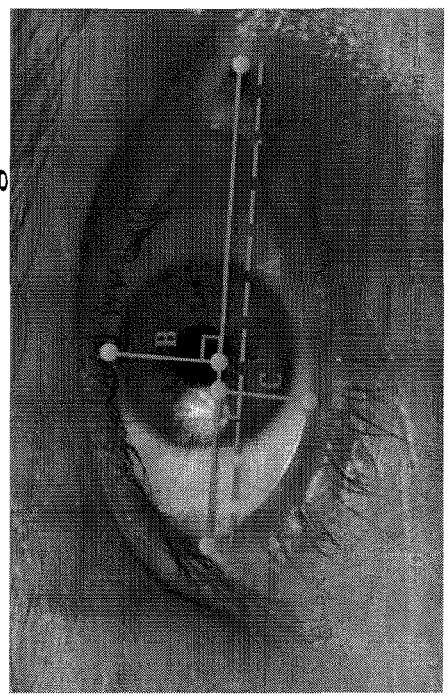
FIG. 23D shows facial descriptor measurement Eye Length-to-Height Proportion, (B+C)/A.
Figure 23A:
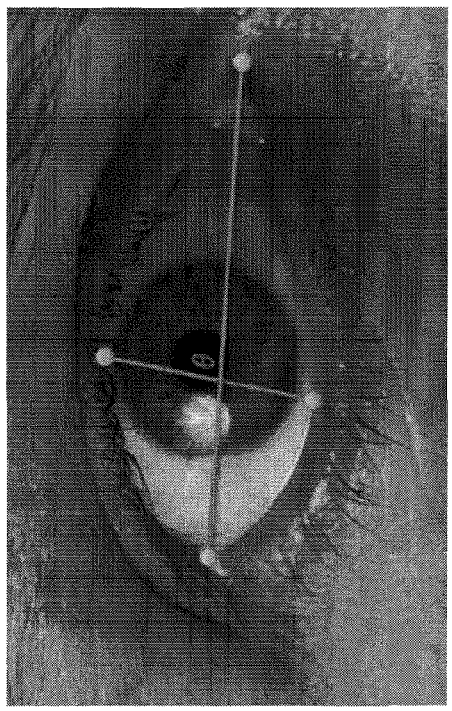
FIG. 23A shows facial descriptor measurement Eye Extreme Intersect Angle, θ.
Figure 23B:
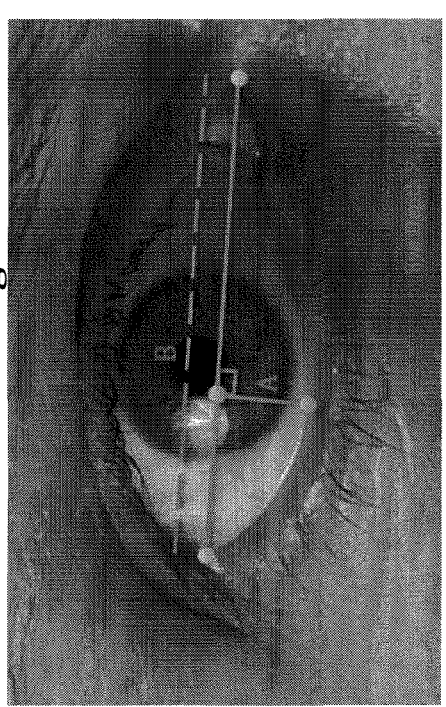
FIG. 23B shows facial descriptor measurement Eye Depth Proportion, A/B.
Figure 24:
FIG. 24 shows facial descriptor measurement Mid-Face Width Proportion, (A+B)/C.
Figure 23E:
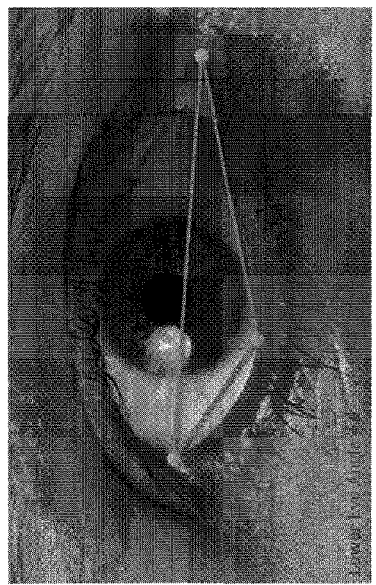
FIG. 23E shows facial descriptor measurement Lower Eye Angle, θ.
Figure 23F:
FIG. 23F shows facial descriptor measurement Upper Eye Angle, θ.
Figure 26:
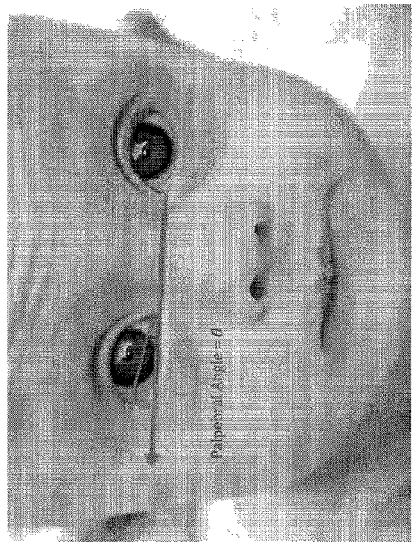
FIG. 26 shows facial descriptor measurement Palpebral Angle, θ.
Figure 27:
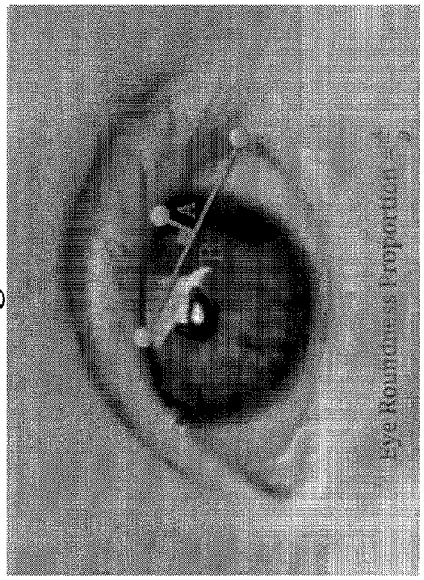
FIG. 27 shows facial descriptor measurement Eye Roundness Proportion, A/B.
Figure 25:
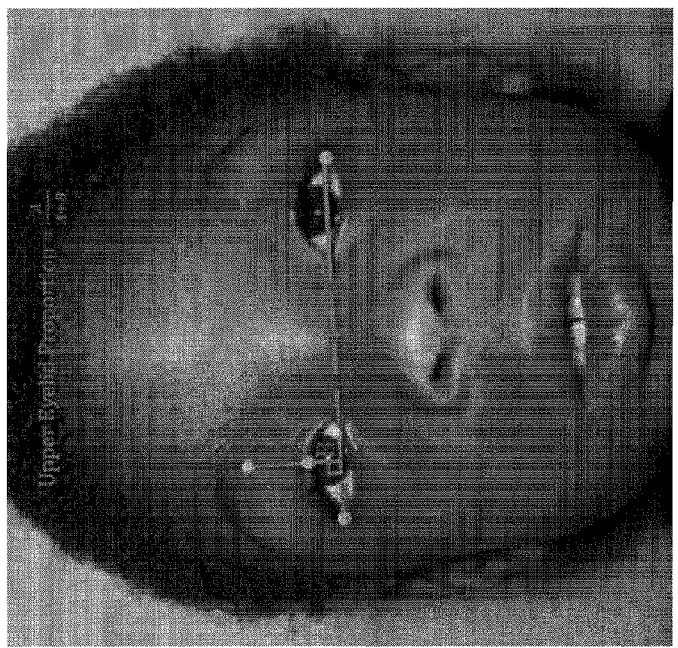
FIG. 25 shows facial descriptor measurement Upper Eyelid Proportion, A/(A+B)
Figure 29B:
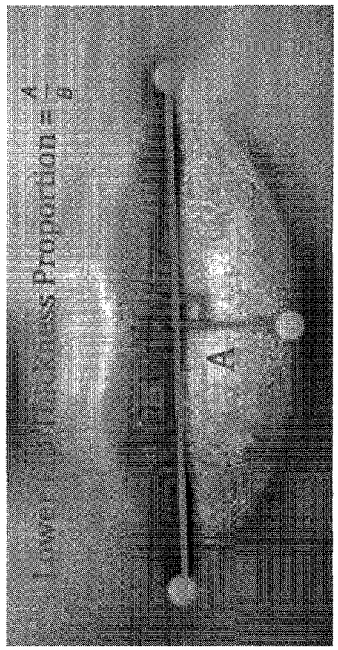
FIG. 29B shows facial descriptor measurement Lower Lip Thickness Proportion, A/B.
Figure 29A:
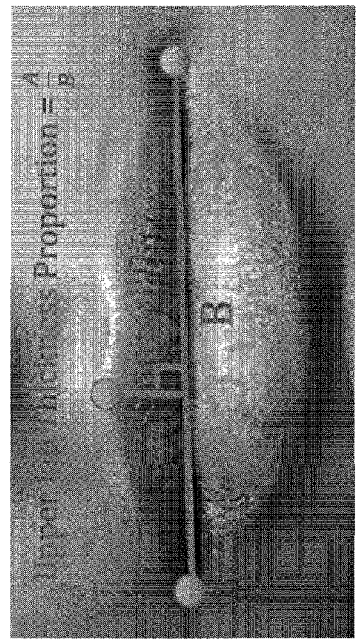
FIG. 29A shows facial descriptor measurement Upper Lip Thickness Proportion, A/B.

For example, FIG. 22 shows various hardware and software embodiments of a system according to embodiments of the present disclosure. Various hardware devices—such as digital camera 2204, smartphone 2206, cellular phone 2208, tablet computer 2210, and laptop computer 2212—may be used to capture a digital image of an animal of interest, such as the exemplary horse 2202. The image-capturing device may then store the image in a memory operably connected to a digital computer. This may be carried out in various ways as illustrated in FIG. 22. For example, the image capturing device may transmit the image through network 2216 via wireless access point 2214 to digital computer 2220, which may be a desktop computer, server, workstation, or the like. Moreover, wireless access point 2214 may be a cellular base station, wireless LAN access point, Bluetooth access point, or any other wireless connection known to persons of ordinary skill in the art. Likewise, network 2216 may be a local- or wide-area, public or private network, or any combination thereof, including an intranet and/or the Internet.

In other embodiments, the image capturing device transfers the captured digital image to digital computer 2220 through a wired connection 2222, such as a Universal Serial Bus (USB) connection. In yet other embodiments, the captured image(s) may be transferred by removing a memory card from the image capturing device and inserting it into memory card reader 2224 of digital computer 2220, which may copy the captured images to other memory accessible by or operably connected to digital computer 2220. Also within the spirit and scope of the present disclosure, the image capturing device may transfer the image, via methods described above or otherwise well known in the art, to devices other than digital computer 2220, such as tablet computer 2210. In such embodiments, further processing according to the methods describe above will occur, for example, in tablet computer 2210 rather than in digital computer 2220. Similarly, the image capturing device may transfer the image to network storage unit 2226 that is accessible via network 2216, e.g., cloud storage. Network storage unit 2226 may be configured to be accessible by some or all of the other devices shown in FIG. 22.

In other embodiments, further processing according to the methods described above also may take place in the image capturing device itself. For example, tablet computer 2210 may be used to capture images of animals of interest, store the images in memory accessible or operably connected to it (including, for example, network storage unit 2226), and then execute one or more software applications embodying one or more methods described above. Specific measurements or processed data from the image capturing device may also be communicated to a central computer or central location.

Although embodiments described above are related to predicting characteristics of animals, other embodiments within the scope of the present disclosure may be used to predict certain characteristics of humans via methods employing facial descriptor measurements. During progressive stages of human embryonic growth, development of the brain and face remains intimately connected through both genetic signaling and biomechanical/biochemical mechanisms. The face develops from populations of cells originating from the early neural crest, with cells from the neural tube gradually shifting to form the prominences of the face. Differentiation of these early cells is closely regulated through intricate genetic signaling mechanisms, with the brain essentially serving as the platform on which the face grows. As these two structures continue to grow and develop during the later embryonic stages, their phenotypes remain closely linked as complex genetic hierarchies regulate patterns of cross talk between molecules, cells, and tissues.

Figure 28:
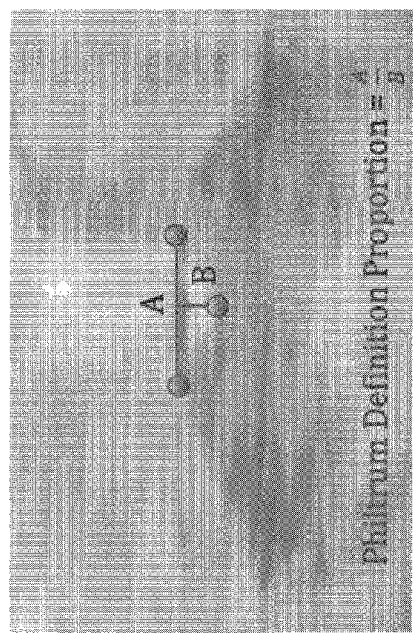
FIG. 28 shows facial descriptor measurement Philtrum Definition Proportion, A/B.
Figure 30:
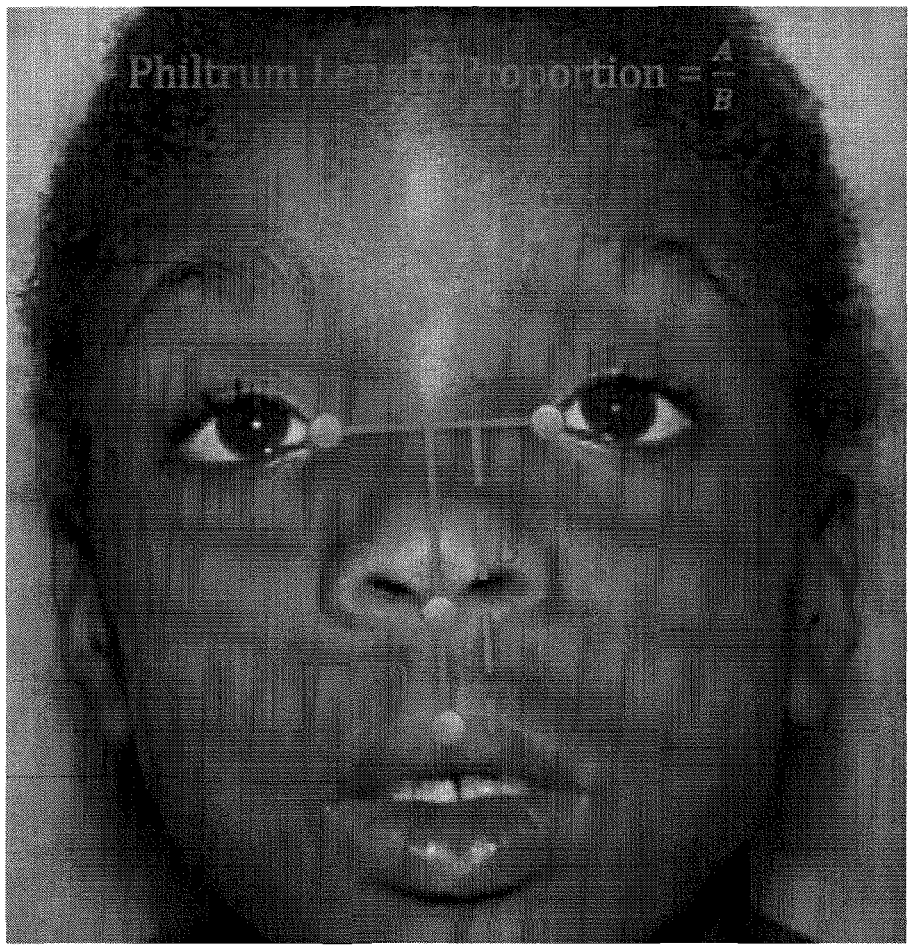
FIG. 30 shows facial descriptor measurement Philtrum Length Proportion, A/B.

The close relationship between the functional development of the brain and structures of the face has been clearly documented for a number of developmental disorders. Among the most well known of these disorders is Fetal Alcohol Syndrome (FAS), which is the direct result of exposure of the fetus to alcohol during pregnancy. FAS has been shown to result in both an easily identifiable phenotype (i.e., collection of minor facial abnormalities such as small eyes, smooth philtrum, thin upper lip) and developmental damage to the central nervous system that is often permanent (e.g., speech delays, learning disabilities, poor reasoning skills, poor memory, attention deficit disorders, and low IQ). FIGS. 23 through 30 show a set of fifteen (15) human facial descriptor measurements that can be used to identify the phenotype associated with FAS. For example, FIGS. 23A through 23F show various facial descriptor measurements related to the eye, while FIGS. 28 and 30 show various facial descriptor measurements related to the philtrum. Nevertheless, this set of human facial descriptor measurements is merely exemplary, and the person of ordinary skill will recognize that fewer than the entire set may be used to predict FAS. Furthermore, this set of human facial descriptor measurements is not exhaustive and others may be incorporated, such as with the set of fifty-six equine facial descriptor measurements shown in FIGS. 1 through 13. Is some embodiments, two, three, or more of the facial descriptor measurements are used in combination to predict a trait, characteristic, or syndrome such as FAS.

While examples are shown primarily with facial measurements, other head measurements and physical measurements may be used alone, without facial measurements, or in combination with facial measurements. For example, measurements of the head or crown may be used in conjunction with facial features to predict syndromes or traits.

By way of further example, Down syndrome is another prenatal developmental disorder causing mental/social delays that yields an easily identifiable phenotype including a host of distinctive facial features such as small chin and/or mouth, round face, and rounded almond-shaped eyes. Recent studies have even been able to identify measurable trends in facial features that distinguish between children diagnosed with Autism Spectrum Disorders (ASD) and those of typical development. The facial descriptor measurements shown in FIGS. 23 through 30 may also be used to identify the phenotype associated with Down syndrome. However, as with FAS described above, this set of facial descriptor measurements is merely exemplary, and may be reduced or augmented for predicting Down syndrome or other human functional development disorders within the spirit and scope of the present disclosure.

Given these established relationships between human facial structures and cognitive development, any of the computationally inexpensive, two-dimensional, locally-normalized facial evaluation systems described provides a non-invasive analysis tool for use in multiple clinical applications. For example, embodiments of the facial analysis methods and systems disclosed herein will diagnose children with specific cognitive development disorders based on the degree of divergence between their facial features and those of the overall typical population with respect to the phenotype for a disorder. Such a diagnosis tool is faster and less invasive than the standard cognitive testing procedures currently employed, and may allow for earlier diagnosis and interventions. More computationally expensive embodiments or variations may also be used for diagnosis.

In the same manner, embodiments of the facial analysis methods and systems disclosed herein can be used for predicting cognitive disorders that vary in degree of severity (e.g., FAS and Down Syndrome) or which present as a spectrum of disorders (e.g., ASD,). Such embodiments utilize metrics such as continuously-valued, facial descriptor measurements to produce multivariate models capable of predicting severity or types of symptoms displayed. For example, a facial analysis model derived using methods described herein could be used to statistically predict a child's score on the Childhood Autism Rating Scale (CARS). CARS is a diagnostic standard that uses behavioral observations and testing to differentiate between Autism and other types developmental disorders and to quantify the severity of the disorder along a scale.

By way of further example, a facial analysis model derived using methods described herein can be used to predict which category, class, and/or subclass of a particular cognitive disorder that a particular individual falls within. For example, a model based on a plurality of facial measurements will predict whether a particular individual is better diagnosed with classic autism or with Asperger's syndrome. This predicted classification could be used by itself, or in conjunction with other qualitative and/or quantitative diagnostic methods, to develop of the most appropriate and effective plan for early therapeutic intervention and treatment.

Embodiments of the facial analysis methods and systems disclosed herein also can be used for predicting or inferring certain characteristics of human individuals that do not have cognitive or developmental disorders. For example, a model based on a plurality of facial measurements may be used in the manner described above with reference to FIGS. 15 and 16 to predict a particular individual's innate personality such as aggression and competitiveness. One or more of the facial descriptor measurements shown in FIGS. 23 through 30 may also be used for this purpose. As described above, however, this set of facial descriptor measurements is merely exemplary and may be reduced or augmented as necessary within the spirit and scope of the present disclosure. Furthermore, multivariate analysis of a plurality of facial measurements statistically normalized against like measurements of a standard population of individuals can be used to predict other variable aspects of innate personality such as aggression, dominance, conscientiousness, compassion, extroversion, IQ, etc. Insight into such personality traits of an individual could be used as an inference tool to predict various aspects of behavior and performance such as learning styles, athletic performance, business decisions, etc.

For example, facial and other physical measurements of successful left-handed baseball pitchers can be made and compared with measurements of a standard population. Digital images and reference points may be used to ease the burden of the measurement process. Ratios, angles, or nominal measurements may be used instead of or in addition to actual measurements. A number of metrics may then be analyzed to find those metrics which show the greatest correlation or significance in determining statistically whether a person is more likely than another to be a successful left-handed pitcher. Once the more significant metrics are identified, the system may simply rely on those metrics to predict a person's strength or likelihood to succeed as a left-handed pitcher. A baseball scout may use the system as a tool to assist in choosing one left-handed pitching prospect over another by scoring both candidates. Those skilled in the art will recognize numerous applications of the methods and techniques described throughout the specification to humans.

In other embodiments of the methods and systems disclosed herein, facial analysis of both animals and humans can be used to pair a person (i.e., a human being) with a particular animal based on the degree that their personalities complement each other. For example, a model based on a plurality of facial measurements could be developed and applied in the manner described above with reference to FIGS. 15 and 16 to predict the personality characteristics of a variety of horses that are available for clients of a therapeutic riding program. When a new client enrolls with the program, facial analysis is also used to predict the client's relevant characteristics, e.g., self-awareness. With this information, the program could then find the horse with facial features that correspond to characteristics that are necessary to accommodate this client, e.g., high pain tolerance levels and high responsiveness needed since the client is likely to lose their balance frequently. By the same token, if a facial analysis program indicated that a new autistic client is easily frustrated and likely to act out, then it could pair that client to a horse with facial features that indicate high tolerance levels that allow them to deal with the loud noises and fast movements, as well as some degree of stubbornness to stay on task even when the client is not doing what they are supposed to be doing.

Additionally, these embodiments can be used in a wide variety of applications to identify or predict the optimum or most appropriate combination of a human and animal. For example, for a particular type of event or race, horses may be paired with their most appropriate riders—or vice versa—thereby optimizing the competitive performance of the pair. Moreover, in training environments, horses may be matched with the most appropriate trainer to improve communication and cohesiveness and increase learning potential. By the same token, young riders may be matched to the horse that will best accommodate their needs. Similarly, embodiments may be used in non-equine applications such as to match seeing-eye dogs to the best owners or drug/bomb dogs to the best suited handlers based on the unique personalities of animal and human.

Figure 31:
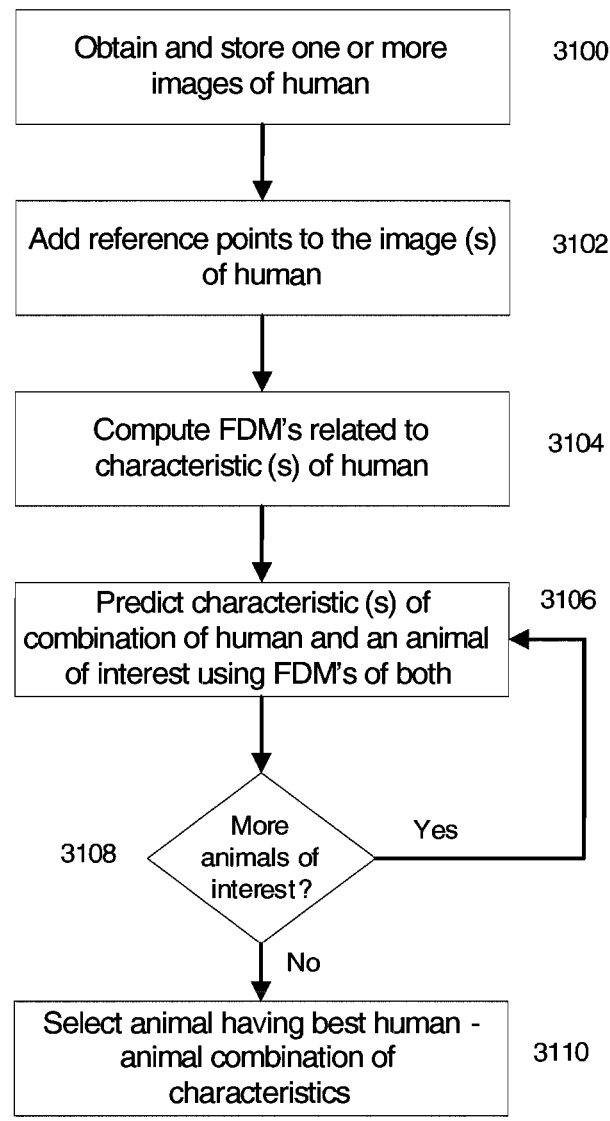
FIG. 31 shows a method for determining which animal among a plurality of animals is the best match for a particular human engaged in a particular task, according to an embodiment of the present disclosure.

A method according to this embodiment is shown in FIG. 31. In this method, it is assumed that facial descriptor measurements were previously computed for the set of animals of interest, e.g., the horses available in a therapeutic riding program, and matched to a single human of interest. However, a person of ordinary skill will easily recognize that the facial descriptor measurements could be pre-computed for a set of humans, e.g., clients at a therapeutic riding program, and matched to an animal of interest, e.g., a new horse. In block 3100, digital images and additional data is obtained and stored for a human, such as in the manner described previously with reference to the sample library (i.e., block 1500 of FIG. 15). In block 3102, reference points consistent with those of the images in the sample library are added to the images of the human. In block 3104, facial descriptor measurements are calculated for the human. For example, the reference points and facial descriptor measurements may be those shown in FIGS. 23 through 30, augmented by additional facial descriptor measurements as necessary.

In block 3106, a combination of one or more of the facial descriptor measurements of the human and one or more of the facial descriptor measurements of a particular animal of interest (e.g., a horse) are used to predict the relevant characteristics of that particular human-animal combination. Block 3108 determines whether or not to repeat block 3106 for another animal of interest. After determining the relevant characteristics for each particular human-animal combination, in block 3110 the animal providing the best match to the human is selected based on the relevant characteristics of human-animal combination. Persons of ordinary skill will recognize that FIG. 31 may be adapted to other embodiments by combining facial descriptor measurements for an individual animal with previously computed facial descriptor measurements for a plurality of humans to select the best combination.

To find suitable pairings of animals and humans, any of the embodiments described above may be used to determine characteristics of the animal and any of the embodiments described may be used for determining characteristics of humans. Other physical metrics in addition to facial features may be used. The results of the animal characteristics and human characteristics are analyzed for suitability, best fit or a match.

Moreover, the terms and descriptions used herein are set forth by way of illustration only and are not meant as limitations. Those skilled in the art will recognize that many variations are possible within the spirit and scope of the disclosure as defined in the following claims, and their equivalents, in which all terms are to be understood in their broadest possible sense unless otherwise indicated.

What is claimed is:

1. A computerized method for predicting one or more characteristics of a human based on one or more digital images representing the human, comprising:
   receiving the one or more digital images representing the human, wherein a portion of at least one of the digital images representing the human's head is annotated with a plurality of reference points;
   associating at least one other data value about the human with the one or more digital images representing the human;
   computing, with a digital computer:
   a plurality of scale-free metrics comprising at least two of the following: a length metric, an area metric, and curvature measures using relative locations of a predetermined subset of the reference points and descriptive points, wherein the descriptive points are based on the relative locations of the reference points;
   a combined metric based on a predetermined function of the plurality of scale-free metrics;
   selecting, using dimension reduction techniques, a combination of the plurality of scale-free metrics useable for predicting a characteristic of the human based on the combined metric and data about a group of subjects; and
   providing the predicted characteristic to an output device.

2. The computerized method of claim 1, further comprising:
   storing the one or more digital images in a memory operably connected to the digital computer; and
   annotating the portion of at least one of the digital images representing the human's head with the plurality of reference points.

3. The computerized method of claim 1, wherein the predetermined function is determined based on data relating to a plurality of other humans.

4. The computerized method of claim 1, wherein the predicted characteristic relates to a developmental disorder.

5. The computerized method of claim 1 wherein the predicted characteristic comprises a rating on a childhood autism rating scale.

6. The computerized method of claim 1, wherein the predicted characteristic relates to athletic performance.

7. The computerized method of claim 1 wherein one or more of the plurality of scale-free metrics are computed as z-scores.

8. The computerized method of claim 1, wherein the predicted characteristic relates to one or more of a) type of sporting event most suitable for the human, and
b) the expected performance of the human in a particular position on a sports team.

9. The computerized method of claim 1, wherein the human is physically or mentally disabled.

10. The computerized method of claim 1, wherein the predicted characteristic is further based on at least one of: a) additional information related to the human; and b) information related to training the human has completed; and c) information relating to the human's environment or situation.

11. The computerized method of claim 1, wherein at least one of the at least two measures of the plurality of scale-free metrics comprises reference points related to the human's eyes.

12. The computerized method of claim 1, wherein the plurality of scale-free metrics comprises two or more of the following: Eye Depth Proportion, Eye Height Proportion, Eye Length-to-Height Proportion, Mid-Face Width Proportion, Upper Eyelid Proportion, Eye Roundness Proportion, Philtrum Definition Proportion, Upper Lip Thickness Proportion, Lower Lip Thickness Proportion, and Philtrum Length Proportion.

13. The computerized method of claim 1, wherein providing the predicted characteristic to an output device comprises displaying the predicted characteristic.

14. A computerized system for predicting one or more characteristics of a human based on one or more digital images representing the human, comprising:
at least one memory storing computer-executable instructions and the one or more digital images representing the human;
a processor in communication with the at least one memory, executing the stored instructions, causing the processor to:
receive the one or more digital images representing the human, wherein a portion of at least one of the digital images representing the human's head is annotated with a plurality of reference points;
associate at least one other data value about the human with the one or more digital images representing the human;
compute a plurality of scale-free metrics comprising at least two of the following: a length metric, an area metric, and curvature measures using relative locations of a predetermined subset of the reference points and descriptive points, wherein the descriptive points are based on the relative locations of the reference points;
compute a combined metric based on a predetermined function of the plurality of scale-free metrics;
select, using dimension reduction techniques, a combination of the plurality of scale-free metrics useable for predicting a characteristic of the human based on the combined metric and data about a group of humans; and
provide the predicted characteristic to an output device.

15. The computerized system of claim 14, wherein the predicted characteristic relates to a developmental disorder.

16. The computerized system of claim 14, wherein the predicted characteristic comprises a rating on a childhood autism rating scale.

17. The computerized system of claim 14, wherein the predicted characteristic relates to athletic performance.

18. A non-transitory, computer-readable medium comprising a set of instructions that, when executed by a computing device, causes the computing device to:
receive one or more digital images representing a human, wherein a portion of at least one of the digital images representing the human's head is annotated with a plurality of reference points;
associate at least one other data value about the human with the one or more digital images representing the human;
compute a plurality of scale-free metrics comprising at least two of the following: a length metric, an area metric, and curvature measures using relative locations of a predetermined subset of the reference points and descriptive points, wherein the descriptive points are based on the relative locations of the reference points;
compute a combined metric based on a predetermined function of the plurality of scale-free metrics;
select, using dimension reduction techniques, a combination of the plurality of scale-free metrics useable for predicting a characteristic of the human based on the combined metric and data about a group of humans; and
provide the predicted characteristic to an output device.

19. The non-transitory, computer-readable medium of claim 18, wherein the predicted characteristic relates to a developmental disorder.

20. The non-transitory, computer-readable medium of claim 18, wherein the predicted characteristic comprises a rating on a childhood autism rating scale.

21. The non-transitory, computer-readable medium of claim 18, wherein the predicted characteristic relates to athletic performance.

* * * * *